United States Patent
Tabata et al.

(10) Patent No.: US 8,255,132 B2
(45) Date of Patent: Aug. 28, 2012

(54) CONTROL DEVICE FOR VEHICLE DRIVE APPARATUS

(75) Inventors: Atsushi Tabata, Okazaki (JP); Yuji Inoue, Nisshin (JP); Atsushi Kamada, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 1311 days.

(21) Appl. No.: 11/913,947

(22) PCT Filed: May 19, 2006

(86) PCT No.: PCT/JP2006/310514
§ 371 (c)(1),
(2), (4) Date: Nov. 9, 2007

(87) PCT Pub. No.: WO2006/123842
PCT Pub. Date: Nov. 23, 2006

(65) Prior Publication Data
US 2009/0248265 A1  Oct. 1, 2009

(30) Foreign Application Priority Data

May 19, 2005  (JP) .................................. 2005-147349
May 27, 2005  (JP) .................................. 2005-156478

(51) Int. Cl.
*B60K 6/387* (2007.10)
*B60K 6/445* (2007.10)
*B60K 6/543* (2007.10)
*B60K 6/547* (2007.10)
*B60K 6/365* (2007.10)
*B60K 6/22* (2007.10)
*B60W 20/00* (2006.01)

(52) U.S. Cl. ................ 701/59; 701/51; 701/52; 701/56; 701/60; 701/61

(58) Field of Classification Search .............. 180/65.25, 180/65.27, 65.28, 65.29, 65.285, 337; 192/3.54, 192/3.51; 475/5, 43; 701/51–61, 65–66; 706/905, 12–13; 903/945; 700/28–55
See application file for complete search history.

(56) References Cited

U.S. PATENT DOCUMENTS 5,833,570 A  11/1998  Tabata et al.
(Continued)

FOREIGN PATENT DOCUMENTS

DE  196 06 771 A1  8/1997
(Continued)

OTHER PUBLICATIONS

German Office Action Issued Apr. 18, 2011, in Patent Application No. 112006001259.2 (with English-language translation).
(Continued)

*Primary Examiner* — Khoi Tran
*Assistant Examiner* — Dale Moyer
(74) *Attorney, Agent, or Firm* — Oblon, Spivak, McClelland, Maier & Neustadt, L.L.P.

(57) ABSTRACT

A control device is provided for a vehicle drive apparatus, which includes a differential mechanism and an electric motor provided in differential mechanism, which can be miniaturized in structure with improved fuel economy or enabling the suppression of occurrence in switching shocks. With a provision of a switching clutch C0 or a switching brake B0, a shifting mechanism 10 is placed in either a continuously variable shifting state or a step variable shifting state. This enables the vehicle drive apparatus to have combined advantages in a fuel economy improving effect with a transmission, enabled to electrically change a gear ratio, and a high transmitting efficiency with a gear type power transmitting device enabled to mechanically transmit drive power. During a shifting of an automatic shifting portion 20, engaging control variable control means 84 alters a method of learning an engaging pressure. This allows a rotation speed $N_{18}$ of a transmitting member to achieve a given variation during the shifting, depending on a continuously variable shifting state and a non-continuously variable shifting state, for thereby providing a balance between an improvement in a feeling and a suppressing of shifting shocks.

23 Claims, 24 Drawing Sheets

U.S. PATENT DOCUMENTS

| | | | |
|---|---|---|---|
| 6,081,042 A * | 6/2000 | Tabata et al. | 290/45 |
| 6,132,334 A | 10/2000 | Tabata et al. | |
| 7,917,277 B2 * | 3/2011 | Tabata et al. | 477/5 |
| 2001/0021683 A1 * | 9/2001 | Takagi et al. | 477/37 |
| 2001/0044361 A1 * | 11/2001 | Taniguchi et al. | 477/111 |
| 2001/0046923 A1 * | 11/2001 | Reuschel et al. | 477/44 |
| 2002/0198647 A1 * | 12/2002 | Kawamoto et al. | 701/51 |
| 2004/0128048 A1 * | 7/2004 | Iwatuki et al. | 701/54 |
| 2005/0080540 A1 * | 4/2005 | Steinmetz et al. | 701/55 |
| 2009/0088290 A1 * | 4/2009 | Tabata et al. | 477/5 |

FOREIGN PATENT DOCUMENTS

| | | |
|---|---|---|
| DE | 100 43 510 A1 | 3/2002 |
| JP | 8 240261 | 9/1996 |
| JP | 9 144866 | 6/1997 |
| JP | 9 229181 | 9/1997 |
| JP | 9-322307 | 12/1997 |
| JP | 9 322312 | 12/1997 |
| JP | 10 257610 | 9/1998 |
| JP | 11 217025 | 8/1999 |
| JP | 2000 2327 | 1/2000 |
| JP | 2000 346187 | 12/2000 |
| JP | 2003 301731 | 10/2003 |
| JP | 2005-61498 | 3/2005 |
| WO | WO 03/016749 A1 | 2/2003 |

OTHER PUBLICATIONS

Office Action issued Jan. 13, 2009, in Japanese Patent Application No. 2005-156478 (with English translation).

* cited by examiner

|  | C0 | C1 | C2 | B0 | B1 | B2 | B3 | SPEED RATIO | STEPPING RATIO |
|---|---|---|---|---|---|---|---|---|---|
| 1st | ◉ | ○ |  |  |  |  | ○ | 3.357 | |
| 2nd | ◉ | ○ |  |  |  | ○ |  | 2.180 | 1.54 |
| 3rd | ◉ | ○ |  |  | ○ |  |  | 1.424 | 1.53 |
| 4th | ◉ | ○ | ○ |  |  |  |  | 1.000 | 1.42 |
| 5th |  | ○ | ○ | ◉ |  |  |  | 0.705 | 1.42 |
| R |  |  | ○ |  |  |  | ○ | 3.209 | TOTAL 4.76 |
| N | ○ |  |  |  |  |  |  | | |

○ ENGAGED
◉ ENGAGED IN STEP-VARIABLE, RELEASED IN CONTINUOUSLY-VARIABLE

| ENGINE TORQUE | 1→2 | | 2→3 | | 3→4 | | 4→5 | |
|---|---|---|---|---|---|---|---|---|
| 1 | Pb3u121 | Pb2u121 | Pb2u231 | Pb1u231 | Pb1u341 | Pc2u341 | Pc0u451 | Pb0u451 |
| 2 | Pb3u122 | Pb2u122 | Pb2u232 | Pb1u232 | Pb1u342 | Pc2u342 | Pc0u452 | Pb0u452 |
| 3 | Pb3u123 | Pb2u123 | Pb2u233 | Pb1u233 | Pb1u343 | Pc2u343 | Pc0u453 | Pb0u453 |
| 4 | Pb3u124 | Pb2u124 | Pb2u234 | Pb1u234 | Pb1u344 | Pc2u344 | Pc0u454 | Pb0u454 |
| 5 | Pb3u125 | Pb2u125 | Pb2u235 | Pb1u235 | Pb1u345 | Pc2u345 | Pc0u455 | Pb0u455 |
| 6 | Pb3u126 | Pb2u126 | Pb2u236 | Pb1u236 | Pb1u346 | Pc2u346 | Pc0u456 | Pb0u456 |
| 7 | Pb3u127 | Pb2u127 | Pb2u237 | Pb1u237 | Pb1u347 | Pc2u347 | Pc0u457 | Pb0u457 |

(b)

| ENGINE TORQUE | 1←2 | | 2←3 | | 3←4 | | 4←5 | |
|---|---|---|---|---|---|---|---|---|
| 1 | Pb3d121 | Pb2d121 | Pb2d231 | Pb1d231 | Pb1d341 | Pc2d341 | Pc0d451 | Pb0d451 |
| 2 | Pb3d122 | Pb2d122 | Pb2d232 | Pb1d232 | Pb1d342 | Pc2d342 | Pc0d452 | Pb0d452 |
| 3 | Pb3d123 | Pb2d123 | Pb2d233 | Pb1d233 | Pb1d343 | Pc2d343 | Pc0d453 | Pb0d453 |
| 4 | Pb3d124 | Pb2d124 | Pb2d234 | Pb1d234 | Pb1d344 | Pc2d344 | Pc0d454 | Pb0d454 |
| 5 | Pb3d125 | Pb2d125 | Pb2d235 | Pb1d235 | Pb1d345 | Pc2d345 | Pc0d455 | Pb0d455 |
| 6 | Pb3d126 | Pb2d126 | Pb2d236 | Pb1d236 | Pb1d346 | Pc2d346 | Pc0d456 | Pb0d456 |
| 7 | Pb3d127 | Pb2d127 | Pb2d237 | Pb1d237 | Pb1d347 | Pc2d347 | Pc0d457 | Pb0d457 |

| | C0 | C1 | C2 | B0 | B1 | B2 | SPEED RATIO | STEPPING RATIO |
|---|---|---|---|---|---|---|---|---|
| 1st | ◎ | ○ | | | | ○ | 2.804 | |
| 2nd | ◎ | ○ | | | ○ | | 1.531 | 1.54 |
| 3rd | ◎ | ○ | ○ | | | | 1.000 | 1.53 |
| 4th | | ○ | ○ | ◎ | | | 0.705 | 1.42 |
| R | | | ○ | | | ○ | 2.393 | TOTAL 3.977 |
| N | | ○ | | | | | | |

○ ENGAGED
◎ ENGAGED IN STEP-VARIABLE,
 RELEASED IN CONTINUOUSLY-VARIABLE

CONTROL DEVICE FOR VEHICLE DRIVE APPARATUS

TECHNICAL FIELD

The present invention relates to a drive apparatus for vehicle having a differential mechanism, operative to perform a differential action, and an electric motor and, more particularly, to a technology of miniaturizing an electric motor or the like and a shifting control technology.

BACKGROUND ART

There has heretofore been known a drive apparatus of a vehicle including a differential mechanism through which an output of a drive power source, such as an engine or the like, is distributed to a first electric motor and an output member, and a second electric motor disposed between the output member and drive wheels. Such drive apparatus for a hybrid vehicle is disclosed for example in Patent Publication 1. The drive apparatus includes a differential mechanism being comprised of a planetary gear unit i.e., gear set and performing as the differential action for mechanically transmitting a major part of power outputted from the engine to drive wheels. A remaining part of power from the engine is electrically transmitted from the first electric motor to the second electric motor using an electrical path.

Thus, the drive apparatus operates as a transmission of which shifting ratio i.e., gear ratio is electrically changed, for example as an electrically controlled continuously variable transmission. The drive apparatus is controlled by the control device so that the vehicle runs i.e., is driven with the optimum operation state of the engine, thus improving fuel consumption, i.e., mileage.

Patent Publication 1: JP 2003-301731

In general, the continuously variable transmission has heretofore been known as a device for improving fuel consumption of a vehicle. A gear type power transmitting device such as a step variable automatic transmission has heretofore been known as a device having high transmitting efficiency. However, no power transmitting mechanism having such combined advantages has been put into practical use yet. For instance, the hybrid vehicle drive apparatus, disclosed in the above Patent Publication 1, includes the electrical path through which electric energy is transmitted from the first electric motor to the second electric motor, that is, a transmitting path through which a part of the vehicle drive force is transmitted in the form of electric energy. This inevitably causes the first electric motor to be made large-size with an increase in an output of the engine. Also, the second electric motor, driven with electric energy output from the first electric motor, is caused to increase in size. Thus, an issue arises with the occurrence of an increase in size of the drive apparatus.

Alternately, the part of the engine output is transmitted to the driving wheel after converted to the electric energy once, which may worsen the mileage depending on the vehicle running condition such as the high speed running i.e., driving. Similar problem may occur when the above power distributing mechanism is used as the continuously variable machine called the electrically controlled CVT in which the shifting ratio is electrically changed.

With the drive apparatus for hybrid vehicle disclosed in Patent Publication 1, further, there has heretofore been known a transmission incorporated in a power transmitting path between an output member of a differential mechanism (electrically controlled continuously variable shifting transmission) and drive wheels with a view to minimizing a required capacity of the second electric motor to meet a need for increasing drive torque. With such a drive apparatus for vehicle, an output of a drive power source is transferred to the drive wheels via two shifting mechanisms including the electrically controlled continuously variable shifting transmission and the transmission, while permitting the drive apparatus to establish a total gear ratio based on respective gear ratios of the shifting mechanisms.

When this takes place, if the transmission executes the shifting, then, a need arises to execute the control of the continuously variable transmission with such a shifting. This causes likelihood of the transmission and the continuously variable transmission complicated in control, unlike the transmission and the continuously variable transmission are provided independently for respective controls, resulting in the occurrence of shifting shocks.

As one example of the transmission, a step variable automatic transmission (hereinafter referred to as "step variable transmission") has been known including a engaging device for selectively engaging plural sets of rotary elements of a planetary gear set to be alternatively switched to plural gear positions such as a forward 4th-gear, a forward 5th-gear and a forward 6th-gear, etc. With such a step variable transmission, an engaging pressure of the engaging device is controlled during a shifting so as to suppress the shifting shocks. However, the engaging pressure of the engaging device needs to be controlled in conjunction with a control of the continuously variable transmission during the shifting of the step variable transmission. Accordingly, there has been likelihood of the transmission and the continuously variable transmission more complicated in control than that independently executed by the step variable transmission, resulting in the occurrence of shifting shocks.

Further, with a vehicle drive apparatus having a transmission provided in a power transmitting path between an output member of a differential mechanism and drive wheels with a view to addressing the issues of the drive apparatus for hybrid vehicle described above, likewise, there has been a probability of shifting shocks being caused to occur.

With the drive apparatus for hybrid vehicle described above, further, there has been well known a type in which the transmission is provided in the power transmitting path between the output member of the differential mechanism (electrically controlled continuously variable shifting transmission) and the drive wheels. With the drive apparatus for hybrid vehicle of such a type, for instance, a step variable transmission is disposed in the power transmitting path between the output member of the differential mechanism and the drive wheels with a view to decreasing a required capacity of a second electric motor when increasing drive torque is demanded for thereby miniaturizing the second electric motor.

With the step variable transmission structured to switch the gear positions i.e., shift position upon engaging and disengaging the engaging device, in general, respective engaging pressures of an on-disengaging side engaging device and an on-engaging side engaging device are uniformly set depending on engine torque. This is because a balance is provided between the suppression of the shifting shocks and the shortening of the shifting time in consideration of durability or the like of the engaging devices. Alternately, the engaging pressures are learned based on an input rotation speed applied to the step variable transmission during the shifting thereof. The input rotation speed varies at a predetermined rate so as to provide the balance between the suppression of the shifting shocks and the shortening of the shifting time, in consideration of durability or the like of the engaging devices.

Further, the differential mechanism performs a differential action enabling a first electric motor and/or a second electric motor to be used for controlling the engine rotation speed at an arbitrary rotation speed regardless of, for instance, a rotation speed of an output shaft, and controlling the rotation speed of the output shaft at an arbitrary rotation speed regardless of the engine rotation speed.

With the drive apparatus having the two shifting mechanisms such as the differential mechanism and the step variable transmission, as the step variable transmission executes the shifting, the continuously variable transmission may be controlled in conjunction with such a shifting being executed. In this case, unlike a structure in which the transmission is independently provided with a learning control performed for learning the engaging pressure of the engaging device associated with the shifting, there has been likelihood of such a learning being complicated. In other words, like the structure in which the transmission is independently provided, if the engaging pressure of the engaging device, associated with the shifting, is uniformly learned and controlled, there has been a provability of a difficulty encountered in accurately obtaining a learning result.

The present invention has been completed with the above view in mind and has an object to provide a control device for use in a vehicle drive apparatus, having a differential mechanism operative to perform a differential action for distributing an output of an engine to a first electric motor and an output shaft and an electric motor disposed in a power transmitting path between the differential mechanism and drive wheels, which can miniaturize the drive apparatus or achieve improved fuel consumption while enabling the suppression of shifting shocks.

Further, it is another object of the present invention to provide a control device for a vehicle drive apparatus, having a differential mechanism operative to perform a differential action for distributing an output of an engine to a first electric motor and an output shaft, an electric motor disposed in a power transmitting path between the differential mechanism and drive wheels, and a transmission forming part of the power transmitting path, which enables an accurately learning of a engaging pressure of a engaging device associated with a shifting of the transmission.

DISCLOSURE OF INVENTION

According to the invention recited in claim 1, a control device for a vehicle drive apparatus, having (a) an engine, a continuously variable shifting portion including a differential mechanism for distributing an output of the engine to a first electric motor and a transmitting member and a second electric motor disposed in a power transmitting path between the power transmitting member and drive wheels, to be operative as an electrically controlled continuously variable shifting portion, and a shifting portion forming a part of the power transmitting path, to be operative to engage or disengage an engaging device for thereby executing a shifting, comprises: (b) a differential state switching device disposed in the differential mechanism and operative to selectively switch the continuously variable shifting portion in a continuously variable shifting state available to perform an electrically controlled continuously variable shifting operation and a non-continuously variable shifting state disenabling the electrically controlled continuously variable shifting operation; and (c) engaging control variable control means or engaging control variable control portion for controlling the engaging device for the shifting of the shifting portion, and altering a learning method of a control variable i.e., control amount of the engaging device based on whether or not the continuously variable shifting portion is placed in the continuously variable shifting state.

With such a structure, the differential state switching device allows the continuously variable shifting portion of the vehicle drive apparatus to be selectively switched in the continuously variable shifting state available to perform the electrically controlled continuously variable shifting operation, and the non-continuously variable shifting state, i.e., a step variable shifting state, disenabling the electrically controlled continuously variable shifting operation. This results in capability of obtaining the drive apparatus with combined advantages of a fuel saving effect of the transmission in which a gear ratio is electrically changed and a high transmitting efficiency of a gear-type power transmitting device in which a drive power is mechanically transferred. For instance, in a normal output region of the engine where the vehicle runs at a low/medium speed and low/medium output, placing the continuously variable shifting portion in the continuously variable shifting state ensures the vehicle to have fuel economy performance.

During the running of the vehicle at a high speed, in contrast, the continuously variable shifting portion is placed in the non-continuously variable shifting state for the engine output to be transmitted mainly through the mechanical transmitting path to the drive wheels. This suppresses a loss in conversion efficiency between a drive power and electric energy occurring when the continuously variable shifting portion is rendered operative to electrically change the gear ratio, resulting in improved fuel consumption. Further, for instance, as the continuously variable shifting portion is placed in the non-continuously variable shifting state in the high output region of the engine, the transmission is rendered operative to electrically change the gear ratio in regions where the vehicle runs at the low/medium speed and low/medium output. This minimizes a maximal value of electric energy to be generated by the electric motor, resulting in a further miniaturization of the electric motor or the vehicle drive apparatus including such an electric motor.

With the vehicle drive apparatus including the continuously variable shifting portion structured to be switched to the continuously variable shifting state and the non-continuously variable shifting state, furthermore, the engaging control variable control means controls the engaging device for the transmission to perform the shifting and alters the method of learning the control variable of the engaging device based on whether or not the continuously variable shifting portion is placed in the continuously variable shifting state.

Thus, the shifting portion performs the shifting in accordance with the control variable of the engaging device depending on the continuously variable shifting state and non-continuously variable shifting state of the continuously variable shifting portion. In the continuously variable shifting state, the electrically controlled continuously variable shifting operation changes the engine rotation speed, regardless of the rotation speed of the transmitting member uniquely determined with a vehicle speed and a gear ratio of the shifting portion during shifting action of the shifting portion. In the non-continuously variable shifting state, an inertia further increases with the variation in engine rotation speed than that occurring in the continuously variable shifting state, during the shifting action of the shifting portion. Thus, the occurrence of the shifting shocks is suppressed.

According to the invention recited in claim 2, a control device for a vehicle drive apparatus, having (a) an engine, a continuously variable shifting portion including a differential mechanism for distributing an output of the engine to a first electric motor and a transmitting member and a second electric motor disposed in a power transmitting path between the power transmitting member and drive wheels, to be operative as an electrically controlled continuously variable shifting portion, and a shifting portion forming a part of the power transmitting path and operative to engage or disengage an engaging device for thereby executing a shifting, comprises: (b) a differential state switching device disposed in the differential mechanism and operative to selectively switch the continuously variable shifting portion in a continuously variable shifting state available to perform an electrically controlled continuously variable shifting operation and a non-continuously variable shifting state disenabling the electrically controlled continuously variable shifting operation; and (c) engaging control variable control means or engaging control variable control portion for controlling the engaging device for the shifting of the shifting portion, and classifying a learned value of the control variable i.e., control amount of the engaging device based on whether or not the continuously variable shifting portion is placed in the continuously variable shifting state.

With such a structure, the differential state switching device allows the continuously variable shifting portion of the vehicle drive apparatus to be selectively switched in the continuously variable shifting state available to perform the electrically controlled continuously variable shifting operation, and the non-continuously variable shifting state, i.e., a step variable shifting state, disenabling the electrically controlled continuously variable shifting operation. This results in capability of obtaining the drive apparatus with combined advantages of a fuel saving effect of the transmission in which a gear ratio is electrically changed and a high transmitting efficiency of a gear-type power transmitting device in which a drive power is mechanically transferred. For instance, in a normal output region of the engine where the vehicle runs at a low/medium speed and low/medium output, placing the continuously variable shifting portion in the continuously variable shifting state ensures the vehicle to have fuel economy performance.

During the running of the vehicle at a high speed, in contrast, the continuously variable shifting portion is placed in the non-continuously variable shifting state for the engine output to be transmitted mainly through the mechanical transmitting path to the drive wheels. This suppresses a loss in conversion efficiency between a drive power and electric energy occurring when the continuously variable shifting portion is rendered operative to electrically change the gear ratio, resulting in improved fuel consumption. Further, for instance, as the continuously variable shifting portion is placed in the non-continuously variable shifting state in the high output region of the engine, the transmission is rendered operative to electrically change the gear ratio in regions where the vehicle runs at the low/medium speed and low/medium output. This minimizes a maximal value of electric energy to be generated by the electric motor, resulting in a further miniaturization of the electric motor or the vehicle drive apparatus including such an electric motor.

With the vehicle drive apparatus including the continuously variable shifting portion structured to be switched to the continuously variable shifting state and the non-continuously variable shifting state, furthermore, the engaging control variable control means controls the engaging device for the transmission to perform the shifting and classify the learned value of the control variable of the engaging device based on whether or not the continuously variable shifting portion is placed in the continuously variable shifting state.

Thus, the shifting portion performs the shifting in accordance with the learned value of the control variable of the engaging device depending on the continuously variable shifting state and non-continuously variable shifting state of the continuously variable shifting portion. In the continuously variable shifting state, the electrically controlled continuously variable shifting operation changes the engine rotation speed, regardless of the rotation speed of the transmitting member uniquely determined with a vehicle speed and a gear ratio of the shifting portion during shifting action of the shifting portion. In the non-continuously variable shifting state, an inertia further increases with the variation in engine rotation speed than that occurring in the continuously variable shifting state, during the shifting action of the shifting portion. Thus, the occurrence of the shifting shocks is suppressed.

According to the invention recited in claim 3, a control device for a vehicle drive apparatus, having (a) an engine, a continuously variable shifting portion including a differential mechanism for distributing an output of the engine to a first electric motor and a transmitting member and a second electric motor disposed in a power transmitting path between the power transmitting member and drive wheels, to be operative as an electrically controlled continuously variable shifting portion, and a shifting portion forming part of the power transmitting path and operative to engage or disengage a engaging device for thereby executing a shifting, comprises: (b) a differential state switching device disposed in the differential mechanism and operative to selectively switch the continuously variable shifting portion in a continuously variable shifting state available to perform an electrically controlled continuously variable shifting and a non-continuously variable shifting state disenabling the electrically controlled continuously variable shifting; and (c) engaging control variable control means for controlling the engaging device for the shifting of the shifting portion, and operative, when the continuously variable shifting portion is placed in the continuously variable shifting state, to alter a learning method of the control variable of the engaging device depending on a shifting for a total gear ratio, established with the continuously variable shifting portion and the shifting portion, to be continuously varied or a shifting for the total gear ratio to be non-continuously varied.

With such a structure, the differential state switching device allows the continuously variable shifting portion of the vehicle drive apparatus to be selectively switched in the continuously variable shifting state available to perform the electrically controlled continuously variable shifting operation, and the non-continuously variable shifting state, i.e., a step variable shifting state, disenabling the electrically controlled continuously variable shifting operation. This results in capability of obtaining the drive apparatus with combined advantages of a fuel saving effect of the transmission in which a gear ratio is electrically changed and a high transmitting efficiency of a gear-type power transmitting device in which a drive power is mechanically transferred. For instance, in a normal output region of the engine where the vehicle runs at a low/medium speed and low/medium output, placing the continuously variable shifting portion in the continuously variable shifting state ensures the vehicle to have fuel economy performance.

During the running of the vehicle at a high speed, in contrast, the continuously variable shifting portion is placed in the non-continuously variable shifting state for the engine output to be transmitted mainly through the mechanical transmitting path to the drive wheels. This suppresses a loss in conversion efficiency between a drive power and electric energy occurring when the continuously variable shifting portion is rendered operative to electrically change the gear ratio, resulting in improved fuel consumption. Further, for instance, as the continuously variable shifting portion is placed in the non-continuously variable shifting state in the high output region of the engine, the transmission is rendered operative to electrically change the gear ratio in regions where the vehicle runs at the low/medium speed and low/medium output. This minimizes a maximal value of electric energy to be generated by the electric motor, resulting in a further miniaturization of the electric motor or the vehicle drive apparatus including such an electric motor.

With the vehicle drive apparatus having the continuously variable shifting portion structured to be switched to the continuously variable shifting state and the non-continuously variable shifting state, the engaging control variable control means is operative to control the engaging device for the shifting portion to perform the shifting. The engaging control variable control means is operative, when the continuously variable shifting portion is placed in the continuously variable shifting state, to alter the method of learning the control variable of the engaging device depending on the shifting to be executed for continuously varying the total gear ratio or the shifting to be executed for non-continuously varying the total gear ratio. The total gear ratio is established with the continuously variable shifting portion and the transmission.

With such a structure, the shifting portion performs the shifting in conjunction with the control variable of the engaging device depending on the shifting for the total gear ratio to be continuously varied for suppressing the variation in engine rotation speed during the shifting of the transmission, and the shifting for the total gear ratio to be non-continuously varied with the variation in engine rotation speed during the shifting of the transmission. That is, the shifting portion performs the shifting in accordance with the control variable of the engaging device depending on the shifting for the total gear ratio to be continuously varied with a probability of the occurrence of inertia torque in different magnitudes during the shifting of the shifting portion, and the shifting for the total gear ratio to be non-continuously varied, thereby suppressing the shifting shocks.

According to the invention recited in claim 4, a control device for a vehicle drive apparatus, having (a) an engine, a continuously variable shifting portion including a differential mechanism for distributing an output of the engine to a first electric motor and a transmitting member and a second electric motor disposed in a power transmitting path between the power transmitting member and drive wheels, to be operative as an electrically controlled continuously variable shifting portion, and a shifting portion forming a part of the power transmitting path to engage or disengage an engaging device for thereby executing a shifting, comprises: (b) a differential state switching device disposed in the differential mechanism and operative to selectively switch the continuously variable shifting portion in a continuously variable shifting state available to perform an electrically controlled continuously variable shifting and a non-continuously variable shifting state for disenabling the electrically controlled continuously variable shifting; and (c) engaging control variable control means or engaging control variable control portion for controlling the engaging device for the shifting portion to perform the shifting, and operative, when the continuously variable shifting portion is placed in the continuously variable shifting state, to classify i.e., distinguish a learned value of the engaging device depending a shifting for a total gear ratio, established with the continuously variable shifting portion and the shifting portion, to be continuously varied or a shifting for the total gear ratio to be non-continuously varied.

With such a structure, the differential state switching device allows the continuously variable shifting portion of the vehicle drive apparatus to be selectively switched in the continuously variable shifting state available to perform the electrically controlled continuously variable shifting operation, and the non-continuously variable shifting state, i.e., a step variable shifting state, disenabling the electrically controlled continuously variable shifting operation. This results in capability of obtaining the drive apparatus with combined advantages of a fuel saving effect of the transmission in which a gear ratio is electrically changed and a high transmitting efficiency of a gear-type power transmitting device in which a drive power is mechanically transferred. For instance, in a normal output region of the engine where the vehicle runs at a low/medium speed and low/medium output, placing the continuously variable shifting portion in the continuously variable shifting state ensures the vehicle to have fuel economy performance.

During the running of the vehicle at a high speed, in contrast, the continuously variable shifting portion is placed in the non-continuously variable shifting state for the engine output to be transmitted mainly through the mechanical transmitting path to the drive wheels. This suppresses a loss in conversion efficiency between a drive power and electric energy occurring when the continuously variable shifting portion is rendered operative to electrically change the gear ratio, resulting in improved fuel consumption. Further, for instance, as the continuously variable shifting portion is placed in the non-continuously variable shifting state in the high output region of the engine, the transmission is rendered operative to electrically change the gear ratio in regions where the vehicle runs at the low/medium speed and low/medium output. This minimizes a maximal value of electric energy to be generated by the electric motor, resulting in a further miniaturization of the electric motor or the vehicle drive apparatus including such an electric motor.

With the vehicle drive apparatus having the continuously variable shifting portion structured to be switched to the continuously variable shifting state and the non-continuously variable shifting state, the engaging control variable control means is operative to control the engaging device for the shifting portion to perform the shifting. The engaging control variable control means is operative, when the continuously variable shifting portion is placed in the continuously variable shifting state, to alter the method of learning the control variable of the engaging device depending on the shifting to be executed for continuously varying the total gear ratio or the shifting to be executed for non-continuously varying the total gear ratio. The total gear ratio is established with the continuously variable shifting portion and the transmission.

With such a structure, the shifting portion performs the shifting in conjunction with the control variable of the engaging device depending on the shifting for the total gear ratio to be continuously varied for suppressing the variation in engine rotation speed during the shifting of the transmission, and the shifting for the total gear ratio to be non-continuously varied with the variation in engine rotation speed during the shifting of the transmission. That is, the shifting portion performs the shifting in accordance with the control variable of the engaging device depending on the shifting for the total gear ratio to be continuously varied with a probability of the occurrence of inertia torque in different magnitudes during the shifting of the shifting portion, and the shifting for the total gear ratio to be non-continuously varied, thereby suppressing the shifting shocks.

According to the invention recited in claim 5, engaging control variable control means learns the control variable of the engaging device so that the rotation speed of the transmitting member has a predetermined variable.

With such learning, the rotation speed of the transmitting member is set in the predetermined changeable state, for example the change rate depending on the continuously variable shifting state and non-continuously variable shifting state of the continuously variable shifting portion. In the continuously variable shifting state, the electrically controlled continuously variable shifting operation changes the engine rotation speed, regardless of the rotation speed of the transmitting member uniquely determined with a vehicle speed and a gear ratio of the shifting portion during shifting action of the shifting portion. In the non-continuously variable shifting state, an inertia further increases with the variation in engine rotation speed than that occurring in the continuously variable shifting state, during the shifting action of the shifting portion.

In the predetermined changeable state of the transmitting member, both the rapid shifting response in which the change rate of rotation speed of the transmitting member is large for obtaining the good feeling, and slow shifting response of the same in which the shifting shock can be easily suppressed, are satisfied. Thus, the occurrence of the shifting shocks is suppressed.

Alternately, the shifting is executed so as to achieve a given varying state, i.e., for instance, a given varying rate to provide a balance between two shifting responses depending on the shifting for the total gear ratio to be continuously varied during the shifting of the shifting portion, enabling the suppression of the variation in engine rotation speed, or the shifting for the total gear ratio to be non-continuously varied with the variation in engine rotation speed during the shifting of the shifting portion, enabling a further suppression of the shifting shocks.

The expression "depending on the shifting" refers to the meaning that the control is executed depending on the shifting for the total gear ratio to be continuously varied with the probability of inertia torque occurring during the shifting of the transmission in different magnitudes, and the shifting for the total gear ratio to be non-continuously varied. The first shifting response is a rapid response in which the rotation speed of the transmitting member has an increased varying rate regarded to obtain, for instance, a comfortable feeling. The second shifting response is a slow response in which the rotation speed of the transmitting member has a small varying rate regarded to provide, for instance, an ease of suppressing the shifting shocks.

Preferably, as recited in claim 6, the engaging control variable control means learns an unlearned control variable of the engaging device, appearing when the continuously variable shifting portion is placed in the continuously variable shifting state, based on a control variable of a engaging device that is learned when the continuously variable shifting portion is placed in the non-continuously variable shifting state. Alternately, the engaging control variable control learns the unlearned control variable of the engaging device, appearing when the continuously variable shifting portion is placed in the non-continuously variable shifting state, based on the learned control variable of the engaging device appearing when the continuously variable shifting portion is placed in the continuously variable shifting state.

With such a control, the unlearned control variable of the engaging device enables a reduction in the frequency of executing the shifting of the transmission, enabling a further suppression of the shifting shocks.

Preferably as recited in claim 7, the engaging control variable control means learns an unlearned control variable of the engaging device, appearing when the continuously variable shifting portion is placed in the continuously variable shifting state with the shifting executed for the total gear ratio to be continuously varied, based on a learned control variable of the engaging device with the continuously variable shifting portion placed in the continuously variable shifting state for the total gear ratio to be non-continuously varied.

Alternately, the engaging control variable control learns the unlearned control variable of the engaging device, appearing when the continuously variable shifting portion is placed in the continuously variable shifting state with the shifting executed for the total gear ratio to be non-continuously varied, based on the learned control variable of the engaging device appearing when the continuously variable shifting portion is placed in the continuously variable shifting state with the shifting executed for the total gear ratio to be continuously varied.

With such a control, the unlearned control variable of the engaging device enables a reduction in the frequency of executing the shifting of the shifting portion, enabling a further suppression of the shifting shocks.

The invention recited in claim 8 is further featured by rotation control means or rotation control portion for varying a rotation speed of the transmitting member using the first electric motor and/or the second electric motor so as to allow the rotation speed of the transmitting member to achieve a given variation during the shifting of the shifting portion. With the rotation control means operated for the rotation speed of the transmitting member to be varied, the engaging control variable control means inhibits the learning on the control variable of the engaging device.

This inhibits the learning based on the control variable of the engaging device when the rotation control means varies the rotation speed of the transmitting member. This results in the suppression of the shifting shocks when the rotation control means does not vary the rotation speed of the transmitting member.

The invention recited in claim 9 is further characterized by rotation control means or rotation control portion for varying a rotation speed of the transmitting member using the first electric motor and/or the second electric motor so as to allow the rotation speed of the transmitting member to achieve a given variation during the shifting of the shifting portion. With the rotation control means operated for the rotation speed of the transmitting member to be varied, the engaging control variable control means learns the control variable of the engaging device in consideration of a variation in the rotation speed of the transmitting member.

With such a control, the control variable of the engaging device is learned upon subtracting a shifting shock suppressing effect caused by the variation in the rotation speed of the transmitting member effectuated by the rotation control means, thereby suppressing the occurrence of shifting shocks when the rotation control means does not vary the rotation speed of the transmitting member.

According to the invention recited in claim 10, a control device for a vehicle drive apparatus, having (a) a continuously variable shifting portion including a differential mechanism for distributing an output of an engine to a first electric motor and a transmitting member and a second electric motor disposed in a power transmitting path between the power transmitting member and drive wheels, to be operative as an electrically controlled continuously variable shifting portion, and a shifting portion forming a part of the power transmitting path and operative to engage or disengage an engaging device for thereby executing a shifting, comprises: (b) rotation control means or rotation control portion for varying an input rotation speed of the shifting portion during the shifting thereof using the first electric motor and/or the second electric motor; and (c) engaging pressure control means or engaging pressure control portion for controlling an engaging pressure of the engaging device for the shifting of the shifting portion, and altering a learning method of the engaging pressure of the engaging device based on whether or not the rotation control means varies the input rotation speed of the shifting portion.

With such a structure, the engaging pressure control means controls the engaging pressure of the engaging device for the shifting portion to perform the shifting. Further, the engaging pressure control means alters the method of learning the engaging pressure of the engaging device based on whether or not the rotation control means, enabling the variation in input rotation speed of the shifting portion, varies the input rotation speed of the transmission during the shifting of the shifting portion using the first electric motor and/or the second electric motor. This allows the variation in the input rotation speed of the transmission during the shifting thereof to be classified in two cases: one for a case of the input rotation speed of the transmission being varied by the rotation control means; and the other for a case of the input rotation speed being varied due to the engaging pressure of the engaging device mainly associated with the shifting of the transmission. Thus, the engaging pressure of the engaging device, associated with the shifting of the transmission, can be accurately learned.

According to the invention recited in claim 11, a control device for a vehicle drive apparatus, having (a) a continuously variable shifting portion including a differential mechanism for distributing an output of an engine to a first electric motor and a transmitting member and a second electric motor disposed in a power transmitting path between the power transmitting member and drive wheels and operative to perform an electrically controlled continuously variable shifting portion, and a shifting portion forming a part of the power transmitting path and operative to engage or disengage an engaging device for thereby executing a shifting, comprises: (b) rotation control means or rotation control portion for varying an input rotation speed of the shifting portion during the shifting thereof using the first electric motor and/or the second electric motor; and (c) engaging pressure control means or engaging pressure control portion for controlling an engaging pressure of the engaging device for the shifting portion to perform the shifting, and inhibiting learning of the engaging pressure of the engaging device when the rotation control means varies the input rotation speed of the shifting portion.

With such a structure, the engaging pressure control means controls the engaging pressure of the engaging device for the shifting portion to perform the shifting. Further, if the rotation control means varies the input rotation speed of the shifting portion during the shifting of the shifting portion using the first electric motor and/or the second electric motor, the learning on the engaging pressure of the engaging device is inhibited. This allows the learning to be executed only in a case where the variation in the input rotation speed of the shifting portion during the shifting thereof does not involve the variation in input rotation speed of the shifting portion effectuated by the rotation control means, enabling the engaging pressure of the engaging device, associated with the shifting of the shifting portion, to be accurately learned. In addition, the learning control can be simplified.

According to the invention recited in claim 12, a control device for a vehicle drive apparatus, having (a) a continuously variable shifting portion including a differential mechanism for distributing an output of an engine to a first electric motor and a transmitting member and a second electric motor disposed in a power transmitting path between the power transmitting member and drive wheels and operative to perform an electrically controlled continuously variable shifting portion, and a shifting portion forming a part of the power transmitting path and operative to engage or disengage an engaging device for thereby executing a shifting, comprises: (b) rotation control means or rotation control portion for varying an input rotation speed of the shifting portion during the shifting thereof using the first electric motor and/or the second electric motor; and (c) engaging pressure control means or engaging pressure control portion for controlling an engaging pressure of the engaging device for the shifting portion to perform the shifting, and correcting a learned value on the engaging pressure of the engaging device based on a control variable of the input rotation speed effectuated by the rotation control means when the rotation control means varies the input rotation speed of the shifting portion.

With such a structure, the engaging pressure control means controls the engaging pressure of the engaging device for the shifting portion to perform the shifting. Further, if the rotation control means, for varying the input rotation speed of the shifting portion, varies the input rotation speed of the shifting portion during the shifting of the shifting portion using the first electric motor and/or the second electric motor, the learned value on the engaging pressure of the engaging device is corrected based on a variable of the input rotation speed effectuated by the rotation control means. Therefore, even if the rotation control means varies the input rotation speed of the shifting portion in addition to a case where the input rotation speed of the shifting portion is caused to vary due to the engaging pressure of the engaging device mainly associated with the shifting of the shifting portion, the engaging pressure of the engaging device, associated with the shifting of the shifting portion, can be accurately learned.

According to the invention recited in claim 13, a control device for a vehicle drive apparatus, having (a) a differential portion including a differential mechanism for distributing an output of an engine to a first electric motor and a transmitting member and a second electric motor disposed in a power transmitting path between the power transmitting member and drive wheels, and a shifting a part forming a part of the power transmitting path and operative to engage or disengage an engaging device for thereby executing a shifting, comprises: (b) rotation control means or rotation control portion for varying an input rotation speed of the shifting portion during the shifting of the shifting portion using the first electric motor and/or the second electric motor; and (c) engaging pressure control means or engaging pressure control portion for controlling an engaging pressure of the engaging device for the shifting portion to perform the shifting, and altering the learning method of the engaging pressure of the engaging device based on whether or not the rotation control means varies the input rotation speed of the shifting portion.

With such a structure, the engaging pressure control means controls the engaging pressure of the engaging device for the transmission to perform the shifting. Further, the method of learning the engaging pressure of the engaging device is altered based on whether or not the rotation control means, varying the input rotation speed of the shifting portion during the shifting thereof using the first electric motor and/or the second electric motor, causes the variation in input rotation speed of the shifting portion.

This allows the variation in input rotation speed of the transmission during the shifting thereof to be classified in two cases: one for a case of the input rotation speed of the shifting portion being varied by the rotation control means; and the other for a case of the input rotation speed being varied due to the engaging pressure of the engaging device mainly associated with the shifting of the shifting portion. Thus, the engaging pressure of the engaging device, associated with the shifting of the transmission, can be accurately learned.

According to the invention recited in claim 14, a control device for a vehicle drive apparatus, having (a) a differential portion including a differential mechanism for distributing an output of an engine to a first electric motor and a transmitting member and a second electric motor disposed in a power transmitting path between the power transmitting member and drive wheels and operative to perform an electrically controlled continuously variable shifting portion, and a shifting portion forming a part of the power transmitting path and operative to engage or disengage an engaging device for thereby executing a shifting, comprises: (b) rotation control means or rotation control portion for varying an input rotation speed of the shifting portion during the shifting thereof using the first electric motor and/or the second electric motor; and (c) engaging pressure control means or engaging pressure control portion for controlling an engaging pressure of the engaging device for the shifting portion to perform the shifting and inhibiting learning the engaging pressure of the engaging device when the rotation control means varies the input rotation speed of the shifting portion.

With such a structure, the engaging pressure control means controls the engaging pressure of the engaging device for the shifting portion to perform the shifting. Further, if the rotation control means varies the input rotation speed of the shifting portion during the shifting of the shifting portion using the first electric motor and/or the second electric motor, the learning on the engaging pressure of the engaging device is inhibited. This allows the learning to be executed only in a case where the variation in the input rotation speed of the shifting portion during the shifting thereof does not involve the variation in input rotation speed of the shifting portion effectuated by the rotation control means, enabling the engaging pressure of the engaging device, associated with the shifting of the shifting portion, to be accurately learned. In addition, the learning control can be simplified.

According to the invention recited in claim 15, a control device for a vehicle drive apparatus, having (a) a differential portion including a differential mechanism for distributing an output of an engine to a first electric motor and a transmitting member and a second electric motor disposed in a power transmitting path between the power transmitting member and drive wheels and operative to perform an electrically controlled continuously variable shifting portion, and a shifting portion forming a part of the power transmitting path and operative to engage or disengage an engaging device for thereby executing a shifting, comprises: (b) rotation control means or rotation control portion for varying an input rotation speed of the shifting portion during the shifting thereof using the first electric motor and/or the second electric motor; and (c) engaging pressure control means or engaging pressure control portion for controlling an engaging pressure of the engaging device for the shifting portion to perform the shifting, and correcting a learned value on the engaging pressure of the engaging device when the rotation control means varies the input rotation speed of the shifting portion.

With such a structure, the engaging pressure control means controls the engaging pressure of the engaging device for the shifting portion to perform the shifting. Further, if the rotation control means, for varying the input rotation speed of the shifting portion, varies the input rotation speed of the shifting portion during the shifting of the shifting portion using the first electric motor and/or the second electric motor, the learned value on the engaging pressure of the engaging device is corrected. Therefore, even if the rotation control means varies the input rotation speed of the shifting portion in addition to a case where the input rotation speed of the shifting portion is caused to vary due to the engaging pressure of the engaging device mainly associated with the shifting of the shifting portion, the engaging pressure of the engaging device, associated with the shifting of the shifting portion, can be accurately learned.

Preferably as recited in claim 16, the rotation control means controls the input rotation speed of the shifting portion and/or the engine rotation speed during the shifting of the shifting portion, using the first electric motor and/or the second electric motor, so as to allow these factors to achieve given states. With such a structure, the input rotation speed of the shifting portion can achieve the given varying state, i.e., for instance, given varying rates in shifting responses to provide a balance between, firstly, a rapid shifting response for the input rotation speed to have an increased varying rate regarded to obtain, for instance, a comfortable feeling and, secondly, a slow response for the input rotation speed to have a decreased varying rate regarded to provide, for instance, an ease of suppressing the shifting shocks.

This results in the suppression of the shifting shocks. Alternately, for the purpose of allowing the total gear ratio, defined with the continuously variable shifting portion (or the differential portion) and the shifting portion, to be continuously varied to cause a whole of the drive apparatus to function as the continuously variable shifting portion, the operation is executed to attain a given state so as interrupt the variation in the engine rotation speed on a stage before and after the shifting, thereby enabling the suppression of shifting shocks while improving the fuel consumption.

Preferably as recited in claim 17, the engaging pressure control means learns the engaging pressure of the engaging device so as to allow the input rotation speed of the shifting portion to achieve the given varying state during the shifting of the shifting portion. With such a structure, the input rotation speed of the shifting portion is caused to vary in a given state, i.e., in a given varying rate to provide a balance between a rapid shifting response for varying the input rotation speed at an increased varying rate regarded to obtain for instance a comfortable feeling, and a slow response for varying the input rotation speed at a decreased varying rate regarded to provide for instance an ease of suppressing the shifting shocks. This suppresses the occurrence of shifting shocks. Further, as the input rotation speed of the shifting portion is varied in the given state using the first electric motor and/or the second electric motor, the occurrence of the shifting shocks is further suppressed.

Preferably as recited in claim 18, the rotation control means varies the input rotation speed of the transmission in a given varying rate using the first electric motor and/or the second electric motor. Such a variation enables a further suppression of the occurrence of shifting shocks.

Preferably as recited in claim 19, the rotation control means compels the engine rotation speed not to vary on a stage before and after the shifting of the shifting portion using the first electric motor. With such a structure, the total gear ratio, established with the continuously variable shifting portion (or the differential portion) and the shifting portion, could be continuously varied. This results in a further suppression of the shifting shocks and further improvement in fuel consumption as those attained in a case where the engine rotation speed is caused to vary so as to non-continuously vary the total gear ratio, i.e., in a stepwise variation.

Preferably, the differential state switching device causes the continuously variable shifting portion to be placed in the differential state enabling the differential action to be performed, causing the continuously variable shifting portion to be placed in the continuously variable shifting state. In contrast, the continuously variable shifting portion is placed in the non-differential state i.e., the locked state disabling the differential action, causing the continuously variable shifting portion to be placed in the non-continuously shifting state, for example in the step variable shifting state. Thus, the continuously variable shifting portion can be placed in either the continuously variable shifting state or the non-continuously variable shifting state.

Preferably, the shifting portion is a step variable automatic transmission. With the step variable automatic transmission, during the shifting of the shifting portion, the total gear ratio constructed by the gear ratio of the continuously variable shifting portion and the gear ratio of the shifting portion varies stepwise varies quicker than the case when the total gear ratio varies continuously. Accordingly, the entire drive apparatus is caused to function as the continuously variable transmission to vary the drive torque smoothly, and it is caused to function to vary the gear ration stepwise for obtaining the drive torque rapidly. Also, in the continuously variable shifting state of the continuously variable shifting portion, the continuously variable shifting portion and the shifting portion construct the continuously variable transmission, while in the non-continuously variable shifting state of the same, the continuously variable shifting portion and the shifting portion construct the step variable transmission.

Preferably, the differential mechanism includes a first element connected to the engine, a second element connected to the first electric motor, and a third element connected to the transmitting member. The differential state switching means operates in one mode to allow the first to third elements to rotate relative to each other for the differential mechanism to be placed in the differential state, and the other mode to allow the first to third elements to rotate in a unitary fashion or to cause the second element to be brought into a non-rotating state for the differential mechanism to be placed in the non-differential state i.e., the locked state. Such arrangement provides a structure for the differential mechanism to be placed in either the differential state or the non-differential state.

Preferably, the differential state switching device includes a clutch, operative to engage at least two of the first to third elements to each other for unitary rotation of these elements, and/or a brake operative to engage the second element to the non-rotating member to lock the second element in the non-rotating state. This allows the differential mechanism to have a structure that can be simply placed in either the differential state or the non-differential state.

Preferably, disengaging of both the clutch and the brake allows the first to third rotary elements of the differential mechanism to rotate relative to each other, which causes the differential mechanism to be placed in the differential state and act as an electrically controlled differential device. Engaging the clutch allows the differential mechanism to act as the transmission providing the gear ratio of "1". Alternatively, engaging the brake allows the differential mechanism to act as the speed-increasing transmission providing the gear ratio less than "1". This allows the differential mechanism to have a structure to be placed in either the differential state or the no-differential state while having the structure of the transmission that has a fixed gear ratio in a single gear position or a multiple-gear position.

Preferably, the differential mechanism is comprised of a planetary gear device. The first element acts as a carrier, the second element acts as a sun gear, and the third element acts as a ring gear, respectively of the planetary gear device. This allows the differential mechanism to have a minimized axial dimension. In addition, the differential mechanism can be formed in a simplified structure with use of the single planetary gear device.

Preferably, the planetary gear device is one of the single-pinion type. With such a structure, the differential mechanism is short in the axial length and can be simply constructed by the single-pinion type planetary gear device.

Preferably, further, the total gear ratio of the vehicle drive apparatus is established based on a gear ratio of the continuously variable shifting portion and a gear ratio of the shifting portion. During such operation, utilizing the gear ratio of the shifting portion enables the drive power to be obtained in a wide range. In addition, this allows the continuously variable shifting portion to have a further increased efficiency in performing continuously variable shifting control. Alternately, with the shifting portion comprised of a reduction speed transmission with a gear ratio less than "1", the second electric motor may suffice to provide low output torque with respect to torque of the output shaft of the shifting portion, enabling the second electric motor to be miniaturized.

Moreover, the continuously variable shifting portion and the shifting portion constitute a continuously variable shifting portion with the continuously variable shifting portion placed in the continuously variable shifting state and the continuously variable shifting portion and the shifting portion constitute a step variable transmission with the continuously variable shifting portion placed in the non-continuously variable shifting state.

More preferably, the vehicle drive apparatus further includes a differential action limiting device incorporated in the differential mechanism for limiting a differential action of the differential mechanism. This restricts the continuously variable shifting portion from acting as an electrically controlled continuously variable shifting transmission. With such a structure, the differential action limiting device does not limit the differential action of the differential mechanism to allow the differential mechanism to be placed in the differential state available to perform the differential action. This enables the continuously variable shifting portion to act as the electrically controlled continuously variable shifting transmission.

Alternately, the differential action limiting device is operative to limit the differential action of the differential mechanism for restricting the operation of the differential mechanism as the electrically controlled continuously variable shifting transmission. Therefore, with the differential mechanism placed in the non-differential state, i.e., for instance, a locked state with no differential action being enabled, the differential mechanism can be placed in the non-continuously variable shifting state, i.e., for instance, a step variable shifting state with no electrically controlled continuously variable shifting operation being enabled. Thus, the drive apparatus can be obtained with a balance between a fuel saving effect of the transmission in which the gear ratio is electrically changed, and a high conversion efficiency of the gear-type power transmitting device in which the drive power is mechanically transferred.

For instance, during the normal output region of the engine under which the vehicle runs at the low/medium speed and low/medium output, if the continuously variable shifting portion is placed in the continuously variable shifting state, the vehicle is ensured to have improved fuel saving performance. During the vehicle running at the high speed, further, the continuously variable shifting portion is placed in the non-continuously variable shifting state. In this case, the output of the engine is transferred to the drive wheels mainly through a mechanical power transmitting path such that the shifting portion is rendered operative to electrically change the gear ratio. This suppresses a loss in conversion efficiency between drive power and electric energy occurring during such an operation, resulting in improved fuel consumption.

In addition, with the continuously variable shifting portion placed in the non-continuously variable shifting state during the running of the vehicle at the high speed, the shifting portion is rendered operative as the shifting portion to electrically change the gear ratio in regions where the vehicle runs at the low/medium speed and low/intermediate output. This enables a reduction in a maximal value of electric energy to be generated by the electric motor, i.e., a maximal value of electric energy to be transferred through the electric motor. This results in a further miniaturization of the electric motor or the vehicle drive apparatus including such an electric motor.

More preferably, the vehicle drive apparatus further includes a differential action limiting device incorporated in the differential mechanism for restricting a differential action of the differential mechanism for thereby limiting the differential action of the differential mechanism. With such a structure, the differential portion, incorporated in the vehicle drive apparatus, is placed in the differential state to be operative to perform the differential action such that no differential action of the differential mechanism is limited by the differential action limiting device and the differential mechanism is placed in the differential state for the differential action to be enabled.

Alternately, the differential action limiting device restricts the differential action of the differential mechanism for limiting the differential action. This causes the differential mechanism to be placed in a non-differential state, i.e., for instance, a locked state with no differential action being enabled. Thus, the differential mechanism can be placed in the non-differential state, i.e., for instance, the locked state in which no differential action is initiated. Thus, a drive apparatus can be obtained with combined benefits between a fuel saving effect of the shifting portion in which the gear ratio is electrically changed and a high conversion efficiency of the gear-type power transmitting device in which the drive power is mechanically transferred.

For instance, during the normal output region of the engine where the vehicle runs at the low/medium speed and low/medium output, if the differential portion is placed in the differential state, the vehicle is ensured to have improved fuel saving performance. During the vehicle running at the high speed, further, if the differential portion is placed in the non-differential state, the output of the engine is transferred to the drive wheels mainly through the mechanical power transmitting path such that the shifting portion is rendered operative to electrically change the gear ratio. This suppresses a loss in conversion efficiency between drive power and electric energy occurring during such an operation, resulting in improved fuel consumption.

In addition, during the running of the vehicle at the high output region of the engine, as the differential portion is placed in the non-differential state, it is rendered operative as the transmission to electrically change the gear ratio in regions where the vehicle runs at the low/medium speed and low/intermediate output. This results in a reduction in a maximal value of electric energy to be generated by the electric motor, i.e., a maximal value of electric energy to be transmitted through the electric motor. This results in a further miniaturization of the electric motor or the vehicle drive apparatus including such an electric motor.

Preferably, further, with the differential action limiting device placing the differential mechanism in the differential state enabling the differential action, the continuously variable shifting portion is placed in the continuously variable shifting state available to perform an electrically controlled continuously variable shifting operation. With the differential mechanism placed in the non-differential state, i.e., locked state with no differential action being enabled to limit the differential action, the continuously variable shifting portion is placed in the non-continuously variable shifting state, i.e., for instance, the step variable shifting state disenabling the electrically controlled continuously variable shifting operation and limited in operation to perform the electrically controlled continuously variable shifting operation. Thus, the continuously variable shifting portion can be switched to the continuously variable shifting state and the non-continuously variable shifting state.

Preferably, further, with the differential action limiting device placing the differential mechanism in the differential state enabling the differential action, the differential portion is placed in the differential state available to perform a differential action. With the differential mechanism placed in the non-differential state, i.e., locked state with no differential action being enabled to limit the differential action, the differential portion is placed in the non-differential state, i.e., for instance, the locked state disenabling the differential action and limited in operation to perform the differential operation. Thus, the differential portion can be switched to the differential state and the non-differential state.

More preferably, the drive apparatus establishes the total gear ratio based on the gear ratio of the differential portion and the gear ratio of the shifting portion. With such an operation, the use of the gear ratio of the shifting portion results in capability of obtaining the drive power in a wide range. Alternately, with the shifting portion including a reduction speed transmission with a gear ratio greater than "1", the second electric motor may suffice to provide a low output torque with respect to that of the output shaft of the shifting portion. This enables the second electric motor to be miniaturized. Moreover, the differential portion and the shifting portion constitute the continuously variable shifting portion with the differential portion placed in the differential state, and the differential portion and the shifting portion constitute the step variable transmission with the differential portion placed in the non-differential state.

The shifting portion is the step variable automatic transmission. With the step variable automatic transmission, the total gear ratio can be stepwise changed with shifting of the shifting portion, capable of being changed quicker than the case where the total gear ratio is continuously changed. Accordingly, the drive apparatus functions as the continuously variable transmission to smoothly change the drive torque and to stepwise change the gear ratio for rapidly obtaining the drive torque.

BRIEF DESCRIPTION OF THE DRAWINGS

FIG. 11 shows one example of hydraulic pressure learned value maps for selecting an engaging pressure of an engaging device for use in a shifting of an automatic shifting portion.

EXPLANATION OF REFERENCES

Figures 1, 2:
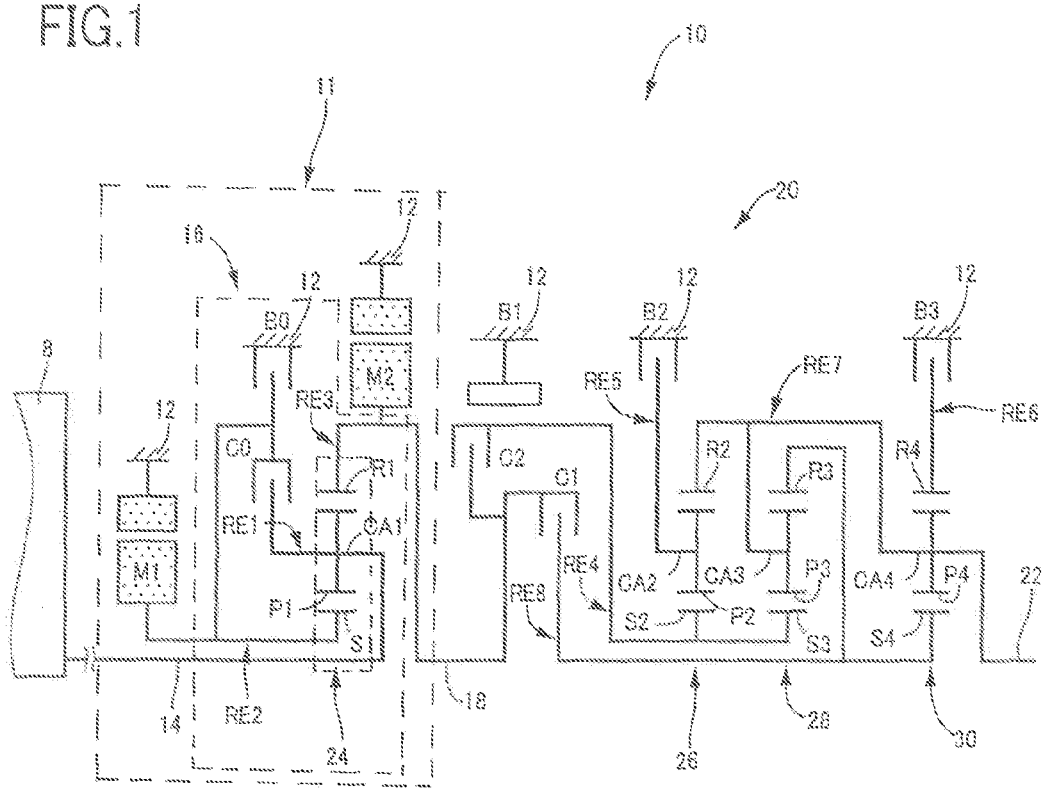
FIG. 1 is a skeleton view explaining a structure of a drive apparatus for hybrid vehicle of one embodiment according to the present invention.
FIG. 2 is an operation Table indicating a relation between a shifting operation of the drive apparatus of the hybrid vehicle of the embodiment shown in FIG. 1 operable in a continuously variable shifting state or a step variable shifting state, and operation combinations of hydraulic-type friction engaging devices used therefor.

8: engine
10, 70: shifting mechanism (drive apparatus)
11: differential portion (continuously variable shifting portion)
16: power distributing mechanism (differential mechanism)

18: transmitting member
20,72: automatic shifting portion (shifting portion)
38: drive wheel
40: electronic control device
52: hybrid control means
84: engaging control variable control means
180: engaging pressure control means
M1: first electric motor
M2: second electric motor
C0: switching clutch (differential state switching device)
B0: switching brake (differential state switching device)

BEST MODE FOR CARRYING OUT THE INVENTION

Hereinafter, embodiments of the present invention will be explained with reference to attaching drawings.

Embodiment 1

FIG. 1 is a skeleton view explaining a shifting mechanism 10 is a transmission mechanism constructing a part of a drive apparatus of a hybrid vehicle according to one embodiment of the present invention. The shifting mechanism 10 includes an input shaft 14, a differential portion 11, an automatic shifting portion 20, and an output shaft 22 all coaxially disposed in a transmission case 12 (hereinafter briefly referred to as "case 12") as a non-rotatable member fixed to a vehicle body. The input shaft 14 as an input rotation member is fixed to the case 12. The differential portion 11 functioning as the continuously variable shifting portion is connected to the input shaft 14 directly or indirectly via a pulsation absorbing damper (vibration damping device) not shown. The automatic shifting portion 20 i.e., the automatic shifting portion functioning as a step variable type transmission is disposed between the differential portion 11 and the output shaft 22 to be connected thereto in series. The output shaft 22 as an output rotation member is connected to the automatic shifting portion 20.

This shifting mechanism 10 of this embodiment is suitably used for a transverse FR vehicle (front-engine, rear-drive vehicle), and is disposed between a drive power source in the form of an engine 8 such as a gasoline engine or a diesel engine, and a pair of drive wheels 38 (FIG. 5), to transmit a vehicle drive force to the pair of drive wheels 38 through a differential gear device 36 (final speed reduction gear) and a pair of drive axles both constructing a part of the power transmitting path from the engine 8 to the paired drive wheels 38.

In the shifting mechanism 10 of this embodiment, the engine 8 and the differential portion 11 is directly connected. Here, the direct connection includes, in addition to a connection without using any fluid-type transmitting device such as a torque converter or fluid engaging, a connection with using vibration damping device. Noted that a lower half of the shifting mechanism 10 constructed symmetrically with respect to its axis, is omitted in FIG. 1. This is true for other embodiments to be explained hereinafter.

The differential portion 11 includes a first electric motor M1, a power distributing mechanism 16 and a second electric motor M2. The power distributing mechanism 16 is a mechanism distributing an output of the engine 8 inputted to the input shaft 14 to the first electric motor M1 and the transmitting member 18, as the differential mechanism. The second electric motor M2 is rotatable integral with the transmitting member 18. The second electric motor M2 may be disposed at any portion of a power transmitting path extending between the transmitting member 18 and the drive wheel 38. In the present embodiment, each of the first electric motor M1 and the second electric motor M2 is a so-called motor/generator also functioning as an electric generator. The first electric motor M1 should function at least as an electric generator to generate an electric energy with generating a reaction force, and the second electric motor M2 should function at least as an electric motor to generate a drive force of the vehicle.

The power distributing mechanism 16 includes a first planetary gear unit 24 functioning as a differential device, a switching clutch C0 and a switching brake B0. The first planetary gear unit 24 of single pinion type has a gear ratio $\rho 1$ of about 0.418, for example. It has, as rotary elements, a first sun gear S1, a first planetary gear P1, a first carrier CA1 supporting the first planetary gear P1 to be rotatable about its axis and about the axis of the first sun gear S1, and a first ring gear R1 meshing with the first sun gear S1 through the first planetary gear P1. Representing the numbers of teeth of the first sun gear S1 and the first ring gear R1 by ZS1 and ZR1, respectively, the above gear ratio $\rho 1$ is represented by ZS1/ZR1.

In the power distributing mechanism 16, the first carrier CA1 is connected to the drive apparatus input shaft 14, i.e., to the engine 8, the first sun gear S1 is connected to the first electric motor M1, and the first ring gear R1 is connected to the transmitting member 18. The switching brake B0 is disposed between the first sun gear S1 and the casing 12, and the switching clutch C0 is disposed between the first sun gear S1 and the first carrier CA1. Upon release of both the switching clutch C0 and switching brake B0, the power distributing mechanism 16 is placed in the differential state where the first sun gear S1, first carrier CA1 and first ring gear R1 of the first planetary gear unit 24 are placed in a differential state to be rotatable relative to each other to perform a differential function.

Thus, the output of the engine 8 is distributed to the first electric motor M1 and the transmitting member 18, and a part of the output distributed to the first electric motor M1 is used to generate and store power thereat or to drive the second electric motor M2. Accordingly, the differential portion 11 functions as the electrically controlled differential device, for example, in the continuously variable shifting state (electrically controlled CVT state), in which the rotating speed of the transmitting member 18 changes continuously, irrespective of the rotating speed of the engine 8. That is, the differential portion 11, placed in the continuously variable shifting state by the differential state of the power distributing mechanism 16, functions as the electrically controlled continuously variable transmission in which speed ratio $\gamma 0$ (rotating speed of the driving device input shaft 14/rotating speed of the transmitting member 18) electrically changes from a minimum value $\gamma 0$ min to a maximum value $\gamma 0$ max.

In this state, by engagement of the switching clutch C0 or switching brake B0, the power distributing mechanism 16 is placed to the non-differential state not to perform, that is impossible to perform the differential operation. Specifically, when the first sun gear S1 and the first carrier CA1 are engaged integrally by engagement of the switching clutch C0, the rotary elements of the first planetary gear unit 24 including the first sun gear S1, first carrier CA1 and first ring gear R1 are placed in a connected state, i.e., a locked state or a non-differential state to be rotatable as a unit. With this, also the differential portion 11 is placed to the non-differential state. Thus, the rotating speeds of the engine 8 and the power transmitting member 18 coincide with each other, so that the differential portion 11 is placed in a non-continuously variable shifting state for example a fixed shifting state, that is a step variable shifting state functioning as the transmission having a fixed speed ratio γ0 equal to 1.

Then, when the switching brake B0 is engaged instead of the switching clutch C0 to connect the first sun gear S1 with the case 12, the power distributing mechanism 16 is placed in a locked state, connected state or non-differential state impossible to perform the differential operation with the non-rotating state of the first sun gear S1. With this, also the differential portion 11 is placed in the non-differential state. Due to the higher rotating speed of the first ring gear R1 than that of the first carrier CA1, the power distributing mechanism 16 functions as a speed-increasing mechanism. The differential portion 11 is placed in non-continuously variable shifting state for example the fixed shifting state, i.e., the step variable shifting state functioning as the speed-increasing mechanism of which a speed ratio γ0 is fixed in a value smaller than 1, for example, about 0.7.

In the present embodiment, the switching clutch C0 and switching brake B0 selectively place the differential portion 11 to the differential state i.e., non-locked state (uncoupled state), and in the non-differential state i.e., the locked state. In detail, in the differential state (engaged state), the differential portion 11 is operable as the electrically controlled differential device. For example, in the continuously variable shifting state, it is operable as the continuously variable transmission of which shifting ratio is continuously variable.

The switching clutch C0 and switching brake B0 also place the differential portion 11 in the shifting state not operable as the electrically controlled differential device. For example, in the locked state with the shifting ratio being locked in the fixed value, the differential portion 11 is not operable as the continuously variable transmission, with the continuously variable shifting operation being inoperative. In other words, in the locked state, the differential portion 11 operates as the single-stage or multi-stage transmission having one or not less than two shifting ratio(s), not operative as the continuously variable transmission, with the continuously variable shifting operation being inoperative. The locked state can otherwise be expressed as the fixed shifting state where the differential portion 11 operates as the single-stage or multi-stage transmission having one or not less than two shifting ratio(s). The non-engaging state includes, in addition to the state where the switching clutch C0 and the switching brake B0 are completely released, the state where the switching clutch C0 or the switching brake B0 is half engaged (slipped state).

From another point of view, with the power distributing mechanism 16 placed in the non-differential state to restrict the differential action thereof, the switching clutch C0 and the switching brake B0 function as the differential action limiting device operative to place the differential portion 11 in the non-continuously variable shifting state for limiting operation thereof as to function as the electrically controlled differential device, i.e., an electrically controlled continuously variable shifting transmission. Further, with the power distributing mechanism 16 in placed in the differential state not to limit the differential action thereof, the switching clutch C0 and the switching brake B0 do not limit the operation of the differential portion 11 as the electrically controlled differential device with the differential portion 11 placed in the continuously variable shifting state. That is, the switching clutch C0 and the switching brake B0 do not limit operation of the differential portion 11 as the electrically controlled continuously variable transmission.

The automatic shifting portion 20 includes plural planetary gear units, that is a single-pinion type second planetary gear unit 26, a single-pinion type third planetary gear unit 28 and a single-pinion type fourth planetary gear unit 30. The second planetary gear unit 26 includes a second sun gear S2, a second planetary gear P2, a second carrier CA2 supporting the second planetary gear P2 to be rotatable about its axis and about the axis of the second sun gear S2, and a second ring gear R2 meshing with the second sun gear S2 through the second planetary gear P2, having for example a gear ratio ρ2 of about 0.562.

The third planetary gear unit 28 includes a third sun gear S3, a third planetary gear P3, a third carrier CA3 supporting the third planetary gear P3 to be rotatable about its axis and about the axis of the third sun gear S3, and a third ring gear R3 meshing with the third sun gear S3 through the third planetary gear P3, having for example a gear ratio ρ3 of about 0.425. The fourth planetary gear unit 30 includes a fourth sun gear S4, a fourth planetary gear P4, a fourth carrier CA4 supporting the fourth planetary gear P4 to be rotatable about its axis and about the axis of the fourth sun gear S4, and the fourth ring gear R4 meshing with the fourth sun gear S4 through the fourth planetary gear P4, having a gear ratio ρ4 of about 0.421.

When representing the numbers of teeth of the second sun gear S2, second ring gear R2, third sun gear S3, third ring gear R3, fourth sun gear S4 and fourth ring gear R4 by ZS2, ZR2, ZS3, ZR3, ZS4 and ZR4 respectively, the above gear ratios ρ2, ρ3 and ρ4 are represented by ZS2/ZR2, ZS3/ZR3, and ZS4/ZR4, respectively.

In the automatic shifting portion 20, the second sun gear S2 and the third sun gear S3 integrally fixed to each other as a unit are selectively connected to the transmitting member 18 through a second clutch C2, and are selectively fixed to the casing 12 through a first brake B1. The second carrier CA2 is selectively connected to the casing 12 through the second brake B2, and the fourth ring gear R4 is selectively fixed to the transmission casing 12 through a third brake B3. The second ring gear R2, third carrier CA3 and fourth carrier CA4 integrally fixed to each other are fixed to the output shaft 22. The third ring gear R3 and the fourth sun gear S4 integrally fixed to each other are selectively connected to the transmitting member 18 through a first clutch C1.

Thus, the automatic shifting portion 20 and the transmitting member 18 are selectively connected to each other through the first clutch C1 or the second clutch C2 used for establishing the gear shift position in the automatic shifting portion 20. In other words, the first clutch C1 and the second clutch C2 function as the engaging device between the transmitting member 18 and the automatic shifting portion 20. That is, it selectively switches the power transmitting path between the differential portion 11 (transmitting member 18) and the drive wheel 38 in a power transmitting condition allowing the power transmission therethrough, and a power interrupting condition interrupting the power transmission therethrough. That is, engagement of at least one of the first clutch C1 and the second clutch C2 bring the power transmitting path into the power transmitting condition, while release of both the first clutch C1 and the second clutch C2 bring the power transmitting path into the power interrupting condition.

The switching clutch C0, the first clutch C1, the second clutch C2, the switching brake B0, the first brake B1, the second brake B2 and the third brake B3 are hydraulic-type frictionally engaging devices used in a conventional vehicular automatic transmission. The frictionally engaging device includes a wet-type multiple-disc clutch in which a plurality of friction plates superposed on each other are forced against each other by a hydraulic actuator, or a band brake in which a rotary drum and one band or two bands wound on an outer circumferential surface thereof is tightened at one end by a hydraulic actuator.

In the shifting mechanism 10 thus constructed, as shown in an operation Table of FIG. 2, one of a first-gear position (first-speed position) through a fifth-gear position (fifth-speed position), a reverse-gear position (rear-drive position) and a neural position is selectively established by engagement of the switching clutch C0, the first clutch C1, the second clutch C2, the switching brake B0, the first brake B1, the second brake B2 and the third brake B3. Those positions are established by disengaging i.e., release of a hydraulically controlled friction engaging device associated with for instance the gear shifting to be disengaged (hereinafter referred to as "on-disengaging side engaging device"), and another hydraulically controlled friction engaging device at engaging side associated with the gear shifting to be engaged (hereinafter referred to as "on-engaging side engaging device"), respectively. Those positions have respective speed ratios γ (input shaft speed $N_{IN}$/output shaft speed $N_{OUT}$) which change as geometric series.

In particular, in this embodiment, by engagement of any of the switching clutch C0 and switching brake B0 provided in the power distributing mechanism 16, the differential portion 11 can construct, in addition to the continuously variable shifting state operable as the continuously variable transmission, the fixed shifting state operable as the transmission of the fixed shifting ratio. Accordingly, in the shifting mechanism 10, the differential portion 11 placed in the fixed shifting state by engagement of any of the switching clutch C0 and switching brake B0, and the automatic shifting portion 20 construct the step variable shifting state operable as the step variable transmission. The differential portion 11 placed in the continuously variable shifting state by non-engagement of both the switching clutch C0 and switching brake B0, and the automatic shifting portion 20 construct the continuously variable shifting state operable as the continuously variable transmission.

In other words, the shifting mechanism 10 is switched to the step variable shifting state by engagement of any of the switching clutch C0 and switching brake B0, and is switched to the continuously variable shifting state by non-engagement of both the switching clutch C0 and switching brake B0. The differential portion 11 is the transmission also switched to the step variable shifting state and the continuously variable shifting state.

More particularly, with the differential portion 11 placed in the non-continuously shifting state to cause the shifting mechanism 10 to function as the step variable transmission, either the switching clutch C0 or the switching brake B0 is engaged, with the first clutch C1, the second clutch C2, the first brake B1, the second brake B2 and the third brake B3 being selectively engaged. This allows a hydraulically controlled friction engaging device associated with for instance the gear shifting to be disengaged (hereinafter referred to as "on-disengaging side engaging device"), and another hydraulically controlled friction engaging device associated with the gear shifting to be engaged (hereinafter referred to as "on-engaging side engaging device"), respectively. The on-disengaging side engaging device and the on-disengaging side engaging device engage such that any one of the 1st-speed gear position (1st-gear position) to the 5th-speed gear position (5th-gear position) or the reverse-gear position (reverse-drive position) or the neutral position is selectively established to automatically change the gear ratio.

Thus, a total gear ratio γT (=input shaft rotation speed $N_{IN}$/output shaft rotation speed $N_{OUT}$) of the shifting mechanism 10 can be obtained in a substantially equal ratio for each gear position. This represents the total gear ratio γT of the shifting mechanism 10 as a whole to be established based on the gear ratio γ0 of the differential portion 11 and the gear ratio γ of the automatic shifting portion 20.

For example, when the shifting mechanism 10 functions as the step variable transmission, for example, as shown in FIG. 2, engagement of the switching clutch C0, the first clutch C1 and the third brake B3 establish the first-gear position having the highest speed ratio γ1 of about 3.357, for example, and engagement of the switching clutch C0, the first clutch C1 and the second brake B2 establish the second-gear position having the speed ratio γ2 of about 2.180, for example, which is lower than the speed ratio γ1. Further, engagement of the switching clutch C0, first clutch C1 and first brake B1 establish the third-gear position having the speed ratio γ3 of about 1.424, for example, which is lower than the speed ratio γ2, and engagement of the switching clutch C0, first clutch C1 and second clutch C2 establish the fourth-gear position having the speed ratio γ4 of about 1.000, for example, which is lower than the speed ratio γ3.

Engagement of the first clutch C1, second clutch C2 and switching brake B0 establish the fifth-gear position having the speed ratio γ5 of about 0.705, for example, which is smaller than the speed ratio γ4. Further, engagement of the second clutch C2 and the third brake B3 establish the reverse-gear position having the speed ratio γR of about 3.209, for example, which positions between the speed ratios y1 and y2. The neutral position N is established by engaging only the switching clutch C0.

With the differential portion 11 placed in the continuously variable shifting state to cause the shifting mechanism 10 to function as the continuously variable transmission, both the switching clutch C0 and the switching brake B0 are disengaged. Thus, the differential portion 11 is compelled to function as the continuously variable transmission and the automatic shifting portion 20 connected to the differential portion 11 in series, is compelled to function as the step variable transmission. For at least one speed gear position M of the automatic shifting portion 20, the rotation speed, input to the automatic shifting portion 20, i.e., the rotation speed of the transmitting member 18 are compelled to vary stepless in an infinitely ranging gear ratio for the relevant speed gear position M. Accordingly, the shifting mechanism 10 can have the total gear ratio γT that is infinitely variable.

However, when the shifting mechanism 10 functions as the continuously variable transmission, as shown in FIG. 2, the switching clutch C0 and the switching brake B0 are both released. With this, the differential portion 11 functions as the continuously variable transmission, and the automatic shifting portion 20 connected in series thereto functions as the step variable transmission. The rotating speed to be input to the automatic shifting portion 20 placed in one of the first-gear, second-gear, third-gear and fourth-gear positions, that is the rotating speed of the transmitting member 18 is continuously changed so that the continuous shifting ratio width can be obtained for each of the gear positions. Accordingly, since the speed ratio of the automatic shifting portion 20 is continuously variable across the adjacent gear positions, a total speed ratio γT of the shifting mechanism 10 is continuously variable.

Figure 3:
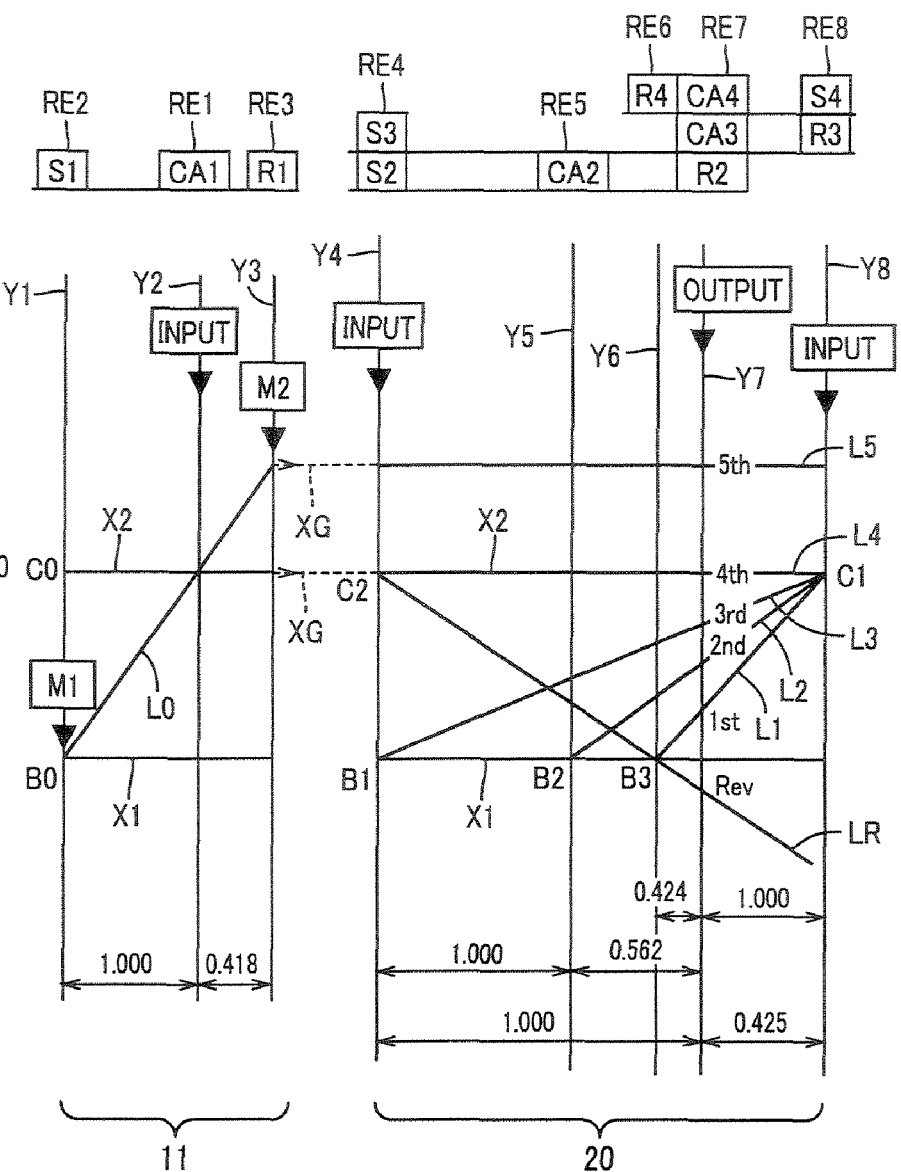
FIG. 3 is a collinear chart showing relative rotating speeds of rotary elements in each of different gear positions when the drive apparatus of the hybrid vehicle of the embodiment shown in FIG. 1 is operated in the step variable shifting state.

FIG. 3 shows a collinear chart representing by straight lines a relation among the rotating speeds of the rotary elements different in each of the gear positions of the shifting mechanism 10. The shifting mechanism 10 is constituted by the differential portion 11 functioning as the continuously variable shifting portion or first shifting portion, and the automatic shifting portion 20 functioning as the shift portion (step variable shifting portion) or second shifting portion. The collinear chart of FIG. 3 is a rectangular two-dimensional coordinate system in which the gear ratios ρ of the planetary gear units 24, 26, 28 and 30 are taken along the horizontal axis, while the relative rotating speeds of the rotary elements are taken along the vertical axis. A lower one X1 of three horizontal lines indicates the rotating speed of 0, and an upper one X2 indicates the rotating speed of 1.0, that is, an operating speed $N_E$ of the engine 8 connected to the input shaft 14. The horizontal line XG indicates the rotating speed of the transmitting member 18.

Among three vertical lines Y1, Y2 and Y3 corresponding to the three elements of the differential portion 11, respectively represent from the left the relative rotating speeds of a second rotary element (second element) RE2 in the form of the first sun gear S1, a first rotary element (first element) RE1 in the form of the first carrier CA1, and a third rotary element (third element) RE3 in the form of the first ring gear R1. The distances between the adjacent ones of the vertical lines Y1, Y2 and Y3 are determined corresponding to the gear ratio ρ1 of the first planetary gear unit 24.

Further, five vertical lines Y4, Y5, Y6, Y7 and Y8 corresponding to the automatic shifting portion 20 respectively represent from the left the relative rotating speeds of a fourth rotary element (fourth element) RE4, a fifth rotary element (fifth element) RE5, a sixth rotary element (sixth element) RE6, a seventh rotary element (seventh element) RE7, and an eighth rotary element (eighth element) RE8. The fourth rotary element RE4 has a form of the second and third sun gears S2, S3 integrally fixed to each other, the fifth rotary element RE5 has a form of the second carrier CA2, and the sixth rotary element RE6 has a form of the fourth ring gear R4. The seventh rotary element RE7 has a form of the second ring gear R2 and third and fourth carriers CA3, CA4 integrally fixed to each other, and the eighth rotary element RE8 has a form of the third ring gear R3 and fourth sun gear S4 integrally fixed to each other. The distances between the adjacent ones of the vertical lines Y4 to Y8 are determined by the gear ratios ρ2, ρ3 and ρ4 of the second, third and fourth planetary gear units 26, 28 and 30.

In the relation between the vertical lines of the collinear chart, when the interval i.e., distance between the sun gear and the carrier is set as "1", the interval between the carrier and the ring gear is set as the interval corresponding to the gear ratio ρ of the planetary gear unit. That is, at the differential portion 11, the interval between the vertical lines Y1 and Y2 is set as the interval corresponding to "1", and the interval between the vertical lines Y2 and Y3 is set as the interval corresponding to "ρ". In the automatic shifting portion 20, for each of the second, third and fourth planetary gears 26, 28 and 30, the interval between the sun gear and carrier is set as "1", and the distances between the carrier and ring gear is set as the gear ratio ρ.

Expressing with the collinear chart of FIG. 3, the shifting mechanism 10 is, in the differential portion 11, arranged such that the first rotary element RE1 (the first carrier CA1), which is one of the three rotary elements of the first planetary gear unit 24, is fixed to the input shaft 14, and selectively connected to the second rotary element RE2 (first sun gear S1) as another rotary element through the switching clutch C0. The second rotary element RE2 is fixed to the first electric motor M1 and selectively fixed to the casing 12 through the switching brake B0. The third rotary element RE3 (the first ring gear R1) as still another rotary element is fixed to the transmitting member 18 and the second electric motor M2. Thus, rotation of the input shaft 14 is transmitted (inputted) to the automatic shifting portion 20 through the transmitting member 18. An inclined straight line L0 which passes an intersection point between the lines Y2 and X2 represents a relation between the rotating speeds of the first sun gear S1 and the first ring gear R1.

For example, when the shifting mechanism 10 is switched to the continuously variable shifting state (differential state) by release of the switching clutch C0 and the switching brake B0, rotation of the sun gear S1 represented by the intersection point between the straight line L0 and the vertical line Y1 increases of decreases by control of the rotation speed of the first electric motor M1. In the differential state, for example, at lease the second rotary element RE2 and the third rotary element RE3 are rotated in the different rotation speed. When the rotation speed of the ring gear R1 determined depending on the vehicle speed V is substantially constant, the rotation speed of the first carrier CA1, that is the engine rotation speed $N_E$ represented by the intersection point between the straight line L0 and the vertical line Y2 increases or decreases.

When the first sun gear S1 and the first carrier CA1 are connected by engagement of the switching clutch C0, the power distributing mechanism 16 is brought into the non-differential state where the above three rotary elements RE1, RE2 and RE3 are integrally rotated, that is at least the second rotary element RE2 and the third rotary element RE3 are not rotated in the same rotation speed. Thus, the straight line L0 coincides with the lateral line X2, so that the transmitting member 18 rotates in the same rotation speed as the engine rotation speed $N_E$.

Alternately, with connection of the first sun gear S1 with the casing 12 by engagement of the switching brake B0, the power distributing mechanism 16 is brought into the non-differential state, where the engine rotation speed $N_E$ is halted and at least the second rotary element RE2 and the third rotary element RE3 are not rotated in the same rotation speed, so that the differential portion 11 functions as the speed increasing mechanism. Thus, the rotation speed of the first ring gear R1, i.e., the transmitting member 18 is represented by the intersection point between the straight line L0 which is in the state shown in FIG. 3 and the vertical line Y3, being inputted to the automatic shifting portion 20 in the increased rotation speed compared with the engine rotation speed $N_E$.

In the automatic shifting portion 20, the fourth rotary element RE4 is selectively connected to the transmitting member 18 through the second clutch C2 and selectively fixed to the casing 12 through the first brake B1, the fifth rotary element RE5 is selectively fixed to the casing 12 through the second brake B2, and the sixth rotary element RE6 is selectively fixed to the casing 12 through the third brake B3. The seventh rotary element RE7 is fixed to the output shaft 22, and the eighth rotary element RE8 is selectively connected to the transmitting member 18 through the first clutch C1.

As shown in FIG. 3, in the automatic shifting portion 20, upon engagement of the first clutch C1 and the third brake B3, the rotating speed of the output shaft 22 in the first-speed position is represented by an intersection point between the inclined straight line L1 and the vertical line Y7. Here, the inclined straight line L1 passes an intersection point between the vertical line Y8 indicative of the rotating speed of the eighth rotary element RE8 and the horizontal line X2, and an intersection point between the vertical line Y6 indicative of the rotating speed of the sixth rotary element RE6 and the horizontal line X1.

Similarly, the rotating speed of the output shaft 22 in the second-speed position is represented by an intersection point between an inclined straight line L2 determined by engagement of the first clutch C1 and second brake B2, and the vertical line Y7 indicative of the rotating speed of the seventh rotary element RE7 fixed to the output shaft 22. The rotating speed of the output shaft 22 in the third-speed position is represented by an intersection point between an inclined straight line L3 determined by engagement of the first clutch C1 and first brake B1, and the vertical line Y7 indicative of the rotating speed of the seventh rotary element RE7 fixed to the output shaft 22. The rotating speed of the output shaft 22 in the fourth-speed position is represented by an intersection point between a horizontal line L4 determined by engagement of the first clutch C1 and second clutch C2, and the vertical line Y7 indicative of the rotating speed of the seventh rotary element RE7 fixed to the output shaft 22.

In the first-speed through fourth-speed positions, as result of engagement of the switching clutch C0, power from the differential portion 11 i.e., the power distributing mechanism 16 is input to the eighth rotary element RE8 with the rotating speed the same as that of the engine rotation speed $N_E$. However, when the switching clutch B0 engages instead of the switching clutch C0, since power from the differential portion 11 is input to the eighth rotary element RE8 with a speed higher than the engine rotation speed $N_E$, the rotating speed of the output shaft 22 in the fifth-speed position is represented by an intersection point between a horizontal line L5 and the vertical line Y7. Here, the horizontal line L5 is determined by engagement of the first clutch C1, second clutch C2 and switching brake B0, and the vertical line Y7 indicates the rotating speed of the seventh rotary element RE7 fixed to the output shaft 22.

Figure 4:
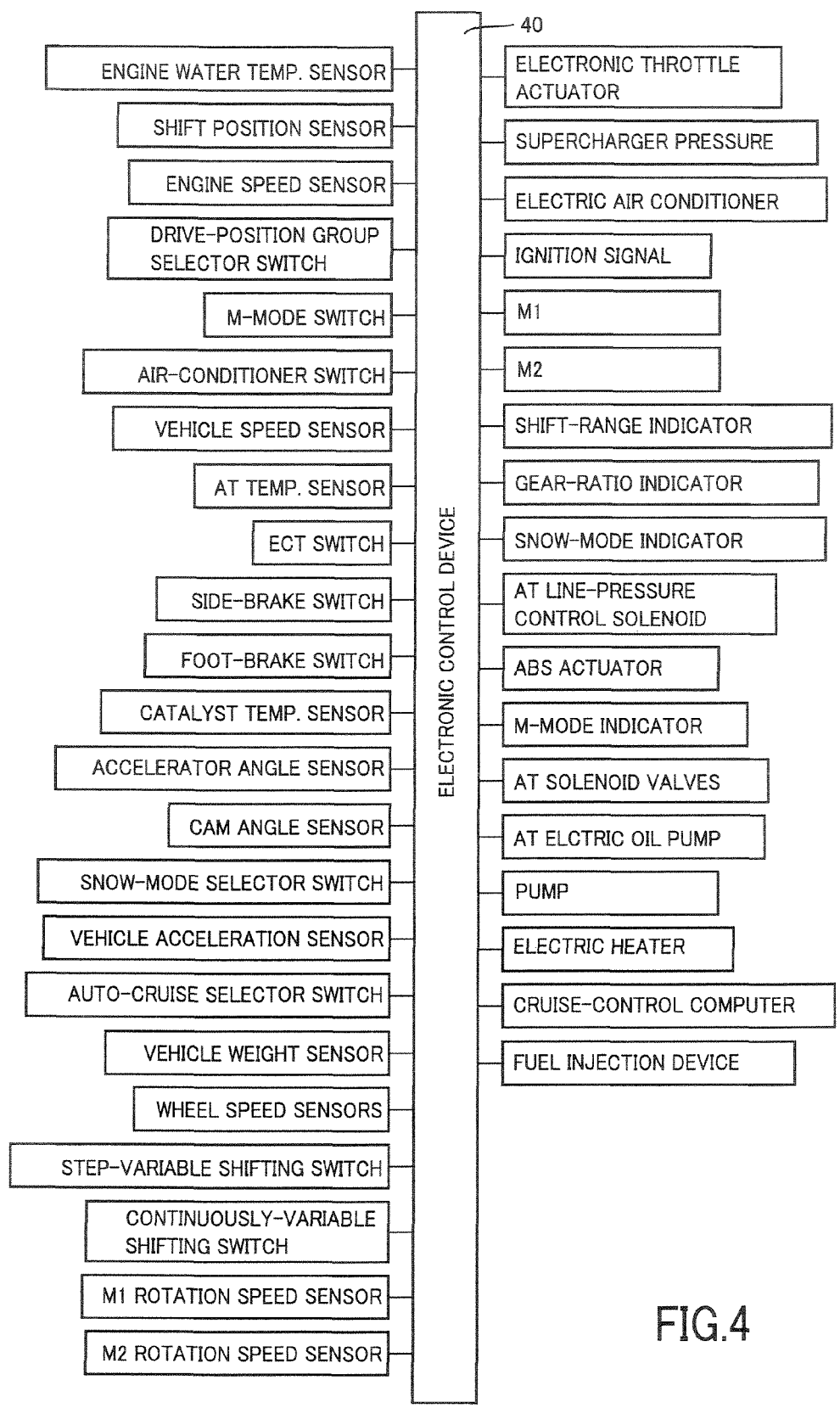
FIG. 4 is a view explaining input and output signals of an electronic control apparatus provided in the drive apparatus of the embodiment shown in FIG. 1.

FIG. 4 illustrates signals input to an electronic control device 40 and signals output therefrom to control the shifting mechanism 10. This electronic control device 40 includes a so-called microcomputer incorporating a CPU, a ROM, a RAM and an input/output interface. By performing signal processing according to programs stored in the ROM utilizing a temporary data storage function of the ROM, it implements hybrid drive controls of the engine 8 and electric motors M1 and M2, and drive controls such as shifting controls of the automatic shifting portion 20.

To the electronic control device 40, from various sensors and switches shown in FIG. 4, various signals are inputted, which include a signal indicative of a temperature $TEMP_W$ of cooling water of the engine, a signal indicative of a selected operating position $P_{SH}$, a signal indicative of the operating speed $N_E$ of the engine 8, a signal indicative of a set value of gear ratio row, a signal indicative of a command for M mode (motor drive mode), a signal indicative of an operated state of an air conditioner, a signal indicative of a vehicle speed V corresponding to the rotating speed $N_{OUT}$ of the output shaft 22, a signal indicative of a working oil temperature of the automatic shifting portion 20, a signal indicative of an operated state of a side brake, a signal indicative of an operated state of a foot brake, a signal indicative of a catalyst temperature, a signal indicative of an opened amount $A_{CC}$ of an accelerator pedal, a signal indicative of a cam angle, a signal indicative of a snow drive mode, a signal indicative of a longitudinal acceleration value G of the vehicle, and a signal indicative of an auto-cruising drive mode.

Also inputted are a signal indicative of a vehicle weight, a signal indicative of wheel speed of each drive wheel, a signal indicative of operation of a step variable switch for changing the differential portion 11 to the step variable shifting state (locked state) so that the shifting mechanism 10 functions as the step variable transmission, a signal indicative of operation of the continuously variable switch for changing the differential portion 11 to the continuously variable shifting state (differential state) so that the shifting mechanism 10 functions as the continuously variable transmission, a signal indicative of the rotating speed $N_{M1}$ of the first electric motor M1, a signal indicative of the rotating speed $N_{M2}$ of the second electric motor M2, and a charge capacity (charge state) of the electric storage device 60.

From the electronic control device 40, various control signals are outputted, which controls the engine output, which includes a signal to drive a throttle actuator for controlling an opening degree $\theta_{TH}$ of a throttle valve 94 of the engine 8, a signal to control fuel supply amount to each cylinder of the engine 8 by a fuel injection device 96, a signal to command an ignition timing in the engine 8 by an ignition device 98, a signal to adjust a supercharger pressure, a signal to operate the electric air conditioner, signals to operate the electric motors M1 and M2, a signal to operate a shift-range indicator for indicating the selected operating position of the shift lever, a signal to operate a gear-ratio indicator for indicating the gear ratio, a signal to operate a snow-mode indicator for indicating the selection of the snow drive mode, a signal to operate an ABS actuator for anti-lock braking of the wheels, and a signal to operate an M-mode indicator for indicating the selection of the M-mode.

Also outputted are signals to operate solenoid-operated valves incorporated in a hydraulic control unit 42 (refer to FIG. 6) provided to control the hydraulic actuators of the hydraulically operated frictional engaging devices of the differential portion 11 and the automatic shifting portion 20, a signal to operate an electric oil pump used as a hydraulic pressure source for the hydraulic control unit 42, a signal to drive an electric heater, a signal to be applied to a cruise-control computer, and a signal indicative of an fuel injection device.

Figure 5:
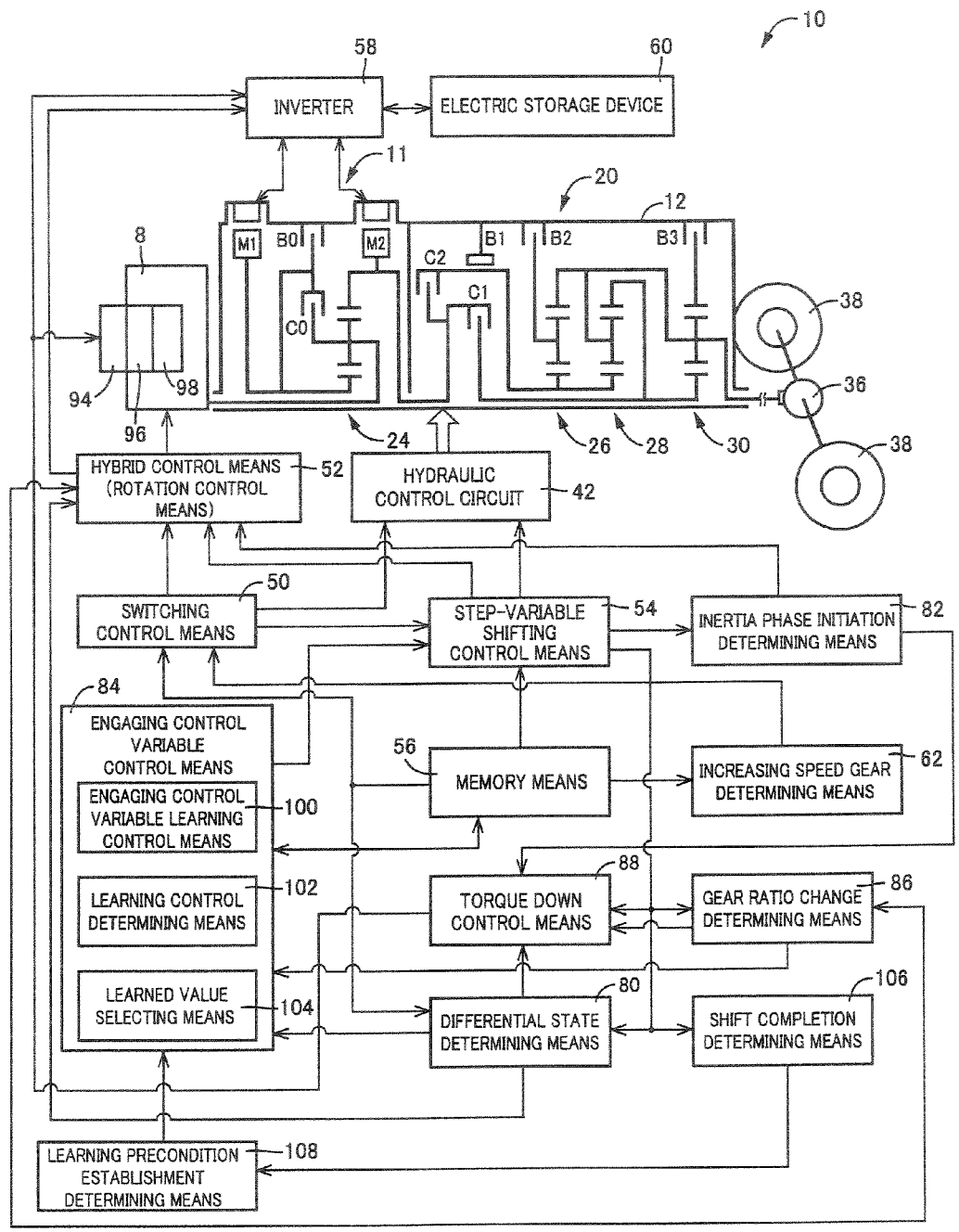
FIG. 5 is a functional block diagram explaining an essence of control operation to be executed by the electronic control apparatus shown in FIG. 4.
Figure 6:
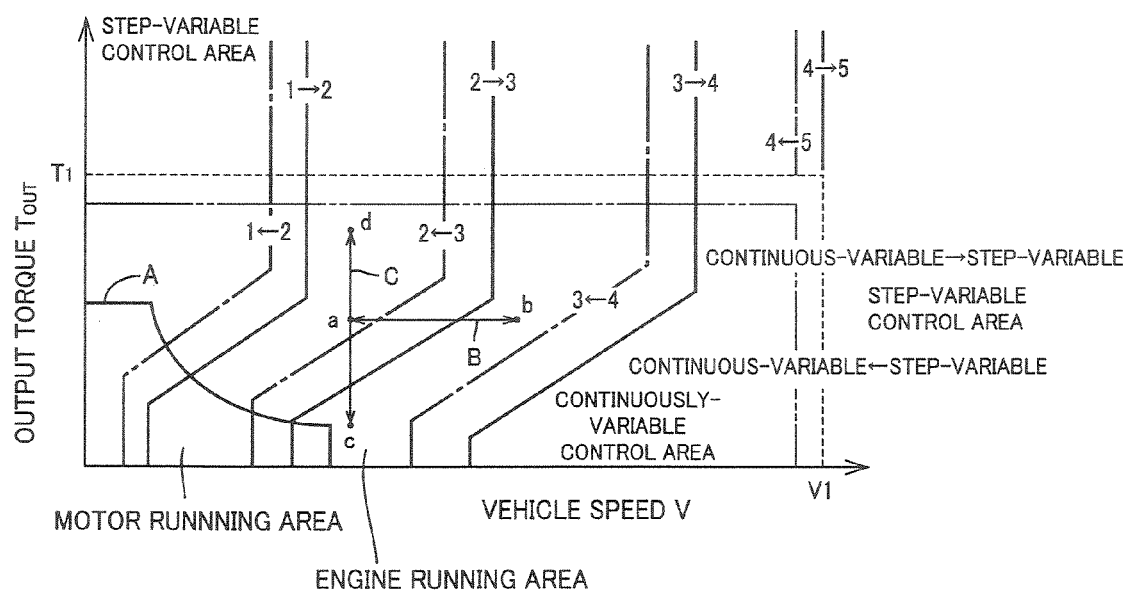
FIG. 6 is a view representing one example of a preliminarily stored shifting diagram based on which a determination on the gear shifting is executed in the automatic shifting portion, one example of a preliminarily stored shifting diagram based on which a shifting portion on the switching of a shifting state is executed in a shifting mechanism, and one example of a preliminarily stored drive-force source switching diagram having a boundary line between an engine running area and a motor running area for an engine running mode and a motor running mode to be switched. They are plotted on a two-dimensional coordinate in terms of as the same parameters as the vehicle speed and output torque, while representing respective relations.

FIG. 5 is a functional block diagram for illustrating an essential part of a control function to be performed with the electronic control device 40. In FIG. 5, the step variable shifting control means 54 performs the gear shifting in the automatic shifting portion 20. For instance, the step variable shifting control means 54 discriminates i.e., judges whether to perform the gear shifting in the automatic shifting portion 20 on the basis of the vehicle condition indicative of the vehicle speed V and the required output torque $T_{out}$ for the automatic shifting portion 20 by referring to the shifting diagram (the relation and the shifting map), preliminarily stored in the memory means 56, which are shown in FIG. 6 in solid lines and long dash short dash lines.

That is, the step variable shifting control means 54 discriminates a shifting position, for which the gear shifting is performed with the automatic shifting portion 20, to allow the automatic shifting portion 20 to perform the gear shifting so as to obtain the discriminated shifting position. When this takes place, the step variable shifting control means 54 outputs a command (shifting output command, hydraulic command) to a hydraulic control circuit 42 for engaging and/or disengaging the hydraulically operated frictional engaging device, excepting the switching clutch C0 and the switching brake B0, so as to achieve a desired shifting position in accordance with, for instance, the operation Table shown in FIG. 2.

Hybrid control means 52 functions as continuously variable shift control means. It allows the shifting mechanism 10 to be placed in the continuously variable shifting state, that is the differential portion 11 to be placed in the differential state, compelling the engine 8 to operate in an operating range with high efficiency. Meanwhile, the hybrid control means 52 compels the drive powers of the engine 8 and the second electric motor M2 to be distributed, and the first electric motor M1 to generate electric power with a reactive force in optimized variations. This allows the gear ratio γ0 of the differential portion 11, fucntioning as the electrically controlled continuously variable shifting transmission, to be controlled.

For instance, at the relevant traveling speed, the hybrid control means 52 calculates various factors such as a target (demanded) output of the vehicle based on an accelerator opening Acc; a vehicle speed V representing a driver's output requirement variable; a demanded total target output based on the target output of the vehicle and a charging demand value; and a target engine output in consideration of a transmitting loss, loads on auxiliary units and assist torque or the like required for the second electric motor M2, with a view to obtaining such a total target output. Then, the hybrid control means 52 controls the engine 8 at an engine rotation speed $N_E$ with engine torque $T_E$ so as to obtain the target engine output while controlling a rating of electric power generated by the first electric motor M1.

The hybrid control means 52 performs hybrid control with taking account of the gear position of the automatic shifting portion 20 to obtain drive power performance while improving fuel consumption. Such hybrid control allows the differential portion 11 to function as the electrically controlled continuously variable transmission so as to allow the engine rotation speed $N_E$, determined for the engine 8 to operate at a high efficiency, to match the rotating speed of the transmitting member 18 that is determined based on the vehicle speed V and the selected gear position of the automatic shifting portion 20.

To this end, the hybrid control means 52 preliminarily stores therein an optimum fuel economy curve (fuel economy map and relations) that is preliminarily determined on an experimental basis. This allows a compromise to be obtained, during the running of the vehicle under the continuously variable shifting state, between drivability of the vehicle and fuel economy performance of the engine 8 on the two-dimensional coordinate with the parameters including, for instance, the engine rotation speed $N_E$ and the output torque (engine torque) $T_E$ of the engine 8.

Thus, the hybrid control means 52 determines a target value of the total speed ratio γT of the shifting mechanism 10 so as to obtain the engine torque $T_E$, causing the engine to generate an output required for satisfying, for instance, the target output (overall target output and required drive force), and the engine rotation speed $N_E$. This enables the engine 8 to operate on the optimum fuel economy curve. Then, the hybrid control means 52 controls the speed ratio γ0 of the differential portion 11 so as to achieve the target value. This allows the total speed ratio γT to be controlled within a variable shifting range, for instance, from 13 to 0.5.

During such hybrid control, the hybrid control means 52 allows electric energy generated by the first electric motor M1 to be supplied to an electric-energy storage device 60 and the second electric motor M2 through an inverter 58. This allows a major portion of the drive force of the engine 8 to be mechanically transmitted to the transmitting member 18. When this takes place, a portion of the drive force of the engine is consumed with the first electric motor M1 for generating electric power to be converted to electric energy. The electric energy is supplied through the inverter 58 to the second electric motor M2, which in turn is driven to transfer the drive force from the second electric motor M2 to the transmitting member 18. Equipment, related to the operations from a phase of generating the electric energy to a phase in which the electric energy is consumed with the second electric motor M2, constitutes an electric path in which the portion of the drive force of the engine 8 is converted to the electric energy which in turn is converted to the mechanical energy.

In particular, with the step variable shift control means 54 executed a shift control of the automatic shifting portion 20, the gear ratio of the automatic shifting portion 20 is caused to vary stepwise accompanied by a stepwise change in the total gear ratio γT of the shifting mechanism 10 on a stage before and after the relevant shifting. That is, the total gear ratio γT is not continuously varied on a stage before and after the shifting of the automatic shifting portion 20 unlike the continuously variable transmission whose gear ratio may be infinitely varied, with the gear ratio being compelled to vary so as to skip step-by-step, i.e., in a non-continuous manner. With the total gear ratio γT compelled to vary step-by-step, drive torque can be rapidly varied in comparison to the variation in the total gear ratio γT that is continuous. On the other side, it is likely that the shifting shocks occur, and the engine rotation speed $N_E$ is hardly controlled so as to follow an optimum fuel saving rate curve with a resultant deterioration in fuel consumption.

Herefore, the hybrid control means 52 allows the differential portion 11 to execute the shifting in synchronism with the shifting of the automatic shifting portion 20 so as to suppress the stepwise change in the total gear ratio γT on the stage before and after the shifting of the automatic shifting portion 20 during the shifting thereof. That is, the variation in the engine rotation speed $N_E$ is adjusted to be less than a given engine rotation speed $N_E'$ for the variation in the rotation speed, representing the input rotation speed $N_{IN}$ of the automatic shifting portion 20, of the transmitting member 18 (second electric motor M2) caused by the shifting of the automatic shifting portion 20. In other words, the hybrid control means 52 allows the differential portion 11 to execute the shifting in synchronism with the shifting of the automatic shifting portion 20 such that the engine rotation speed $N_E$ is caused to continuously vary on the stage before and after the shifting of the automatic shifting portion 20, so as to suppress the variation in the engine rotation speed $N_E$ due to an electrically controlled CVT function (differential action) of the differential portion 11.

That is, the hybrid control means 52 functions as motor control means for varying the rotation speed $N_{M1}$ of the first electric motor M1 so as to continuously vary the engine rotation speed $N_E$ on the stage before and after the shifting of the automatic shifting portion 20, regardless of the variation in the rotation speed of the transmitting member 18 (second electric motor M2), that is, such that the engine rotation speed $N_E$ is less than a given engine rotation speed $N_E'$. As used herein, the term "given engine rotation speed $N_E'$" refers to a given value that is targeted for changing the gear ratio of the differential portion 11 preliminarily stored upon experiments as the variation, with the variation of the engine rotation speed $N_E$ being suppressed on the stage before and after the shifting of the automatic shifting portion 20 to cause the variation to be continuous.

For instance, the hybrid control means 52 compels a transient change in the total gear ratio γT not to vary in a non-continuous manner on the stage before and after the shifting of the automatic shifting portion 20 with the transient change continuously occurring to maintain the engine rotation speed $N_E$ at a nearly constant level. Therefore, the differential portion 11 executes the shifting in synchronism with the shifting of the automatic shifting portion 20 so as to change the gear ratio γ0 in a direction opposite to the direction in which the gear ratio γ is changed in the automatic shifting portion 20. For instance, the gear ratio γ0 is changed in the direction opposite to the direction, in which the gear ratio γ is changed in the automatic shifting portion 20, by a variable component equivalent to a stepwise change in the gear ratio γ of the automatic shifting portion 20.

Therefore, even if the automatic shifting portion 20 performs the shifting accompanied by the stepwise change in gear ratio thereof, the stepwise change in engine rotation speed $N_E$ is suppressed on the stage before and after the shifting, thereby suppressing the shifting shock. Thus, the hybrid control means 52 functions as rotation control means for varying the rotation speed $N_{M1}$ of the first electric motor M1 so as to interrupt the variation in the engine rotation speed $N_E$ on the stage before and after the shifting of the automatic shifting portion 20, regardless of the change in rotation speed of the transmitting member 18 (second electric motor M2) with the shifting of the automatic shifting portion 20.

Figure 7:
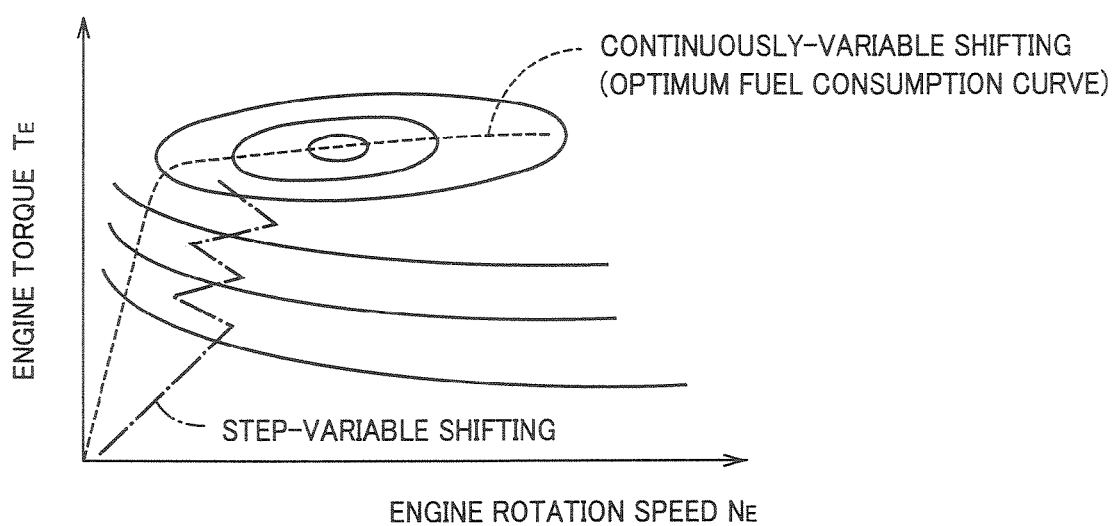
FIG. 7 is a view showing a fuel consumption rate map in which a broken line shows an optimum fuel consumption rate curve of the engine in the continuously variable shifting state, and a long dashed short dashed line shows an optimum fuel consumption rate curve of the engine in the step variable shifting state.

From another standpoint, with a commonly used step variable transmission, the engine 8 is caused to operate in a manner as indicated by long dash short dash line shown in FIG. 7. Meanwhile, with the continuously variable transmission, the engine 8 is caused to operate in a manner along the optimum fuel saving rate curve of the engine 8, indicated by a broken line shown in FIG. 7, or in a manner closer to the optimum fuel saving rate curve than that achieved by the step variable power transmission. Accordingly, the continuously variable transmission can realize engine torque $T_E$ for drive torque to be obtained for satisfying demanded drive torque (drive power) at the engine rotation speed $N_E$ in a pattern closer to the optimum fuel saving rate curve than that of the step variable transmission.

Thus, the continuously variable transmission is regarded to be superior in a fuel saving effect than that achieved by the step variable transmission. Thus, the hybrid control means 52 controls the gear ratio γ0 of the differential portion 11 so as to cause the engine 8 to operate along the optimum fuel saving rate curve indicated by, for instance, the broken line in FIG. 7 such that no degradation occurs in fuel consumption, even if the automatic shifting portion 20 executes the shifting to cause the gear ratio thereof to change stepwise. This makes it possible to cause a whole of the shifting mechanism 10 to function as the continuously variable transmission, resulting in improved fuel consumption.

As set forth above, the hybrid control means 52 performs a so-called synchronizing shift control for the differential portion 11 to execute the shifting in synchronism with the shifting of the automatic shifting portion 20. The initial timing, at which the differential portion 11 performs the synchronizing shift control, is set in consideration of a response lag between a judgment made on the shifting of the automatic shifting portion 20 effectuated by the step variable shift control means 54, and an actual operation of the engaging device for varying the rotation speed of the transmitting member 18 (second electric motor M2).

As used herein, the term "response lag" refers to a delay in response between the occurrence of the shifting in the shifting process of the automatic shifting portion 20 and a timing at which a so-called inertia phase is initiated with the occurrence of the variation in input rotation speed $N_{IN}$, i.e., the variation in rotation speed $N_{18}$ of the transmitting member 18. For instance, the response lag may be preliminarily acquired on experimental tests to be stored or with the occurrence of an actual variation in rotation speed $N_{18}$ of the transmitting member 18, the hybrid control means 52 may start the synchronizing shift control of the differential portion 11.

Further, the differential portion 11 terminates the synchronizing shift control at timing when the inertia phase is completed in the process of the shifting of the automatic shifting portion 20. For instance, a shifting time of the automatic shifting portion 20 may be preliminarily acquired on, for instance, experimental tests and stored in advance. Alternately, the hybrid control means 52 may terminate the synchronizing shift control of the differential portion 11 when no variation in the rotation speed $N_{18}$ of the transmitting member 18 is actually present, that is, when the actual rotation speed $N_{18}$ of the transmitting member 18 is nearly brought into synchronism with the rotation speed $N_{18}$ of the transmitting member 18 subsequent to the shifting.

Thus, the hybrid control means 52 compels the differential portion 11 to perform the shifting for executing the synchronizing shift control during a period (interval) for the inertia phase to be present in the course of the shifting of the automatic shifting portion 20. For instance, the inertia phase is present in a period preliminarily acquired on experiments, or in a period between an actual variation occurring in the rotation speed $N_{18}$ of the transmitting member 18 and the occurrence of no variation in the rotation speed $N_{18}$ of the transmitting member 18. In other words, the hybrid control means 52 causes the differential portion 11 to perform the shifting during the inertia phase caused by the shifting of the automatic shifting portion 20. This enables the differential portion 11 to perform the shifting in synchronism with the shifting of the automatic shifting portion 20.

The hybrid control means 52 functionally includes engine output control means. The engine output control means allows a throttle actuator to perform throttle control so as to open or close an electronic throttle valve 94. In addition, the hybrid control means 52 allows a fuel injection device 96 to control a fuel injection quantity and fuel injection timing for performing fuel injection control. Further, the hybrid control means 52 outputs commands independently or in combination. This allows the engine 8 to perform output control so as to fundamentally provide the required engine output. For instance, the hybrid control means 52 drives the throttle actuator in response to an acceleration opening signal Acc by referring to the preliminarily stored relation, which is not shown, such that the greater the accelerator opening Acc, the greater will be the throttle valve opening $θ_{TH}$.

The hybrid control means 52, irrespective of the halt or idling state of the engine 8, can perform the control to cause the vehicle to run or to be driven by the electrical CVT function (differential function) of the differential portion 11. A solid line A, shown in FIG. 6, represents a boundary line between the engine running area and the motor running area for the drive power source of the vehicle for starting up/running (hereinafter referred to as "for running") thereof to be switched to the engine 8 and the electric motor, that is, for instance, the second electric motor M2. In other words, the boundary line is used for switching the so-called engine running area, in which the engine 8 is caused to act as a running drive power source for starting up/running (hereinafter referred to as "running") the vehicle, and the so-called motor running area in which the second electric motor M2 is caused to act as a drive power source for running the vehicle.

The preliminarily stored relation, having the boundary line (in the solid line A) shown in FIG. 6 for switching the engine running area and the motor running area, represents one example of the drive-force source switching diagram (drive power source map), formed in a two-dimensional coordinate, which takes the vehicle speed V and the output torque $T_{OUT}$, indicative of the drive-force related value, as parameters. Memory means 56 preliminarily stores the drive-force source switching diagram together with, for instance, the solid line and the shifting diagram (shifting map) designated by the long dashed short dashed line which are shown in FIG. 6.

The hybrid control means 52 determines based on the vehicle condition, represented by the vehicle speed V and the required torque output $T_{OUT}$ by referring to, for instance, the drive-force source switching diagram shown in FIG. 6 to find whether the motor running area or the engine running area is present, thereby effectuating the motor running area or the engine running area. As will be apparent from FIG. 6, the hybrid control means 52 executes the motor running area at the relatively low output torque $T_{OUT}$, that is, the low engine torque $T_E$ in which the engine efficiency is generally lower than that in the high torque region, or the relatively low vehicle speed area in the vehicle speed V, that is, the low load region.

Accordingly, upon the vehicle starting, the motor starting is normally executed. However, depending on the vehicle state when the accelerator pedal is so deeply depressed that, in the drive force source switch diagram shown in FIG. 6, the required output torque $T_{OUT}$ exceeds the motor running area that is the required engine torque $T_E$, the engine starting is normally executed.

In order to suppress a drag of the engine 8 in a halted state thereof for improving the fuel economy, the hybrid control means 52 renders the differential portion 11 operative to perform an electrical CVT function (differential function) during the motor running area. This enables the rotating speed $N_{M1}$ of the first electric motor M1 to be controlled in a negative rotating speed, for instance, an idling state. This causes the engine rotation speed $N_E$ to be maintained at a zeroed or nearly zeroed value.

Further, even under the engine running area, the hybrid control means 52 may allow the electric path to be established. In this moment, the electric energies resulting from the first electric motor M1 and/or the electric-storage device 60 are supplied to the second electric motor M2. Thus, the second electric motor M2 is driven to make it possible to perform torque-assisting for the drive force of the engine 8. Thus, in the illustrated embodiment, the engine running area may cover a phase including the engine running area and the motor running area in combination.

Further, the hybrid control means 52 may cause the differential portion 11 to have the electrical CVT function through which the engine 8 can be maintained under the operating state, regardless of the halted condition or the low speed condition of the vehicle. For instance, if a drop occurs in a state of charge SOC of the electric-storage device 60 during the halt of the vehicle, the first electric motor M1 needs to generate electric power. In this moment, the drive force of the engine 8 causes the first electric motor M1 to generate electric power while the rotating speed of the first electric motor M1 increases. Thus, even if the rotating speed $N_{M2}$ of the second electric motor M2, uniquely determined with the vehicle speed V, becomes zero (nearly zero) due to the halted condition of the vehicle, the power distributing mechanism 16 performs the differential action. This causes the engine rotation speed $N_E$ to be maintained at a level beyond a rotating speed for autonomous rotation.

Furthermore, the hybrid control means 52 allows the differential portion 11 to perform the electrical CVT function to control the rotating speed $N_{M1}$ of the first electric motor M1 and the rotating speed $N_{M2}$ of the second electric motor M2. This causes the engine rotation speed $N_E$ to be maintained at an arbitrary level of the rotating speeds regardless of the vehicle remaining under the halted or running state. In other words, the hybrid control means 52 controls the rotating speed $N_{M1}$ of the first electric motor M1 and/or the rotating speed $N_{M2}$ of the second electric motor M2 to the arbitrary level, while maintaining the engine rotation speed $N_E$ in the constant value or in the arbitrary value. For instance, as will be understood from the collinear diagram shown in FIG. 3, when increasing the engine rotation speed $N_E$, the hybrid control means 52 executes the operation to raise the rotating speed $N_{M1}$ of the first electric motor M1 while maintaining the rotating speed $N_{M2}$ of the second electric motor M2, restricted with the vehicle speed V, at a substantially fixed level.

In addition, when the engine rotation speed $N_E$ is maintained in the substantially constant value during the shifting of the automatic shifting portion 20, the hybrid control means 52 changes the direction of the first electric motor rotation speed $N_{M1}$ inverse to that of the second electric motor rotation speed $N_{M2}$ accompanied by the shifting of the automatic shifting portion 20 while maintaining the engine rotation speed $N_E$ in the constant value substantially.

Increasing-speed gear judge means 62 makes a judge on which of the switching clutch C0 and the switching brake B0 are to be engaged for placing the shifting mechanism 10 in the step variable shifting state. That is, the determination is made based on the vehicle condition according to, for instance, the shifting diagram, shown in FIG. 6, which is preliminarily stored in the memory means 56, to find whether or not the gear position to be shifted in the shifting mechanism 10 lies in an increasing-speed gear position, for instance, a 5th-speed gear position.

Switching control means 50 switches the engaging state and/disengaging state of the engaging device (switching clutch C0 and switching brake B0) depending on the vehicle condition. This allows the continuously variable shifting state and the step variable shifting state, that is, the differential state and the locked state to be selectively switched. For instance, the switching control means 50 determines whether to switch the shifting state of the differential portion 11 based on the vehicle condition represented with the vehicle speed V and the required output torque $T_{OUT}$. This determination is made by referring to the shifting diagram (shifting map and relation), preliminarily stored in the memory means 56, which are shown in the broken line and the long dashed double short dashed line in FIG. 6.

That is, the determination is made to find whether the shifting mechanism 10 lies in a continuously variable shifting control region for the continuously variable shifting state or a step variable shifting control region for the step variable shifting state. Thus, the determination is made on the shifting state to be switched by the shifting mechanism 10.

More particularly, if the determination is made that the shifting mechanism 10 lies in the step variable shifting control region, then, the switching control means 50 outputs a command to the hybrid control means 52 disenabling or interrupting the hybrid control or continuously variable shifting control, while permitting the step variable shifting control means 54 to perform the shifting for the predetermined step variable shifting operation. When this takes place, the step variable shifting control means 54 allows the automatic shifting portion 20 to perform the automatic shifting in accordance with, for instance, the shifting diagram, shown in FIG. 6, which is preliminarily stored in the memory means 56.

For instance, FIG. 2 shows the operation Table, preliminarily stored in the memory means 56, which represents combinations in operation of the hydraulically operated frictional engaging devices, that is, the clutches C0, C1, C2, and the brakes B0, B1, B2 and B3 to be selected in the shifting control. That is, the entire shifting mechanism 10, that is, the differential portion 11 and the automatic shifting portion 20, functions as a whole to be a so-called step variable automatic transmission, thereby establishing the gear positions according to the operation Table shown in FIG. 2.

If the increasing-speed gear judge means 62 judges the 5th-gear position, the switching control means 50 outputs a command to the hydraulic control circuit 42 for disengaging the switching clutch C0 and engaging the switching brake B0. This causes the differential portion 11 to function as an auxiliary power transmission with a fixed speed ratio γ0, for instance, the speed ratio γ0 equal to "0.7". Thus, the shifting mechanism 10 can act as a whole to obtain an increasing-speed gear position, that is, a so-called overdrive-gear position with a speed ratio less than 1.0.

In contrast, if no 5th-gear position is determined by the increasing-speed gear judge means 62, the switching control means 50 outputs a command to the hydraulic control circuit 42 for engaging the switching clutch C0 and disengaging the switching brake B0. This causes the differential portion 11 to function as the auxiliary power transmission with the fixed speed ratio γ0, for instance, the speed ratio γ0 equal to 1. Thus, the shifting mechanism 10 can act as a whole to obtain a decreasing-speed gear position with a speed ratio greater than 1.0. Thus, the switching control means 50 can perform the switching of the shifting mechanism 10 in the step variable shifting state and selectively performs the switching for the gear positions of two kinds in either one gear position under the step variable shifting state. This causes the differential portion 11 to function as the auxiliary power transmission and the automatic shifting portion 20, connected to the differential portion 11 in series, is caused to function as the step variable transmission. Thus, the shifting mechanism 10 is caused to function as the so-called step variable automatic transmission as a whole.

On the contrary, if the determination is made that the shifting mechanism 10 should be switched to the continuously variable shifting state, the switching control means 50 outputs a command to the hydraulic control circuit 42 for disengaging both the switching clutch C0 and the switching brake B0. This causes the shifting mechanism 10 to be placed in the continuously variable shifting state for enabling a continuously variable shifting to be performed. Thus, the shifting mechanism 10 can act as a whole to obtain the continuously variable shifting state.

Concurrently, the switching control means 50 outputs a command to the hybrid control means 52 for permitting the hybrid control, and outputs a signal to the step variable shifting control means 54 for fixing the shifting mechanism 10 in the gear position for the predetermined continuously variable shifting state. Alternately, a signal is outputted to the step variable shifting control means 54 for permitting the automatic shifting portion 20 to perform automatic shifting according to, for instance, the shifting diagram, shown in FIG. 6, which are preliminarily stored in the memory means 56. In such a case, the variable step shifting control means 54 executes the operations as shown in the operation Table of FIG. 2 excepting the engaging operations of the switching clutch C0 and brake B0, thereby performing the automatic shifting.

Thus, the switching control means 50 switches the differential portion 11 to be placed in the continuously variable shifting state to function as the continuously variable transmission. In addition, the automatic shifting portion 20, connected to the differential portion 11 in series, is caused to function as the step variable transmission. This results in the occurrence of a drive force with a suitable magnitude. Simultaneously, a continuously variable change occurs in the rotating speed input to the automatic shifting portion 20, that is, the rotating speed of the transmitting member 18 applied to the automatic shifting portion 20 for each gear position of the 1st-gear, 2nd-gear, 3rd-gear and 4th-gear positions. Thus, the respective gear positions are established in speed ratios over a continuously variable shifting range. Accordingly, since the speed ratio is continuously variable across the adjacent gear positions, the shifting mechanism 10 can achieve the overall speed ratio γT in the continuously variable shifting state.

To explain about FIG. 6 in detail, which represents the shifting diagram (shifting map and relation) preliminarily stored in the memory means 56 for a determination to be made to perform the gear shifting in the automatic shifting portion 20. FIG. 6 shows one example of the shifting diagram plotted in a two-dimensional coordinate with parameters in terms of the vehicle speed V and the required output torque $T_{OUT}$ indicative of a drive-force related value. In FIG. 6, a solid line represents an up-shift line and a long dashed short dashed line represents a downshift line.

Further, in FIG. 6, a broken line represents a determination vehicle speed V1 and a determination output torque T1 for the switching control means 50 to make a determination on the continuously variable control area and the step variable control area. That is, the broken line in FIG. 6 represents a two determination lines. One is a predetermined high vehicle speed determination line, which forms a series of the determination vehicle speed V1 representing a predetermined high-speed running determination line for determining that the hybrid vehicle lies in the high speed running region. Other is a predetermined high-output running determination line, which forms a series of the determination output torque T1 representing a predetermined high-output running determination line for determining the drive-force related value relevant to the hybrid vehicle, that is, for instance, the high output running region for the output torque $T_{OUT}$ of the automatic shifting portion 20 to mark the high output.

Further, as sown in a long dashed double short dashed line in FIG. 6 in contrast to the broken line indicated therein, a hysteresis is provided for making a determination on the step variable shifting control region and the continuously variable shifting control region. That is, FIG. 6 represents a preliminarily stored shifting diagram (switching map and relation) for the switching control means 50 to make a regional determination on either the continuously variable control area or the step variable control area, based on parameters with the vehicle speed V and the output torque $T_{OUT}$ covering the determination vehicle speed V1 and the determination output torque T1. In addition, the memory means 56 may preliminarily store the shifting map, inclusive of such a shifting diagram. Moreover, the shifting diagram may be of the type that includes at least one of the determination vehicle speed V1 and the determination output torque T1 and may include a preliminarily stored shifting diagram with a parameter taking any of the vehicle speed V and the output torque $T_{OUT}$.

The shifting diagram, the switching diagram or the drive-force source switching diagram or the like may be stored not in the map but in a determination formula for making comparison between the current vehicle speed V and the determination vehicle speed V1, and a determination formula or the like for making comparison between the output torque $T_{OUT}$ and the determination output torque T1. In such a case, the switching control means 50 places the shifting mechanism 10 in the step variable shifting state when the vehicle condition such as, for instance, the current vehicle speed exceeds the determination vehicle speed V1. In addition, the switching control means 50 places the shifting mechanism 10 in the step variable shifting state when the vehicle condition such as, for instance, the output torque $T_{OUT}$ of the automatic shifting portion 20 exceeds the determination output torque T1.

When a failure or defective function occurs in a control unit of an electrical system such as an electric motor or the like for rendering the differential portion 11 operative as the electrically controlled continuously variable transmission, the switching control means 50 may preferentially place the shifting mechanism 10 in the step variable shifting state to ensure the vehicle to continuously run, even in the presence of the continuously variable control region. As used herein, the term "defective function" refers to a functional deterioration of equipment related to an electric path involved in the operation of the first electric motor M1 to generate electric energy and the conversion of such electric energy to mechanical energy, that is, failures and functional deteriorations resulting from the failures or low temperatures of the first electric motor M1, the second electric motor M2, the inverter 58 and the electric-storage device 60 and transmitting paths, etc., for such component parts to be interconnected.

The above drive-force related value is a parameter corresponding to the drive force of the vehicle in one-to-one relation, which may be the drive torque or the drive force at the drive wheel 38. In addition, it may be an output torque $T_{OUT}$ of the automatic shifting portion 20, an engine output torque $T_E$, an acceleration value of the vehicle; an actual value such as the engine output torque $T_E$ calculated based on the operating angle of the accelerator pedal or the opening angle $\theta_{TH}$ of the throttle valve (or intake air quantity, air/fuel ratio or fuel injection amount) and the engine rotation speed $N_E$; or an estimated value such as the engine output torque $T_E$ or required vehicle drive force calculated based on the amount of operation of the accelerator pedal by the vehicle operator or the operating angle of the throttle valve. The vehicle drive torque may be calculated based on not only the output torque $T_{OUT}$, etc., but also the ratio of a differential gear device of and the radius of the drive wheels 38, or may be directly detected by a torque sensor or the like. This is true for each of torques mentioned above.

Further, for instance, if the shifting mechanism 10 is placed in the continuously variable shifting state during the high speed running, deterioration occurs in fuel consumption. Therefore, to address such an issue, the vehicle speed V1 is set such that the shifting mechanism 10 is placed in the step variable shifting state during the high speed running. Furthermore, if the first electric motor M1 is configured to provide a reactive torque varying in a range covering the high output region of the engine during the running of the vehicle in a high output region, the first electric motor M1 becomes large in size. To minimize the first electric motor M1, the determination torque T1 is set to depend on the characteristic of the first electric motor M1 such that, for instance, the maximum output of electric energy being generated by the first electric motor M1 is lowered.

Figure 8:
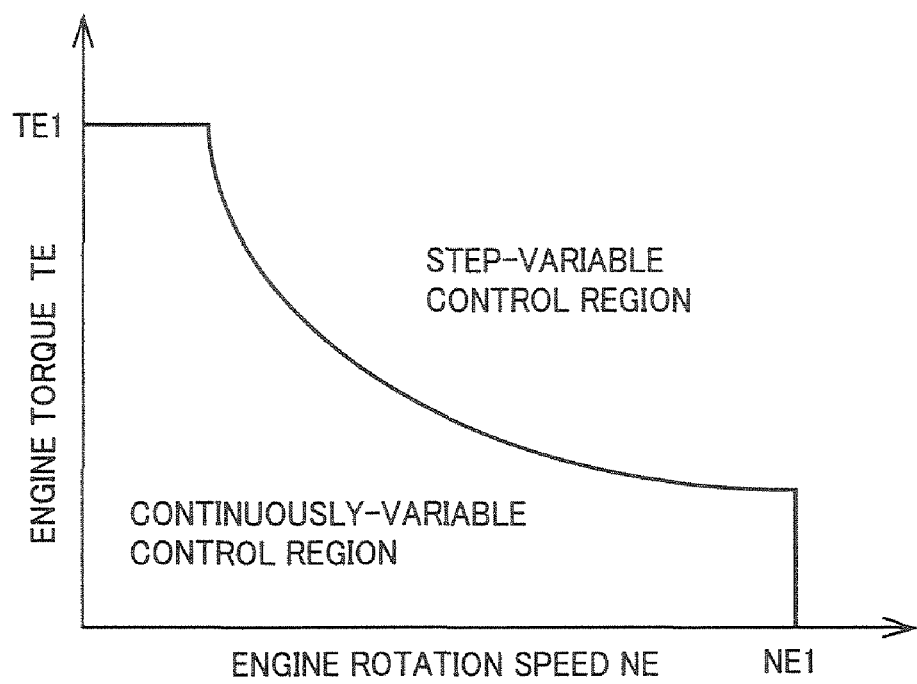
FIG. 8 is a conceptual view showing a preliminarily stored relation having a boundary line between a continuously variable control area and a step variable control area for mapping the boundary line between the continuously variable control area and the step variable control area shown in broken lines in FIG. 7.

FIG. 8 represents a switching diagram (switching map and relation), preliminarily stored in the memory means 56. It has an engine output line in the form of a boundary line to allow the switching control means 50 to execute the regional determination on which of the step variable control area and the continuously variable control area is to be selected in terms of the parameters including the engine rotation speed $N_E$ and the engine torque $T_E$. The switching control means 50 may execute the operation based on the engine rotation speed $N_E$ and the engine torque $T_E$ by referring to the switching diagram shown in FIG. 6 in place of referring to the switching diagram shown in FIG. 6.

That is, the switching control means 50 may determine whether the vehicle condition, represented with the engine rotation speed $N_E$ and the engine torque $T_E$, is placed in the step variable control area or the continuously variable control area. Further, FIG. 8 is a conceptual view for the broken line to be plotted as shown in FIG. 6. In other words, the broken line in FIG. 6 also represents shifting lines rewritten on the two-dimensional coordinate in terms of the parameters including the vehicle speed V and the output torque $T_{OUT}$ based on the relational diagram (map) shown in FIG. 8.

As indicated on the relation shown in FIG. 6, the step variable control area is set to lie in the high torque region, where the output torque $T_{OUT}$ is greater than the predetermined determination output torque T1, or the high vehicle speed region where the vehicle speed V is greater than the predetermined determination vehicle speed V1. Therefore, a step variable shift running area is effectuated in a high drive torque region, where the engine 8 operates at a relatively high torque, or a relatively high vehicle speed region of the vehicle speed. Further, a continuously variable shift running area is effectuated in a low drive torque region, where the engine 8 operates at a relatively low torque, or a relatively low vehicle speed region of the vehicle speed, that is, during a normal output region of the engine 8.

In the relation shown in FIG. 8, similarly, the step variable shifting control region is set to lie in a high-torque region where the engine torque $T_E$ is greater than a predetermined given value TE1, a high-speed rotating region where the engine rotation speed $N_E$ is greater than a predetermined given value NE1, or a high-output region where the engine output calculated based on the engine torque $T_E$ and the engine rotation speed $N_E$ is greater than a given value. Therefore, the step variable shift running area is effectuated at a relatively high torque, a relatively high rotating-speed or a relatively high-output of the engine 8.

The continuously variable shift running area is effectuated at a relatively low torque, a relatively low rotating-speed or a relatively low-output of the engine 8, that is, in the normal output region of the engine 8. The boundary line in FIG. 8 between the step variable control area and the continuously variable control area corresponds to a high vehicle-speed determination line which forms a series of high vehicle-speed determination values and a high-output running determination line which forms a series of high-output running determination values.

With such a boundary line, the shifting mechanism 10 is placed in the continuously variable shifting state to ensure the vehicle to have fuel economy performance during the running of the vehicle at, for instance, a low/medium speed and low/medium output. In the high speed running region where an actual vehicle speed V exceeds the determination vehicle speed V1, the shifting mechanism 10 is placed in the step variable shifting state operative to act as the step variable transmission. In this moment, the output of the engine 8 is transferred to the drive wheels 38 mainly through a mechanical power transmitting path. This suppresses a loss in conversion between drive power and electric energy, generated when the shifting mechanism 10 is caused to act as the electrically controlled continuously variable transmission, providing improved fuel consumption.

Further, during the running of the vehicle at the high output of the engine where the drive-force related value such as the output torque $T_{OUT}$ or the like exceeds the determination torque T1, the shifting mechanism 10 is placed in the step variable shifting state acting as the step variable transmission. In this moment, the output of the engine 8 is transferred to the drive wheels 38 mainly through the mechanical power transmitting path. Therefore, the electrically controlled continuously variable transmission is caused to operate in the low/medium speed running region and the low/medium output running region of the vehicle. This results in a reduction in the maximum value of the electric energy being generated by the first electric motor M1, that is, the electric energy being transmitted by the same. Thus, a further miniaturization can be achieved in the first electric motor M1 per se or the vehicle drive apparatus including such a component.

That is, as the given value TE1 is preset to be a switching judgment value for engine torque $T_E$ for the first electric motor M1 to be able to bear reactive torque, the differential portion 11 is placed in the step variable shifting state during the running of the vehicle at high output torque of the engine where engine torque $T_E$ exceeds the given value TE1. Therefore, the first electric motor M1 has no need to bear reactive torque acting against engine torque $T_E$ like a phase when the differential portion 11 is placed in the step variable shifting state, thereby preventing an increase in size while suppressing the occurrence of degradation in durability. In other words, with the illustrated embodiment, the first electric motor M1 has a maximal output that is made smaller than reactive torque capacity required for the maximum value of engine torque $T_E$. That is, no output of the first electric motor M1 comply with the reactive torque capacity for engine torque $T_E$ to exceed the given value TE1, enabling the miniaturization to be realized.

In addition, the maximal output of the first electric motor M1 is a rated value that is obtained upon experimental tests in conformity to a related usage environment. Moreover, as used herein, the term "switching judgment value for engine torque $T_E$" refers to a value equivalent to the maximum value of engine torque $T_E$ or a value lower than the maximum value by a given level that enables the first electric motor M1 to bear reactive torque. The switching judgment value is a value obtained upon preliminary experimental tests so as to suppress the occurrence of degradation in durability of the first electric motor M1.

Figure 9:
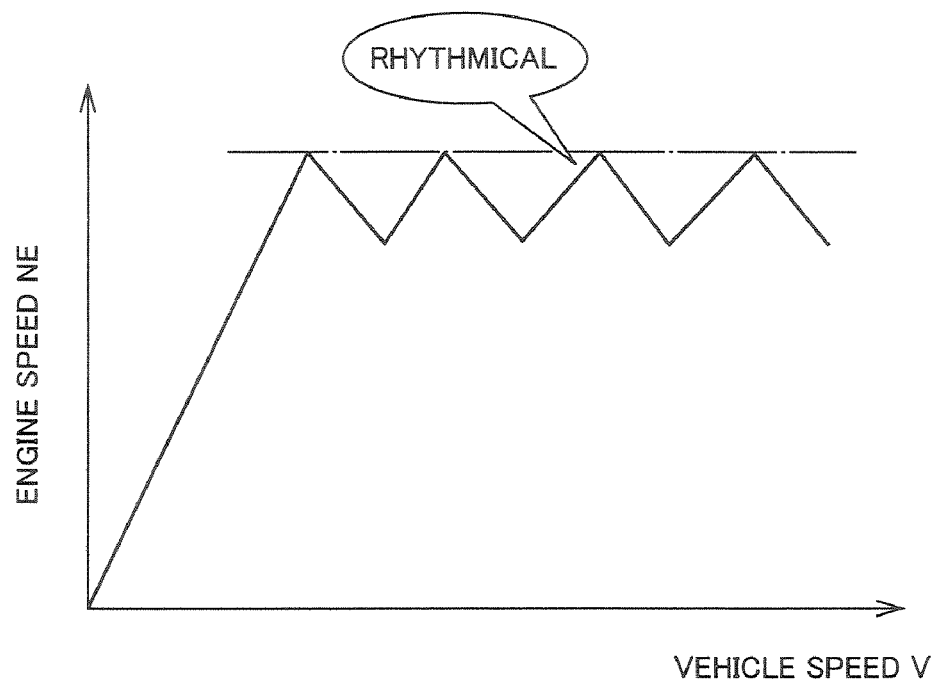
FIG. 9 is a graph showing fluctuation in an engine rotation speed caused in up-shift in a step variable transmission.

According to other viewpoint, in the high speed running, the requirement in the drive for the driver precedes the requirement in the mileage. Therefore, the shifting mechanism 10 is switched to the step variable shifting state (fixed shifting state) rather than the continuously variable shifting state. This allows a driver to enjoy a change in the engine rotation speed $N_E$ resulting from the up-shifting in the step variable automatic shift running region as shown in, for instance, FIG. 9, that is, a rhythmical change in the rotating speed $N_E$ of the engine.

Figure 10:
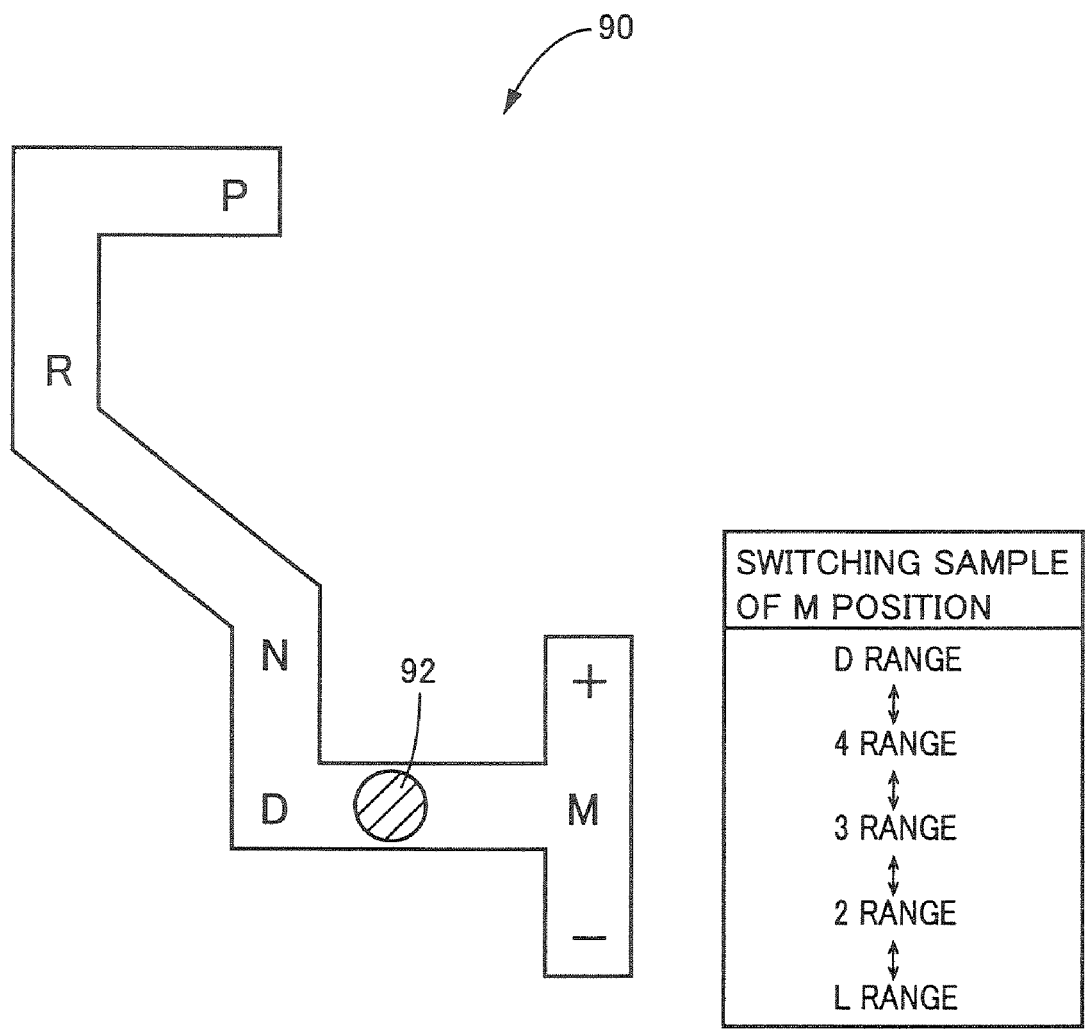
FIG. 10 is a view showing one sample of a shift operation device provided with a shift lever and being operated to select one of plural kinds of shift positions.

FIG. 10 shows on sample of a switch device 90 to be switched by manual operation to one of plural kinds of shift positions. This switch device 90 includes a shift lever i.e., switch lever 92 disposed for example at lateral side of the driver's seat and manually operated to select one of plural kinds of shifting positions. This switch lever 92 is selectively shifted to one of a parking position "P (parking)", rearward running position "R (reverse)" for rearward running, neutral position "N (neutral)", forward automatically shifted running drive position "D (drive)", and forward manually shifted running drive position "M (manual)". In the "P (parking)", none of the engaging device such as the first clutch C1 and the second clutch C2 are not engaged to set the interrupt state of the power transmitting path in the shifting mechanism 10, that is the automatic shifting portion 20, and to lock rotation of the output shaft 22. In the "N (neutral)", the power transmitting path in the shifting mechanism 10 is interrupted.

For example, in conjunction with manual operations of the switch lever 92 to the respective shift positions, manual valves in the hydraulically operated control circuit 42 mechanically connected to the switch lever 92, are switched. The hydraulically operated control circuit 42 is thereby mechanically switched so that the reverse-gear position "R," the neutral position "N," or the forward-gear position "D," etc., shown in the engagement operation table of FIG. 2, is established. The respective gear positions from the first to fifth gear positions in the "D" or "M" position, shown in the engagement operation table of FIG. 2, are established by electrical switching of the solenoid-operated valves in the hydraulically operated control circuit 42.

Among the respective shifting positions "P" to "M," at each of the non-running positions such as "P" and "N," for example, both the first clutch C1 and the second clutch C2 are disengaged or released as shown in the engagement operation table of FIG. 2. These are non-drive positions for selecting a state in which the power transmitting path in the automatic shifting portion 20 is cut off to disable the vehicle drive. That is, this is a non-drive state in which the path of power transmission is cut off or interrupted by the first clutch C1 and the second clutch C2.

Also, at each of the running positions "R" "D" and "M" for example, at least one of the first clutch C1 and the second clutch C2 is engaged as shown in the engagement operation table of FIG. 2. These are drive positions for selecting a state in which the power transmitting path in the automatic shifting portion 20 is connected to enable the vehicle drive. That is, these are the drive position for selecting a transmitting state of the power transmitting path by both or one of the first clutch C1 and the second clutch C2.

Specifically, the second clutch C2 is engaged by manual operation of the switch lever 92 from the "P" position or the "N" position to the "R" position, so that the power transmitting path in the automatic shifting portion 20 is switched from a power transmission cutoff state to a power transmissive state. At least the first clutch C1 is engaged by manual operation of the switch lever 92 from the "N" position to the "D" position, so that the power transmitting path in the automatic shifting portion 20 is switched from a power transmission cutoff state to a power transmissive state. Also, the "D" position is the running position at the maximum speed, and the "4" range to "L" range in the "M" position are engine brake ranges for obtaining an engine brake effect.

The "M" position is located at the same position as the "D" position in the longitudinal direction of the vehicle, and is adjacent thereto in the lateral direction of the same. The switch lever 92 is operated to the "M" position, for manually selecting one of the above-indicated "D" through "L" positions. Specifically, for the "M" position, an upshift position "+" and a downshift position "−" are provided in the front-rear direction of the vehicle. The shift lever 92 is manipulated to the upshift position "+" and the downshift position "−" to select any of the "D" range to the "L" range.

For example, the five shifting ranges of the "D" range to the "L" range which are selected at the "M" position correspond to, in the changeable range of the overall speed ratio γT which can control the shifting mechanism 10 automatically, different kinds of shifting ranges in which the overall speed ratio γT at higher speed side (minimum gear ratio side) are different. Also, these five shifting ranges limit the shifting range i.e., scope of the shifting position (gear position) so that the maximum side shifting position which can control the shifting of the automatic shifting portion 20 is different.

The shift lever 92 is urged by urge means such as a spring from the upshift position "+" and the downshift position "−" to be automatically returned to the "M" position. In addition, the switch device 90 is provided with a shift position sensor (not shown) for detecting each of the shift positions of the shift lever 92. A signal representing the shift position $P_{SH}$ of the shift lever 92, and the number of manipulation at the "M" position are outputted to the electronic control device 40.

If the shift lever 92 is shifted to, for instance, the position "D", the switching control means 50 effectuates automatic switching control for the shifting state of the shifting mechanism 10 based on the preliminarily stored shifting map or switching map shown in FIG. 6. In addition, the hybrid control means 52 allows the power distributing mechanism 16 to perform continuously variable shifting control and the step variable shifting control means 54 allows the automatic shifting portion 20 to execute automatic shifting control.

During the running of the vehicle under, for instance, the step variable transmission where the shifting mechanism 10 is placed in the step variable shifting state, automatic shifting control is performed within a range from the 1st-gear to the 5th-gear positions as shown, for instance, in FIG. 2. The shifting mechanism 10 performs automatic shifting control, within a variable range of the overall speed ratio γT obtained in the continuously variable shifting range of the power distributing mechanism 16 and the respective gear positions resulting from the automatic shifting control executed by the automatic shifting portion 20 in a range from 1st-gear to 4th-gear positions. As used herein, the position "D" refers to a shift position for a running mode (automatic mode) with automatic shifting representing a control pattern for the shifting mechanism 10 to execute automatic shifting control.

Further, if the shift lever 92 is shifted to, for instance, the position "M", the switching control means 50, the hybrid control means 52 and the step variable shifting control means 54 allows the shifting mechanism 10 to perform automatic shift control within the shifting ranges of the overall speed ratio γT. During the running of the vehicle under the step variable shifting state where the shifting mechanism 10 is switched to the step variable shifting state, the shifting mechanism 10 performs the automatic shifting control within the various shifting ranges of the overall speed ratio γT.

During the running of the vehicle under the continuously variable shifting state where the shifting mechanism 10 is switched to the continuously variable shifting state, automatic shifting control is performed within the ranges of the overall speed ratio γT available to be shifted in the respective shifting ranges, with the continuously variable shifting ratio width of the power distributing mechanism 16 and the ranges of the respective gear positions for the automatic shifting portion 20 to be available to shift depending on the respective shifting ranges. As used herein, the term position "M" also refers to a shift position for a manual shift running mode (manual mode) to be selected in a control pattern for the shifting mechanism 10 to execute manual shift control.

Thus, with the illustrated embodiment, the shifting mechanism 10 (including the differential portion 11, the power distributing mechanism 16) can be selectively switched to the continuously variable shifting state (differential state) and the non-continuously variable shifting (step variable shifting state, locked state). In particular, the switching control means 50 determines the shifting state for the differential portion 11 to be switched based on the vehicle condition, upon which the differential portion 11 is selectively switched to either the continuously variable shifting state or the non-continuously variable shifting state (step variable shifting state).

In the step variable shifting state of the differential portion 11, the hybrid control means 52 can not perform the shifting of the differential portion 11 in synchronous with the shifting of the automatic shifting portion 20. This can be expressed that, in other word, with the electrical CVT function (differential operation) of the differential portion 11 by the hybrid control means 52, the variation the engine rotation speed $N_E$ is suppressed, that is for example is maintained in the predetermined value, before and after the shifting. For this reason, upon the shifting of the automatic shifting portion 20 in the step variable shifting state of the differential portion 11, the rotation speed $N_{18}$ of the transmitting member 18 or the engine rotation speed $N_E$ stepwise changes, to thereby cause the shifting shock.

In the illustrated embodiment, during the shifting of the automatic shifting portion 20, the shifting mechanism 10 performs the shifting so as to minimize the occurrence of the shifting shocks not only in one case with the differential portion 11 placed in the continuously variable shifting state of but also in the other case with the differential portion 11 placed in the step variable shifting state. Hereunder, such a shifting operation will be described below in detail.

Turning back to FIG. 5, when the execution of the shifting of the automatic shifting portion 20 is determined, the differential state determining means 80 determines whether or not the power distributing mechanism 16 is placed in the differential state, that is the differential portion 11 is placed in the continuously variable shifting state. As used herein, the phrase "the execution of the shifting is determined" refers to a case in which, for instance, the step variable shift control means 54 determines a gear position to be shifted in the automatic shifting portion 20 based on a vehicle condition by referring to a shifting diagram shown in FIG. 6.

For instance, the differential state determining means 80 determines whether or not the differential portion 11 is placed in the continuously variable shifting state, depending on whether or not a continuously variable control region is present for placing the shifting mechanism 10 in the continuously variable shifting state, based on the vehicle condition represented by a vehicle speed V and output torque $T_{OUT}$ by referring to the shifting diagram shown in FIG. 6. FIG. 6 shows the shifting diagram for the switching control means 50 to determine whether or not the shifting mechanism 10 is placed in a step variable control region for the shifting mechanism 10 to be controllably switched to the step variable shifting state or the continuously variable shifting region for the shifting mechanism 10 to be controllably switched to the continuously variable shifting state.

During the operation of the step variable shift control means 54 for performing the shifting of the automatic shifting portion 20, there is likelihood in that the differential state determining means 80 determines that the differential portion 11 is placed in the continuously variable shifting state. In this case, the hybrid control means 52 executes the shifting of the differential portion 11 so as to maintain, for instance, the engine rotation speed $N_E$ at a nearly constant level such that during the inertia phase in the course of the shifting of the automatic shifting portion 20, the engine rotation speed $N_E$ continuously varies due to the differential action, that is the electrically controlled continuously variable shifting action of the differential portion 11. For instance, the hybrid control means 52 varies the gear ratio γ of the differential portion 11 in a direction opposite to that in which the gear ratio γ is varied during the inertia phase in the course of the shifting of the automatic shifting portion 20.

Inertia phase initiation determining means 82 determines whether or not the inertia phase is initiated in the course of the shifting of the automatic shifting portion 20. The determination depends on, for instance, whether or not the step variable shift control means 54 determines the shifting of the automatic shifting portion 20 upon which the on-disengaging side engaging device is disengaged after which the on-engaging side engaging device begins to have a engaging torque capacity accompanied by the initiation of the variation in the rotation speed of the transmitting member 18 (second electric motor M2).

For instance, the inertia phase initiation determining means 82 determines whether or not the rotation speed $N_{M2}$ of the second electric motor M2 begins to vary due to the initiation of an increase in the engaging torque capacity of the on-engaging side engaging device in the course of the shifting of the automatic shifting portion 20, effectuated by the step variable shift control means 54, depending on phenomena described below. A first phenomenon depends on whether or not the actual rotation speed $N_{18}$ of the transmitting member 18, i.e., the rotation speed $N_{M2}$ of the second electric motor M2, varies in a given variable that is preliminarily and experimentally fixed for determining whether or not the inertia phase is initiated.

A second phenomenon depends on whether or not a given time interval, preliminarily and experimentally determined as a time for the on-engaging side engaging device to begin to have the engaging torque capacity, has elapsed after the step variable shift control means 54 determines that the automatic shifting portion 20 performs the shifting. In addition, a third phenomenon depends on whether or not a engaging hydraulic pressure of the on-engaging side engaging device reaches a engaging transition hydraulic pressure (command) value Pc that is preliminarily and experimentally determined as a hydraulic pressure (command) value for the engaging torque capacity to be initiated.

Further, with the differential portion 11 placed in the continuously variable shifting state, the step variable shift control means 54 executes the shifting of the automatic shifting portion 20 so as to allow the input rotation speed $N_{IN}$ of the automatic shifting portion 20, i.e., the rotation speed $N_{18}$ of the transmitting member 18 to achieve a given variation.

More particularly, during the shifting (shift transition period) of the automatic shifting portion 20, effectuated by the step variable control means 54, when the differential state determining means 80 determines that the differential portion 11 is placed in the continuously variable shifting state, engaging control variable i.e., amount control means 84, acting as engaging pressure control means, controls the engaging pressure. That is, the engaging control variable control means 84 controls a control variable of the engaging device, associated with the shifting of the automatic shifting portion 20, for use in the hydraulic pressure command (shifting output) to be output to a hydraulic control circuit 42 by the step variable shift control means 54 for performing the shifting such that the rotation speed $N_{18}$ of the transmitting member 18 establishes the given variation.

As used herein, the term "the given variation" for the rotation speed $N_{18}$ of the transmitting member 18 refers to a varying state, i.e., for instance, a given varying rate that is preliminarily and experimentally obtained. That is, the given variation, preliminarily obtained so as to allow the rotation speed $N_{18}$ of the transmitting member 18 to lie in an idealistic state uniquely determined with the vehicle speed V and the gear ratio γ of the automatic shifting portion 20, is defined with, for instance, a percentage change $N_{18}'(=dN_{18}/dt)$ of the rotation speed $N_{18}$ of the transmitting member 18. It is regarded to be a comfortable feeling in a shifting response with an increase in a rotation speed percentage change $N_{18}'$ and it is regarded to have an ease of suppressing the shifting shocks in a slow shifting response with a decrease in the rotation speed percentage change $N_{18}'$.

Further, with the differential portion 11 placed in the step variable shifting state, the step variable shift control means 54 executes the shifting of the automatic shifting portion 20 so as to allow the rotation speed $N_{18}$ of the transmitting member 18, or the engine rotation speed $N_E$ to achieve a given variation.

More particularly, during the shifting of the automatic shifting portion 20, effectuated by the step variable control means 54, when the differential state determining means 80 determines that the differential portion 11 is placed in the step variable shifting state, engaging control-variable control means 84 controls the engaging pressure. That is, the engaging control-variable control means 84 controls a control variable of the engaging device, associated with the shifting of the automatic shifting portion 20, for use in the hydraulic pressure command (shifting output) to be output to a hydraulic control circuit 42 by the step variable shift control means 54 for performing the shifting such that the rotation speed $N_{18}$ of the transmitting member 18 or the engine rotation speed $N_E$ establishes the given variation.

As used herein, the term "the given variation" for the engine rotation speed $N_E$ similar to the rotation speed $N_{18}$ of the transmitting member 18 refers to a varying state, i.e., for instance, a given varying rate that is preliminarily and experimentally obtained. That is, the given variation, preliminarily obtained so as to allow the engine rotation speed $N_E$ to lie in an idealistic state uniquely determined with the vehicle speed V and the gear ratio γ of the automatic shifting portion 20 in the non-differential state of the differential portion 11, is defined with, for instance, a percentage change $N_E'(=dN_E/dt)$ of the engine rotation speed $N_E$. It is regarded to be a comfortable feeling in a shifting response with an increase in a rotation speed percentage change $N_E'$ and it is regarded to have an ease of suppressing the shifting shocks in a slow shifting response with a decrease in the engine rotation speed percentage change $N_E'$.

In the illustrated embodiment, meanwhile, with the differential portion 11 placed in the continuously variable shifting state during the operation of the step variable shift control means 54 executing the shifting of the automatic shifting portion 20, the hybrid control means 52 allows the differential portion 11 to perform the shifting so as to continuously vary the engine rotation speed $N_E$ on the stage before and after the shifting of the automatic shifting portion 20 such that, for instance, the engine rotation speed $N_E$ is maintained at a nearly constant level. This suppresses the occurrence of the shifting shocks and provides improved fuel consumption.

When this takes place, there is likelihood in that a target value of the total gear ratio γT is caused to significantly vary on the stage before and after the shifting of the automatic shifting portion 20. Even under such a situation, since the total gear ratio γT continuously varies, once the differential portion 11 executes the shifting so as to maintain the engine rotation speed $N_E$ at the nearly constant level on the stage before and after the shifting of the automatic shifting portion 20, the differential portion 11 further executes the shifting so as to allows the total gear ratio γT to continuously vary toward the target total gear ratio γT. In such a case, however, there is an idea that the user can have a more comfortable feeling when varying the total gear ratio γT step-by-step (in a non-continuous manner) with improved shifting response rather than continuously varying the total gear ratio γT.

In a case where the automatic shifting portion 20 performs the shifting with a variation in vehicle speed V as shown by a transition a⇄b indicated by a solid line B in FIG. 6, less variation or almost no variation takes place in the total gear ratio γT on the stage before and after the shifting of the automatic shifting portion 20. Accordingly, it is favorable to minimize the shifting shocks or provide improved fuel consumption rather than to have improved shifting response. However, if the automatic shifting portion 20 performs the shifting with a variation in demanded output torque $T_{OUT}$ caused by, for instance, a rapid depression or rapid release of an accelerator pedal as shown by a transition c⟷d indicated a solid line C in FIG. 6, the total gear ratio γT varies in a greater varying width on the stage before and after the shifting of the automatic shifting portion 20 than that in which the total gear ratio γT varies along the solid line B. Accordingly, there is an idea that it is preferable to change the total gear ratio γT step-by-step (in the non-continuous manner) to have improved shifting response rather than to continuously vary the total gear ratio γT on the stage before and after the shifting of the automatic shifting portion 20 for obtaining minimized shifting shocks to have improved fuel consumption.

Therefore, if less variation or almost no variation occurs in the varying width of the total gear ratio γT on the stage before and after the shifting of the automatic shifting portion 20, the total gear ratio γT may be continuously varied on the stage before and after the shifting to obtain the minimized shifting shocks and improved fuel consumption rather than to obtain the improved shifting response. In addition, if the total gear ratio γT varies in a significantly increased varying width on the stage before and after the shifting of the automatic shifting portion 20, then, the total gear ratio γT may be caused to skip so as to interrupt the occurrence of a continuous change in the total gear ratio γT on the stage before and after the shifting, that is, to vary the gear ratio step-by-step.

From another point of view, in a case where the accelerator pedal is rapidly depressed or rapidly released to cause a significant increase in the varying width of the total gear ratio γT on the stage before and after the shifting of the automatic shifting portion 20, it seems to be comfortable for the user to have a so-called skipped shifting in which the total gear ratio γT skips step-by-step. From the foregoing reasons, the total gear ratio γT may be preferably skipped upon using a stepwise variation in the gear ratio γ of the automatic shifting portion 20.

More particularly, when the differential state determining means 80 determines that the differential portion 11 is placed in the continuously variable shifting state and the total gear ratio γT varies in an increased varying width during the operation of the step variable control means 54 for the shifting of the automatic shifting portion 20 to be executed, the hybrid control means 52 performs, in addition to the function mentioned above, a control as described below. That is, the hybrid control means 52 allows the differential portion 11 to vary the gear ratio γ0 depending on the variation in the gear ratio γ in synchronism with the shifting of the automatic shifting portion 20 with no occurrence of a continuous change in the total gear ratio γT.

Instead of such an operation, the differential portion 11 solely executes the shifting independently of the shifting of the automatic shifting portion 20, that is, in non-synchronism with the shifting thereof, thereby varying the total gear ratio γT toward a target value thereof. This enables the total gear ratio γT to be varied toward the target value upon utilizing the stepwise change in gear ratio of the automatic shifting portion 20 so as to add a change in gear ratio of the differential portion 11 to (or subtract the same from) such a stepwise change in gear ratio. This allows the total gear ratio γT to be varied step-by-step on the stage before and after the shifting of the automatic shifting portion 20 with a resultant improvement in a shifting response.

For instance, the expression "the total gear ratio γT varies in an increased varying width" refers the targeted total gear ratio γT with the varying width exceeding a given variable due to the accelerator pedal being rapidly depressed or rapidly released as shown by the transition c⟷d indicated by the solid line C in FIG. 6. This is supposed to be a case wherein the so-called skipped shifting occurs with the total gear ratio γT varying in the non-continuous manner, i.e., skipping stepwise. As used herein, the term "given variable" refers to a value, preliminarily and experimentally obtained, which is deemed to be preferable for the user to cause the targeted total gear ratio γT not to continuously vary but to vary stepwise (that is, in non-continuous manner).

In a case where the execution on the shifting of the automatic shifting portion 20 is determined, gear ratio change determining means 86 determines the presence of a change in the total gear ratio γT when, for instance, the step variable shift control means 54 determines a gear position to be shifted in the automatic shifting portion 20 based on the vehicle condition by referring to the shifting diagram shown in FIG. 6.

In a case where the execution of the shifting of the automatic shifting portion 20 is determined, the accelerator pedal is deeply depressed or released in a manner as shown by the transition c⟷d on the solid line C in FIG. 6 to allow the targeted total gear ratio γT to vary in the varying width exceeding the given variable. When this takes place, the gear ratio change determining means 86 determines whether or not the so-called skipped shifting is present with the total gear ratio γT varying in the non-continuous manner, i.e., skipping stepwise.

If the gear ratio change determining means 86 determines that no skipped shifting is present, then, the hybrid control means 52 executes the shifting of the differential portion 11 so as to continuously vary the engine rotation speed $N_E$ on the stage before and after the shifting. In contrast, if the determination is made that the skipped shifting is present, then, the hybrid control means 52 executes the shifting of the differential portion 11 independently of the shifting of the automatic shifting portion 20.

Further, even if the gear ratio change determining means 86 determines that no skipped shifting is present or that the skipped shifting is present, the step variable control means 54 executes the shifting of the automatic shifting portion 20 with the differential portion 11 placed in the continuously variable shifting state so as to allow the rotation speed $N_{18}$ of the transmitting member 18 to achieve the given variation.

More particularly, if the differential state determining means 80 determines that the differential portion 11 is placed in the continuously variable shifting state, the engaging control-variable control means 84 performs a control, as described below, so as to allow the rotation speed $N_{18}$ of the transmitting member 18 to achieve the given variation during the operation of the step variable shift control means 54 for executing the shifting of the automatic shifting portion 20, regardless of the determining result as to whether or not the gear ratio change determining means 86 determines that the skipped shifting is present. That is, the operation is executed to control the engaging pressure of the engaging device, associated with the shifting of the automatic shifting portion 20, for use in the engaging command (shifting output) to be output from the step variable shift control means 54 to the hydraulic control circuit 42.

Thus, with the differential portion 11 placed in the non-continuously variable shifting state, the rotation speed $N_{18}$ of the transmitting member 18 and the engine rotation speed $N_E$ are uniquely determined with the vehicle speed V and the gear ratio γ of the automatic shifting portion 20. To this end, the engaging control-variable control means 84 controls the engaging pressure of the engaging device so as to allow the rotation speed $N_{18}$ of the transmitting member 18 and the engine rotation speed $N_E$ to achieve the given variations. However, when the differential portion 11 is placed in the continuously variable shifting state, the engine rotation speed $N_E$ lies in a freely rotating state due to the differential action of the differential portion 11. Therefore, the engaging pressure of the engaging device is controlled such that the rotation speed $N_{18}$ of the transmitting member 18, uniquely determined with the vehicle speed V and the gear ratio γ of the automatic shifting portion 20, achieves the given variation. Torque-down control means 88 performs operations to decrease torque to be transferred to the drive wheels 38. Such operations include: throttling the opening of an electronic control throttle valve 94; decreasing a fuel quantity to be supplied by a fuel injection device 96; and initiating an ignition device 98 for retarding an ignition timing of the engine 8. Thus, with the engine torque down control executed for decreasing engine torque $T_E$, reductions occur in torque, transferred to the drive wheels 38, such as for instance input torque $T_{IN}$ or output torque $T_{OUT}$ of the automatic shifting portion 20. Moreover, the torque down control means 88 executes a motor torque down control in addition to the engine torque down control or in independent manner.

During the motor torque down control, the inverter 58 controls the second electric motor M2 so as to temporarily generate reverse drive torque and to allow the second electric motor M2 to temporarily generate reverse drive torque or regenerative braking torque for the charging of the electric storage device 60 to be performed. This results in a reduction in torque transferred to the drive wheels 38. With the differential portion 11 placed in the step variable shifting state, the motor torque down control may be executed using the first electric motor M1 in place of the second electric motor M2 or in addition thereto.

Now, description is made of a case where the switching control means 50 switches the differential portion 11 to the step variable shifting state to cause a whole of the shifting mechanism 10 to function as the step variable automatic transmission. In this case, if the step variable shift control means 54 executes, for instance, the up shifting in the automatic shifting portion 20, the input rotation speed $N_{IN}$ of the automatic shifting portion 20, i.e., the rotation speed $N_{18}$ of the transmitting member 18 vary (in the so-called inertia phase) with the occurrence of the up shifting in the source of the shifting. In the inertia phase, the engine 8 temporarily releases energy with a decrease in the engine rotation speed $N_E$. This results in a torque increment in torque, transferred to the drive wheels 38, such as, for instance, a torque increment of input torque $T_{IN}$ or torque increment of output torque $T_{OUT}$ (in so-called inertia torques). Such inertia torques result in likelihood of the occurrence of shifting shocks.

Alternately, for instance, if the step variable shift control means 54 executes the shifting of the automatic shifting portion 20, the inertia phase occurs in the course of the shifting. This results in a reduction in the rotation speed of the second rotary element RE2 or the third rotary element RE3 of the differential portion 11 and/or a reduction in the rotation speed of at least one of the fourth rotary element RE4 to the eighth rotary element RE8 of the differential portion 11. This leads to likelihood of the shifting shocks occurring due to inertia torque appearing as the torque increment in torque transferred to the drive wheels 38.

Description is made of a case in which the switching control means 50 switches the differential portion 11 to the continuously variable shifting state to render a whole of the shifting mechanism 10 operative to function as the continuously variable transmission. In this case, the step variable shift control means 54 executes the shifting of the automatic shifting portion 20. This allows the hybrid control means 52 to execute the shifting of the differential portion 11 and, in the course of such a shifting, almost no variation takes place in the engine rotation speed $N_E$ or the variation in the engine rotation speed $N_E$ is minimized. The differential portion 11 performs the shifting such that no variation takes place in the total gear ratio γT of the shifting mechanism 10 on the stage before and after the shifting of the automatic shifting portion 20, or such a variation is minimized and made to be continuous.

Even in such a case, however, as the shifting of the automatic shifting portion 20 is performed, the inertia phase appears in the course of the shifting. When this takes place, inertia torque occurs as torque increases of torque transferred to the drive wheels 38. This results in likelihood of the shifting shocks occurring due to inertia torque arising as the torque increments in torque transferred to the drive wheels 38. The torque increments are transferred with decreases in the rotation speeds of the second and third rotary elements RE2 and RE3 of the differential portion 11 and/or a decrease in the rotation speed of at least one rotary element of the rotary elements forming the fourth rotary elements RE4 to the eighth rotary elements RE8 of the automatic shifting portion 20.

Therefore, the torque down control means 88 decreases torque, such as for instance input torque $T_{IN}$ or output torque $T_{OUT}$ of the automatic shifting portion 20, to be transferred to the drive wheels 38 during the operation of the step variable shift control means 54 for executing the shifting of the automatic shifting portion 20. In particular, the torque down control means 88 executes the engine torque down control and the motor torque down control in isolation or in combination thereof for thereby decreasing torque to be transferred to the drive wheels 38. This is because the torque increment, corresponding to the inertia torque, is cancelled in input torque $T_{IN}$ or output torque $T_{OUT}$ to some extents for suppressing the shifting shocks resulting from the inertia torque. The torque down control means 88 may execute the reduction in torque transferred to the drive wheels 38, during the inertia phase in the course of the shifting of the automatic shifting portion 20 at the same timing as that at which the hybrid control means 52 initiates the synchronizing control in the differential portion 11.

With the shifting mechanism 10 placed in the continuously variable shifting state, the torque-down effectuated by the torque down control means 92 often results in a decrease in output torque of the second electric motor M2, and with the shifting mechanism 10 placed in the step variable shifting state, is executed upon compelling the first electric motor M1 and/or the second electric motor M2 to generate reverse drive torque or regenerative braking torque.

Further, the torque down control means 88 performs the operation, in place of the function described above or in addition thereto, for decreasing torque transferred to the drive wheels 38 during the operation of the step variable shift control means 54 for executing the shifting of the automatic shifting portion 20. This cancels a fluctuation in torque, resulting from the engaging device being completely engaged in the automatic shifting portion 20, to some extent for thereby minimizing the engaging shock.

Thus, the torque down control means 88 decreases input torque $T_{IN}$ with a resultant suppression of the shifting shocks. Such a reduction in input torque $T_{IN}$ is executed so as to cancel inertia torque arising from the fluctuation in the rotation speed of the rotary element forming the automatic shifting portion 20 caused by the shifting thereof, and the torque increment corresponding to the inertia torque resulting from the fluctuation in the rotation speed of the rotary element inside the differential portion 11, which involves the fluctuation in the engine rotation speed $N_E$. In parallel to such an operation or in isolation therefrom, the fluctuation in torque resulting from the engaging device being completely engaged in the automatic shifting portion 20, is cancelled to some extent for thereby suppressing the shifting shocks.

Further, the hybrid control means 52 may perform a function, besides the function described above, to serve as rotation control means for positively (forcibly) varying the rotation speed $N_{18}$ of the transmitting member 18 using the motor M1 and/or the second electric motor M2. This is because the rotation speed $N_{18}$ of the transmitting member 18 achieves the given variation during the operation of the step variable shift control means 54 for executing the shifting of the automatic shifting portion 20.

Sometimes the rotation speed $N_{18}$ of the transmitting member 18 varies with the shifting of the automatic shifting portion 20 which is initiated with the use of the engaging pressure controlled with the engaging control variable control means 84 so as to allow the rotation speed $N_{18}$ of the transmitting member 18 to achieve the given variation. In contrast to such an affect, the illustrated embodiment has a capability of compelling the rotation speed $N_{18}$ of the transmitting member 18 to be further closer to the given variation.

Here, the engaging control-variable control means 84 controls the engaging pressure of the engaging device, associated with the shifting of the automatic shifting portion 20, for use in the hydraulic pressure command (shifting output) to be outputted to the hydraulic pressure control circuit 42 by the step variable shift control means 54. This is because the rotation speed $N_{18}$ of the transmitting member 18 achieves the given variation with the differential portion 11 placed in the continuously variable shifting state during the operation of the step variable shift control means 54 for executing the shifting of the automatic shifting portion 20 or the rotation speed $N_{18}$ of the transmitting member 18 or the engine rotation speed $N_E$ achieves the given variation with the differential portion 11 placed in the non-continuously variable shifting state.

The engaging control-variable control means 84 executes the operation so as to achieve, for instance, the given variation upon learning the engaging pressure of the engaging device. As set forth above, with the differential portion 11 placed in the continuously variable shifting state, the engine rotation speed $N_E$ is kept under the freely rotating state due to the differential action of the differential portion 11. With the differential portion 11 placed in the continuously variable shifting state, the engaging control-variable control means 84 learns the engaging pressure of the engaging device so as to allow the rotation speed $N_{18}$ of the transmitting member 18, uniquely determined with the vehicle speed V and the gear ratio γ of the automatic shifting portion 20, to achieve the given variation. The operation of the engaging control-variable control means 84 for learning the engaging pressure will be described below in detail.

The engaging control-variable control means 84 includes engaging control-variable learning control means, i.e., learning control means 100 acting as engaging pressure learning control means for learning the engaging pressure of the engaging device so as to achieve the given variation, learning control determining means 102 for determining whether or not the engaging pressure of the engaging device is learned, and learned value selecting means 104 for selecting a learned value for the engaging pressure of the engaging device for use in the shifting of the automatic shifting portion 20. Thus, the shifting results of the automatic shifting portion 20 are learned and the engaging pressures of the automatic shifting portion 20 for a subsequent cycle are corrected with corrected values being stored as hydraulic pressure learned value maps (control-variable learned value maps) on the engaging pressures of the engaging device as shown in FIG. 11.

FIG. 11 shows examples of the hydraulic pressure learned value maps, which are classified in up-shifting maps and down-shifting maps with FIG. 11A showing the up-shifting map and FIG. 11B showing the down-shifting map. The hydraulic pressure learned value maps, shown in FIG. 11, are divided in hierarchies (in distinction) based on magnitudes 1 to 7 of engine torque, respectively, and include respective hydraulic pressure learned values identified for a kind of gear positions such as "1→2" gear ratio and "2→3" gear ratio, etc., respectively.

For instance, in the up-shifting in "1→2" gear ratio with engine torque "1", the on-disengaging side engaging device has a hydraulic pressure learned value of "Pb3u121" and the on-engaging side engaging device has a hydraulic pressure learned value of "Pb2u121". In addition, the hydraulic pressure learned value maps are obtained as default values on the respective hydraulic pressure learned values preliminarily acquired on experiments and stored in, for instance, storage means 56 with the default values being rewritten to hydraulic pressure learned values with a progress of the learning executed by the learning control means 100. The learning control means 100 calculates engine torque based on the relationship, preliminarily and experimentally obtained, between the engine rotation speed $N_E$, varying on for instance a throttle valve opening $θ_{TH}$ as a parameter, and estimated engine torque $T_E'$. The calculation is executed based on an actual throttle opening $θ_{TH}$ and the engine rotation speed $N_E$.

Shift completion determining means 106 determines whether or not the step variable shift control means 54 completes the shifting of the automatic shifting portion 20. Such a determination depends on whether or not a given shift time, preliminarily and experimentally obtained, of the automatic shifting portion 20 has elapsed or whether or not an actual rotation speed $N_{18}$ of the transmitting member 18 is brought into synchronism with the rotation speed $N_{18}$ of the transmitting member 18 (that is, the rotation speed $N_{18}$ of the transmitting member 18 uniquely determined with the vehicle speed V and a subsequent gear ratio γ of the automatic shifting portion 20 appearing after the shifting thereof) resulting after the shifting.

Learning precondition establishment determining means, i.e., establishment determining means 108 determines whether or not a learning precondition is established for the learning control means 100 to learn the engaging pressure. For instance, the establishment determining means 108 determines whether or not the learning precondition is established depending on whether or not the shifting is normally executed and completed under a condition wherein: the fluctuation in engine torque falls in a given range during the shifting of the automatic shifting portion 20; the engine 8 has an engine water temperature $TEMP_W$ representing a complete warm-up of the engine 8; and an actuating oil temperature of the automatic shifting portion 20 falls in a predetermined appropriate value. As used herein, the expression "the given range in the fluctuation in engine torque" refers to a predetermined determination value representing that engine torque, appearing during the shifting, is present in any one of the hierarchies indicated in terms of the engine torques 1 to 7 in the hydraulic learned value maps shown in FIG. 11.

With the differential portion 11 placed in the continuously variable shifting state during the operation of the step variable shift control means 54 for executing the shifting of the automatic shifting portion 20, the learning control means 100 monitors the variation in the actual rotation speed $N_{18}$ of the transmitting member 18. Alternatively, with the differential portion 11 placed in the non-continuously variable shifting state, the learning control means 100 monitors the variation in the actual rotation speed $N_{18}$ of the transmitting member 18 or the actual engine rotation speed $N_E$ during the shifting of the automatic shifting portion 20 for comparison to the given variation.

Further, the learning control means 100 executes the learning control for correcting the engaging pressure of the engaging device so as to minimize a difference between the actual variation in the rotation speed and a given variation in a subsequent shifting operation. That is, the learning control means 100 makes an adjustment to increase or decrease the engaging pressure of the engaging device used in an immediately preceding shifting operation so as to achieve the given variation on a subsequent shifting cycle. Further, the learning control means 100 allows, in the hydraulic pressure learned value map shown in FIG. 11, the hydraulic pressure values, corresponding to engine torque and a kind of the shifting during the shifting, which are targeted to be learned, to be written to hydraulic pressures subsequent to the engaging pressures being corrected (after the regulation) on a current learning control for storage as new learned values.

During the operation of the step variable shift control means 54 for executing the shifting of the automatic shifting portion 20, sometimes the hybrid control means 52, acting as the rotation control means, varies the rotation speed $N_{18}$ of the transmitting member 18 so as to achieve the given variation using the first electric motor M1 and/or the second electric motor M2. In this case, the learning control means 100 inhibits the learning of the engaging pressure of the engaging device with no learning operation to be performed.

That is, forcibly varying the rotation speed $N_{18}$ of the transmitting member 18 using the first electric motor M1 and/or the second electric motor M2 allows the rotation speed $N_{18}$ of the transmitting member 18 to vary in a way closer to the given variation. This results in a learned value with a lessened corrected value in the engaging pressure during the learning control executed by the learning control means 100. It is considered that with no rotation speed $N_{18}$ of the transmitting member 18 being forcibly varied using the first electric motor M1 and/or the second electric motor M2, executing the shifting using such a learned value results in an increase in a difference between the variation in the actual rotation speed $N_{18}$ of the transmitting member 18 and the given variation by a forcibly increased variable using the first electric motor M1 and/or the second electric motor M2. For this reason, the learning control means 100 does not execute the leaning on the engaging pressure of the engaging device when the rotation speed $N_{18}$ of the transmitting member 18 is forcibly changed using the first electric motor M1 and/or the second electric motor M2.

Alternately, during the operation of the step variable shift control means 54 for executing the shifting of the automatic shifting portion 20, the hybrid control means 52, acting as the rotation control means, varies the rotation speed $N_{18}$ of the transmitting member 18 so as to achieve the given variation using the first electric motor M1 and/or the second electric motor M2, during which the learning control means 100 performs controls as described below. In place of performing the learning on the engaging pressure of the engaging device, the learning control means 100 learns the engaging pressure of the engaging device on consideration of the rotation speed $N_{18}$ of the transmitting member 18 being varied using the first electric motor M1 and/or the second electric motor M2.

That is, under a situation where no rotation speed $N_{18}$ of the transmitting member 18 is forcibly varied using the first electric motor M1 and/or the second electric motor like the situation under which no engaging pressure of the engaging device is learned, if the shifting is executed using such a learned value, an issue is deemed to arise as described below. Such an issue appears in an increase in a difference between the variation in the actual rotation speed $N_{18}$ of the transmitting member 18 and the given variation due to the forcible variable component caused by the use of the first electric motor M1 and/or the second electric motor M2. With the rotation speed $N_{18}$ of the transmitting member 18 caused to forcibly change with the use of the first electric motor M1 and/or the second electric motor M2, the learning control means 100 allows the engaging pressure of the engaging device to be learned in consideration of such a forcible variable component, i.e., in other words, upon subtracting such a forcible variable component.

In the illustrated embodiment, the shifting mechanism 10 has states in three modes depending on: whether or not the differential portion 11 is placed in the continuously variable shifting state with the step variable shift control means 54 executing the shifting of the automatic shifting portion 20; or whether the total gear ratio γT continuously varies or varies in the skipped shifting with the differential portion 11 placed in the continuously variable shifting state.

An inertia mass, as viewed the engine 8 from the automatic shifting portion 20, takes different values during the shifting depending on the continuously variable shifting state or the non-continuously variable shifting state of the differential portion 11 during the shifting of the automatic shifting portion 20. In the continuously variable shifting state, the rotation speed $N_{18}$ of the transmitting member 18 is caused to freely vary due to the differential action, regardless of the variation in the rotation speed $N_{18}$ of the transmitting member 18. In the non-continuously variable shifting state, the engine rotation speed $N_E$ is caused to vary with the variation in the rotation speed $N_{18}$ of the transmitting member 18. In other words, with the differential portion 11 placed in the non-continuously variable shifting state, the engine rotation speed $N_E$ varies with the inertia increasing to be greater during the shifting than that appearing in the continuously variable shifting state.

With the differential portion 11 placed in the non-continuously variable shifting state, the varying widths of the engine rotation speed $N_E$ and the rotation speed of the rotary member forming the differential portion 11 are different from each other depending on whether the total gear ratio γT continuously varies or the total gear ratio γT varies in the skipped shifting. With the total gear ratio γT varying in the skipped shifting with an increased variation in the engine rotation speed $N_E$, there is sometimes a greater inertia torque than that occurring when the total gear ratio γT continuously varies with, for instance, the rotation speed $N_{M1}$ of the first electric motor M1 varied to suppress the variation in the engine rotation speed $N_E$.

Accordingly, it is conceived that the engaging pressure of the engaging device forming the automatic shifting portion 20 for the given variation to be achieved has different values depending on the three modes in status of the shifting mechanism 10. Thus, in shifting of the automatic shifting portion 20, the learning control means 100 is required to execute the learning control on the engaging pressure in consideration to which of the three modes the state of the shifting mechanism 10 is related.

To this end, the learning control means 100 discriminates the hydraulic pressure learned values on the engaging pressure of the engaging device based on whether or not the differential portion 11 is placed in the continuously variable shifting state during the operation of the step variable shift control means 54 for executing the shifting of the automatic shifting portion 20. In addition, with the differential portion 11 placed in the continuously variable shifting state during the shifting of the automatic shifting portion 20, the learning control means 100 discriminates the hydraulic pressure learned values on the engaging pressure of the engaging device based on whether the variation of the total gear ratio $\gamma T$ belongs to the continuous variation or to the skipped shifting.

For instance, under a circumstance where during the operation of the step variable shift control means 54 for executing the shifting of the automatic shifting portion 20, the differential portion 11 is placed in the continuously variable shifting state and the variation of the total gear ratio $\gamma T$ belongs to the continuous variation, the learning control means 100 organizes a currently incident learned value as a pattern "A". Further, under another circumstance where the differential portion 11 is placed in the continuously variable shifting state and the variation of the total gear ratio $\gamma T$ belongs to the skipped shifting, the learning control means 100 organizes another currently incident learned value as a pattern "B".

Furthermore, under another circumstance where the differential portion 11 is placed in the non-continuously variable shifting state, the learning control means 100 organizes another currently incident learned value as a pattern "C". As a result, the patterns "A", "B" and "C" are stored as the hydraulic pressure learned value maps as shown in FIG. 11 in the three modes of the shifting mechanism 10 for the shifting of the automatic shifting portion 20.

The hydraulic pressure learned value maps for the patterns "A", "B" and "C" have default values originally stored for the patterns "A", "B" and "C" upon which the learning control is executed to rewrite the default values to related learned values for storage. The default values of the patterns "A", "B" and "C" are preliminarily and experimentally determined in consideration of the status of the shifting mechanism 10 during the shifting thereof.

For instance, the default value in the pattern "C", corresponding to the non-continuously variable shifting state of the differential portion 11 with an increase in the inertial mass during the shifting, is set such that the hydraulic pressure of the on-engaging side engaging device is higher than those of the on-engaging side engaging device in the patterns "A" and "B" corresponding to the continuously variable shifting state of the differential portion 11. This allows the on-engaging side engaging device to have an appropriate engaging torque capacity during the shifting of the automatic shifting portion 20. Moreover, the default value in the pattern "B", corresponding to the total gear ratio $\gamma T$ belonging to the skipped shifting with likelihood of an increase in inertia torque during the shifting, is set such that the hydraulic pressure of the on-engaging side engaging device is set to be further higher than that of the on-engaging side engaging device in the pattern "A" corresponding to the total gear ratio $\gamma T$ belonging to the continuous variation.

Thus, the learning control means 100 organizes the hydraulic pressure learned value maps as the patterns "A", "B" and "C" to be stored for the three modes of the shifting mechanism 10 during the shifting of the automatic shifting portion 20, respectively. From another point of view, during the shifting of the automatic shifting portion 20, the engaging device of the automatic shifting portion 20 needs to have different engaging pressures depending on which of the three modes is related to the status of the shifting mechanism 10. Therefore, the learning control means 100 learns the different engaging pressures of the engaging device for the three modes of the shifting mechanism 10, respectively, so as to obtain the hydraulic pressure learned value maps for the patterns "A", "B" and "C", respectively, for the three modes of the shifting mechanism 10, respectively. Thus, it can be said that methods of learning the hydraulic pressure learned values on the engaging pressure of the engaging device are altered based on the three modes of the shifting mechanism 10.

That is, the learning needs to be established on respective premises: one premise is that for the patterns "A" or "B" to be learned, at least the differential portion 11 is placed in the continuously variable shifting state; and the other premise is that for the pattern "C" to be learned, at least the differential portion 11 is placed in the non-continuously variable shifting state. Therefore, during the operation of the step variable shift control means 54 for executing the shifting of the automatic shifting portion 20, the learning control means 100 alters the method of learning the hydraulic pressure learned value on the engaging pressure of the engaging device, depending on whether or not the differential portion 11 is placed in the continuously variable shifting state.

Further, for the pattern "A" to be learned, it is a premise for the learning to be established that with at least the differential portion 11 placed in the continuously variable shifting state, the variation of the total gear ratio $\gamma T$ belongs to the continuous variation. Furthermore, for the pattern "B" to be learned, it is a premise for the learning to be established that with at least the differential portion 11 placed in the continuously variable shifting state, the variation of the total gear ratio $\gamma T$ belongs to the non-continuous variation, i.e., the skipped shifting. To this end, with the differential portion 11 placed in the continuously variable shifting state during the operation of the step variable shift control means 54 for executing the shifting of the automatic shifting portion 20, the learning control means 100 alters the method of learning the hydraulic pressure learned value of the engaging pressure of the engaging device depending on whether or not the variation of the total gear ratio $\gamma T$ belongs to the continuous variation or the skipped shifting.

During the operation of the step variable shift control means 54 for executing the shifting of the automatic shifting portion 20, the learned value selecting means 104 selects the hydraulic pressure learned value, organized and stored by the learning control means 100 as the patterns "A", "B" and "C", based on the state of the shifting mechanism 10 during the shifting of the automatic shifting portion 20. At the same time, the learning control means 100 selects the learned value on the engaging pressure of the engaging device for use in the automatic shifting portion 20 based on engine torque $T_E$ and the kind of the shifting.

However, it is not necessarily the case that the learning control means 100 executes the learning on a whole of the predetermined default values for the hydraulic pressure learned value maps on the patterns "A", "B" and "C". In view of this, if the selection is made of the default value which is not yet learned with the learned value selecting means 104 does as the learned value on the engaging pressure of the engaging device, the learning control means 100 corrects the relevant default value based on a already learned learning values distinguished by the same engine torque and the kind of gear positions in the different hydraulic pressure learned value maps. Hereunder, such a control action will be described below with reference to the three modes of the shifting mechanism 10 initiated during the shifting of the automatic shifting portion 20.

During the shifting of the automatic shifting portion 20, sometimes the hydraulic pressure learning map (pattern "A" or pattern "B") used in the differential portion 11 placed in the continuously variable shifting state belongs to an unlearned default value "A", and the hydraulic pressure learning map (pattern "C") for use in the differential portion 11 placed in the non-continuously variable shifting state belongs to the learned value "C". In this case, the learning control means 100 corrects the default value "A" for the continuously variable shifting state based on the learned value "C" acquired upon the learning thereof in the non-continuously variable shifting state.

On the contrary, during the shifting of the automatic shifting portion 20, sometimes the hydraulic pressure learning map (pattern "C") used in the differential portion 11 placed in the continuously variable shifting state belongs to an unlearned default value "C" and the hydraulic pressure learning map (pattern "A" or pattern "B"), for use in the differential portion 11 placed in the continuously variable shifting state, belongs to a learned value "A". In this case, the learning control means 100 corrects the default value "C" for the non-continuously variable shifting state based on the learned value "A" acquired upon the learning thereof in the continuously variable shifting state.

Thus, the learning control means 100 alters the method of learning the hydraulic pressure learned value on the engaging pressure of the engaging device, based on whether or not the differential portion 11 is placed in the continuously variable shifting state during the operation of the step variable shift control means 54 for the shifting of the automatic shifting portion 20.

Further, during the shifting of the automatic shifting portion 20, sometimes the hydraulic pressure learning map (pattern "A"), used in the differential portion 11 placed in the continuously variable shifting state and the variation of the total gear ratio γT belonging to the continuous variation, belongs to the unlearned default value "A", and the hydraulic pressure learning map (pattern "B"), for use in the differential portion 11 placed in the continuously variable shifting state with the variation of the total gear ratio γT belonging to the skipped shifting, belongs to the learned value "B". In this case, the learning control means 100 correct the default value "A" based on the learned value "B" acquired upon the learning.

On the contrary, during the shifting of the automatic shifting portion 20, sometimes the hydraulic pressure learning map (pattern "B"), used in the differential portion 11 placed in the continuously variable shifting state and the variation of the total gear ratio γT belonging to the skipped shifting, belongs to the unlearned default value "B", and the hydraulic pressure learning map (pattern "A"), for use in the differential portion 11 placed in the continuously variable shifting state with the variation of the total gear ratio γT belonging to the continuous variation, belongs to the learned value "A". In this case, the learning control means 100 corrects the default value "A" based on the default value "B" acquired upon the learning.

Thus, during the operation of the step variable shift control means 54 for the shifting of the automatic shifting portion 20, the learning control means 100 alters the method learning the hydraulic pressure learned value of the engaging pressure of the engaging device, based on whether or not the differential portion 11 is placed in the continuously variable shifting state and whether the variation of the total gear ratio γT belongs to the continuous variation or the skipped shifting.

More particularly, the learning control means 100 corrects the default value "A" for the hydraulic pressure learned values Pb3u121 and Pb2u121, distinguished by the upshift "1→2" gear ratio in engine torque 1 in the hydraulic pressure learned value map for the pattern "A", based on the default value "B" for the hydraulic pressure learned values Pb3u121 and Pb2u121, distinguished by the upshift "1→2" gear ratio in engine torque 1 in the hydraulic pressure learned value map for the pattern "B".

For instance, if the learned value "B" has a trend to be corrected in an underlapping-side, the learning control means 100 corrects the default value "A" toward the underlapping-side to some increment to store the corrected default value "A" as the learned value "A". In contrast, if the learned value "B" has a trend to be corrected an overlapping-side, the learning control means 100 corrects the default value "A" toward the overlapping-side to some increment to store the corrected default value "A" as the learned value "A". That is, no easy comparison can be made because the hydraulic pressure values are originally distinguished from each other in terms of the same engine torque and the kind of the gear positions in the patterns "A", "B" and "C". Thus, a predetermined percentage of the default values are corrected in terms of the trend in the learning for the default value "B" in the learned value "B".

The learned value selecting means 104 selects the learned value "A" as the learned value on the engaging pressure of the engaging device to be used in the shifting of the automatic shifting portion 20. In addition, if no learning is executed in the different hydraulic pressure learned value maps with no correction made on the default value A by the learning control means 100, the default value "A" is selected intact as the learned value on the engaging pressure of the engaging device for use in the shifting of the automatic shifting portion 20.

Thus, the learning control means 100 indirectly corrects the engaging pressure of the engaging device using the method of learning the hydraulic pressure learned value for correcting the default value based on the learned value for which the learning has been already executed. This correction is performed independently of the method of learning the hydraulic pressure learned value in which the engaging pressure of the engaging device is directly corrected so as to suppress a difference between an actual variation in the rotation speed and the given variation in a subsequent shifting operation. That is, it can be said that the learning control means 100 alters the method of learning the hydraulic pressure learned value of the engaging pressure of the engaging device, depending on the direct correction on the engaging pressure based on the actual shifting and the indirect correction on the engaging pressure based on the other learned value.

The learning control determining means 102 determines whether or not the learning control means 100 learns the respective default values on the respective hydraulic learned value maps for the patterns "A", "B" and "C". This determination belongs to a judgment whether or not the learning control means 100 already rewrites the hydraulic pressure values in the respective hydraulic learned value maps for the patterns "A", "B" and "C" to the learned values.

Figure 12:
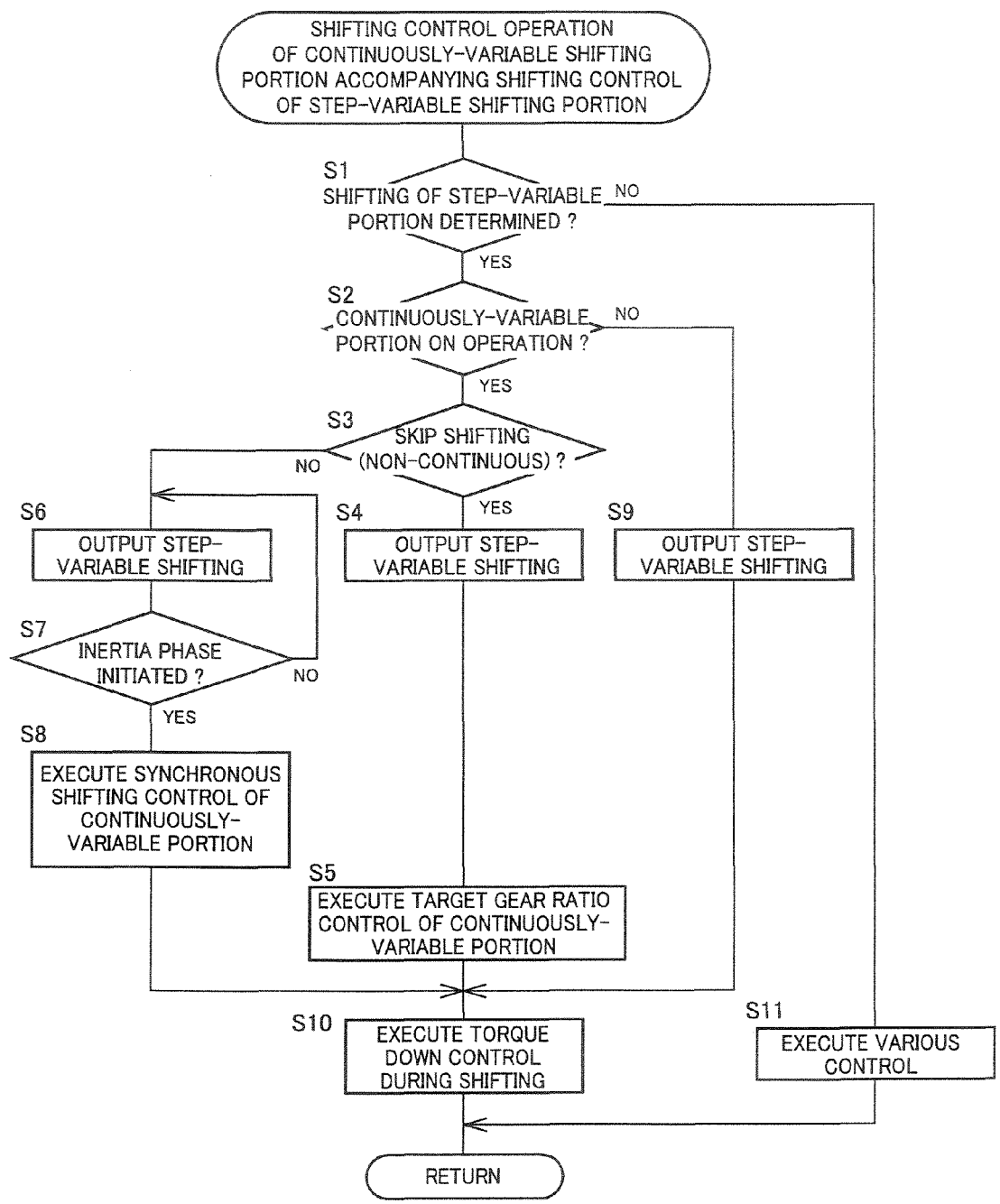
FIG. 12 is a flowchart for illustrating control operations to be executed by an electronic control device shown in FIG. 5, i.e., shifting control operations to be executed by a differential portion during a shifting control of the automatic shifting portion.
Figure 13:
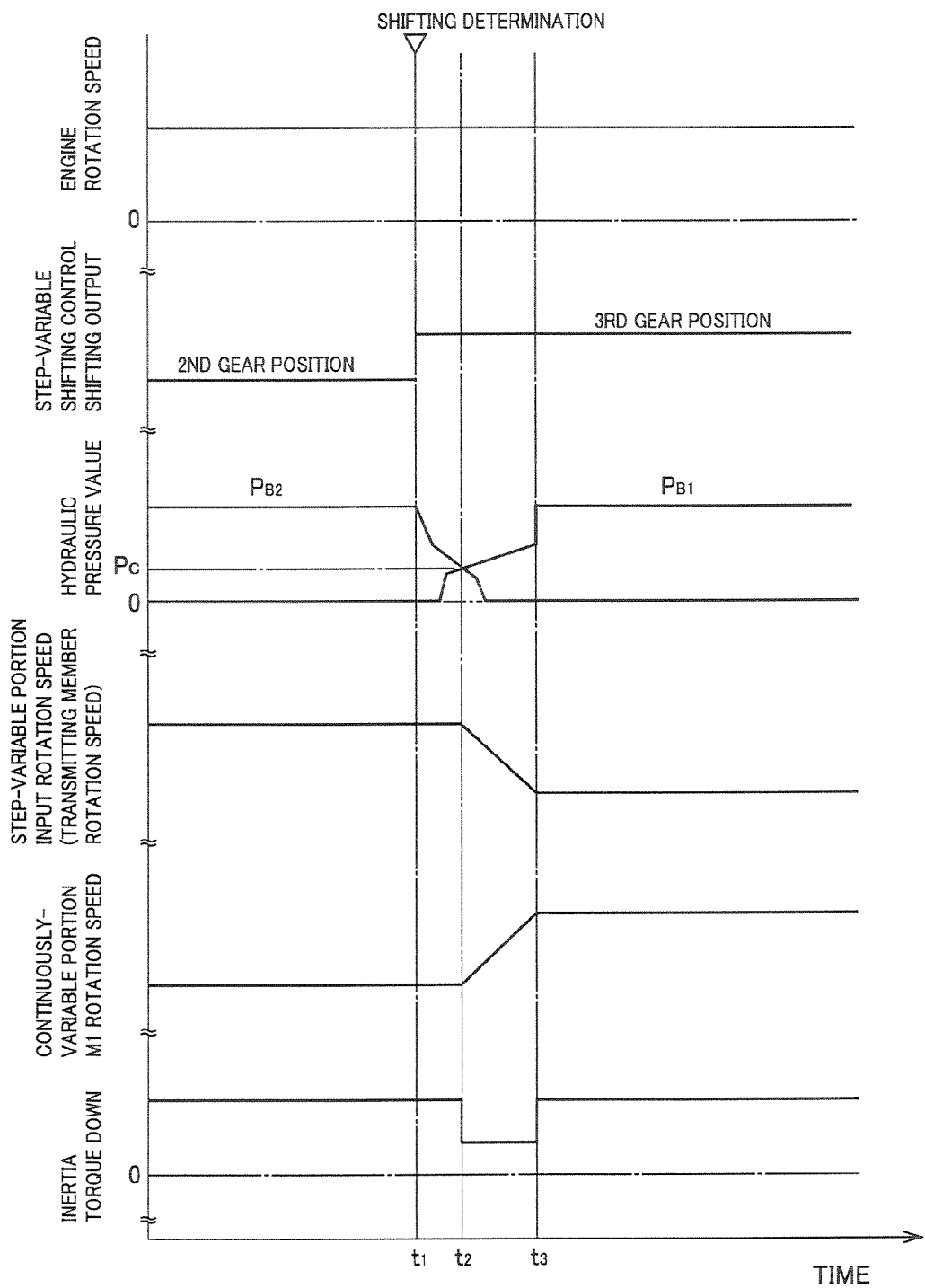
FIG. 13 is a timing chart, illustrating the control operations shown in the flowchart of FIG. 12, which represents a control operation when the automatic shifting portion executes an up-shifting in 2nd→3rd gear ratio with the differential portion placed in the continuously variable shifting state.
Figure 14:
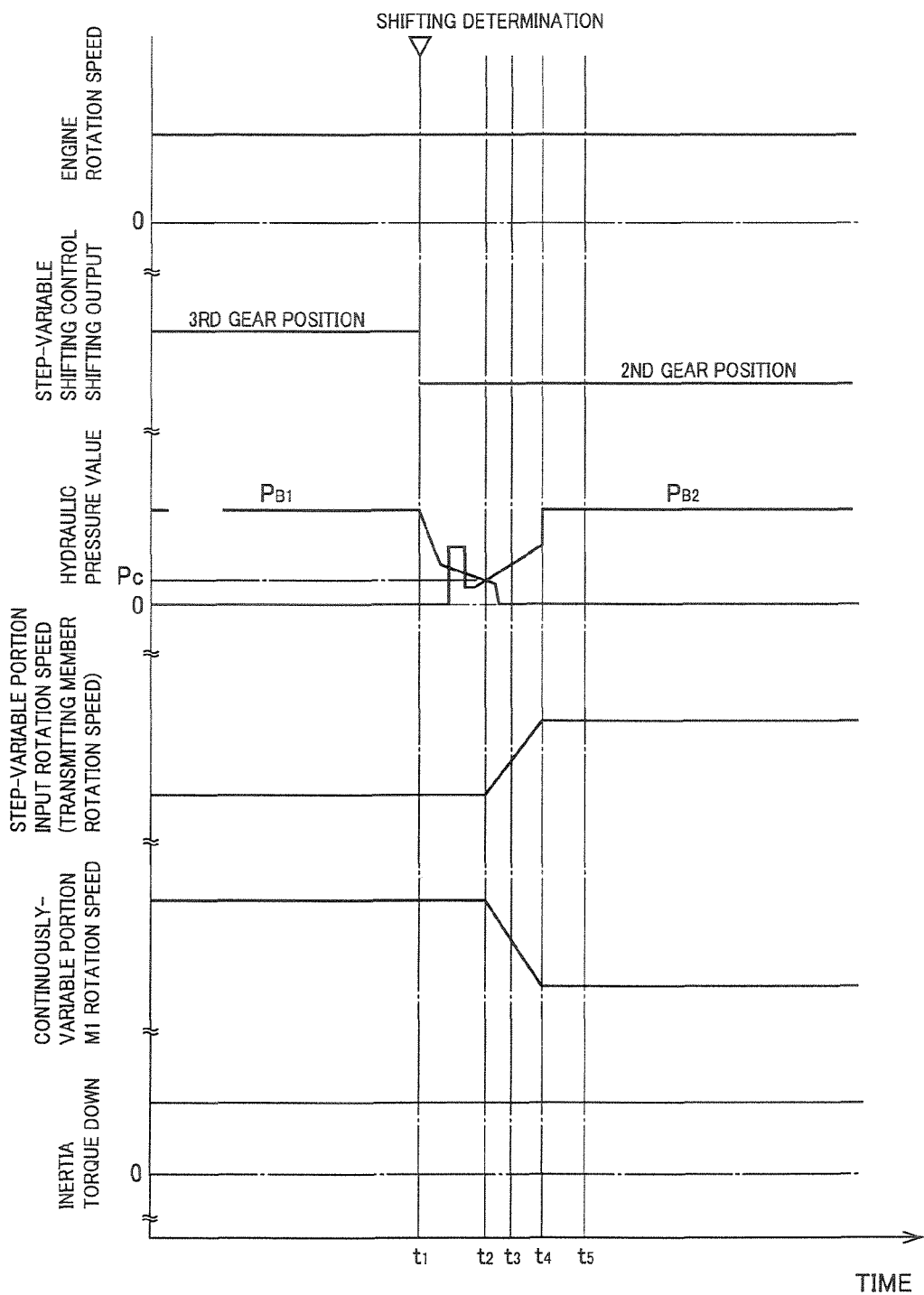
FIG. 14 is a timing chart, illustrating the control operations shown in the flowchart of FIG. 12, which represents a control operation when the automatic shifting portion executes a downshifting in 3rd→2nd gear ratio with the differential portion placed in the continuously variable shifting state.

FIG. 12 is a flowchart illustrating an essence of control operations to be executed by the electronic control device 40, that is, the shifting control operations to be executed by the shifting mechanism 10. This sequence is repeatedly executed on an extremely short cycle time in the order of about several milliseconds to several tens milliseconds. FIG. 13 is a timing chart, illustrating the control operations represented in the flowchart shown in FIG. 12, which represents the control operations to be executed when executing the up-shifting "2nd→3rd" gear ratio in the automatic shifting portion 20 with the differential portion 11 placed in the continuously variable shifting state. FIG. 14 is a timing chart, illustrating the control operations represented in the flowchart shown in FIG. 12, which represents the control operations to be executed when executing a coast downshifting "3rd→2nd" in the automatic shifting portion 20 with the differential portion 11 placed in the continuously variable shifting state.

Figure 15:
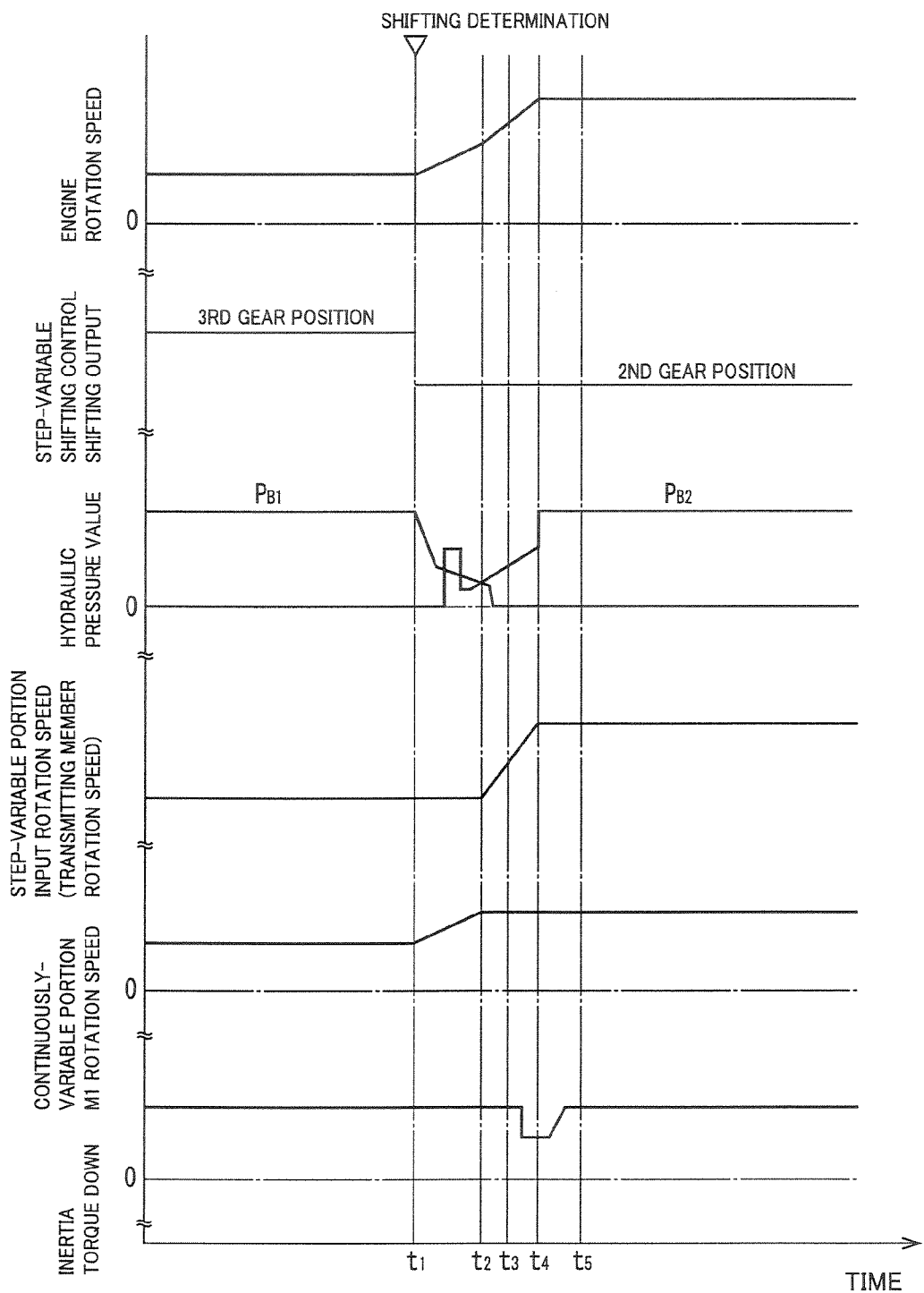
FIG. 15 is a timing chart, illustrating the control operations shown in the flowchart of FIG. 12, which represents a control operation when the automatic shifting portion executes a power-on downshifting in 3rd→2nd gear ratio with the differential portion placed in a skipped shifting state.
Figure 16:
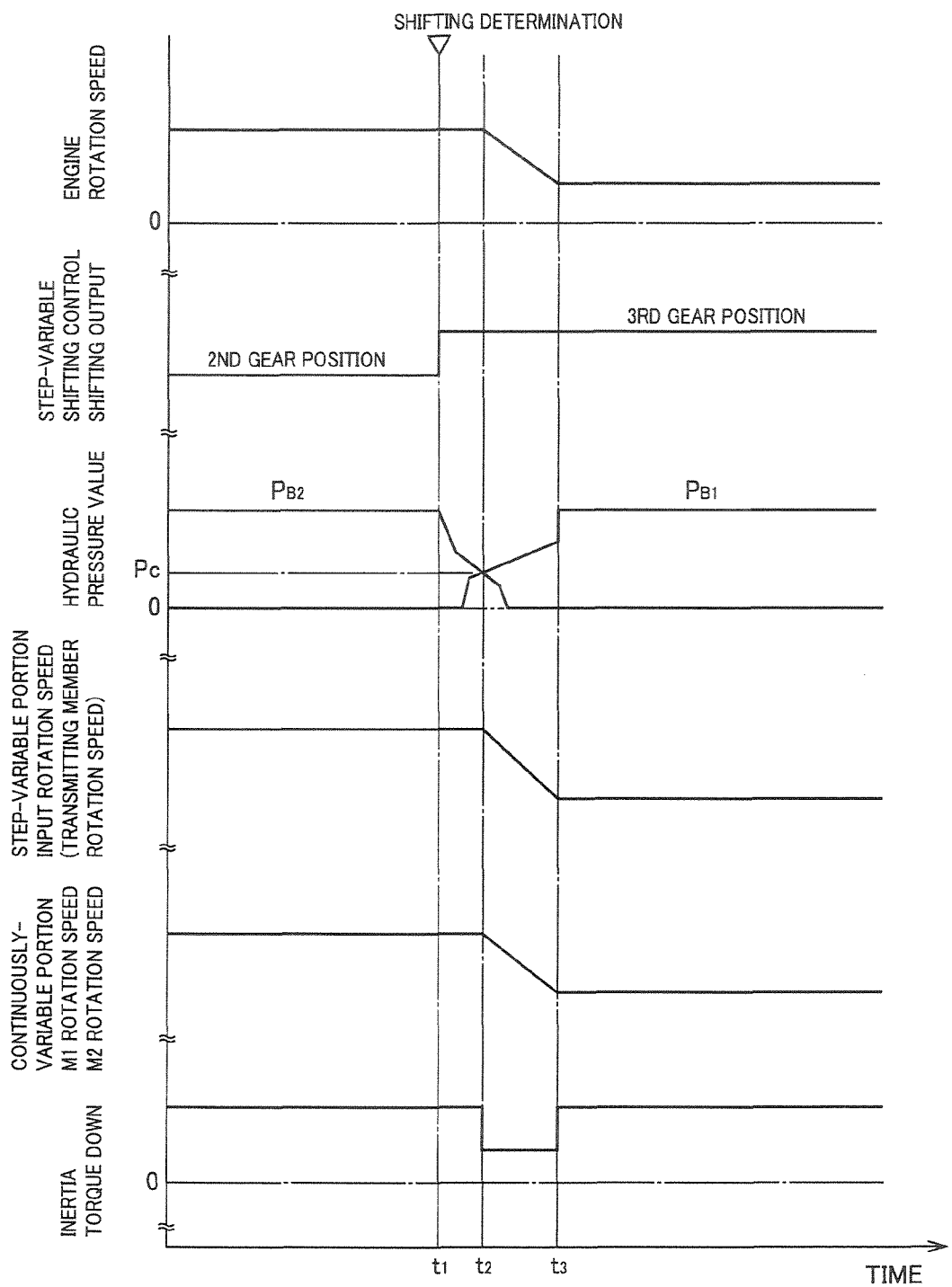
FIG. 16 is a timing chart, illustrating the control operations shown in the flowchart of FIG. 12, which represents a control operation when the automatic shifting portion executes the up-shifting in 2nd→3rd gear ratio with the differential portion placed in a step variable shifting state (locked state).
Figure 17:
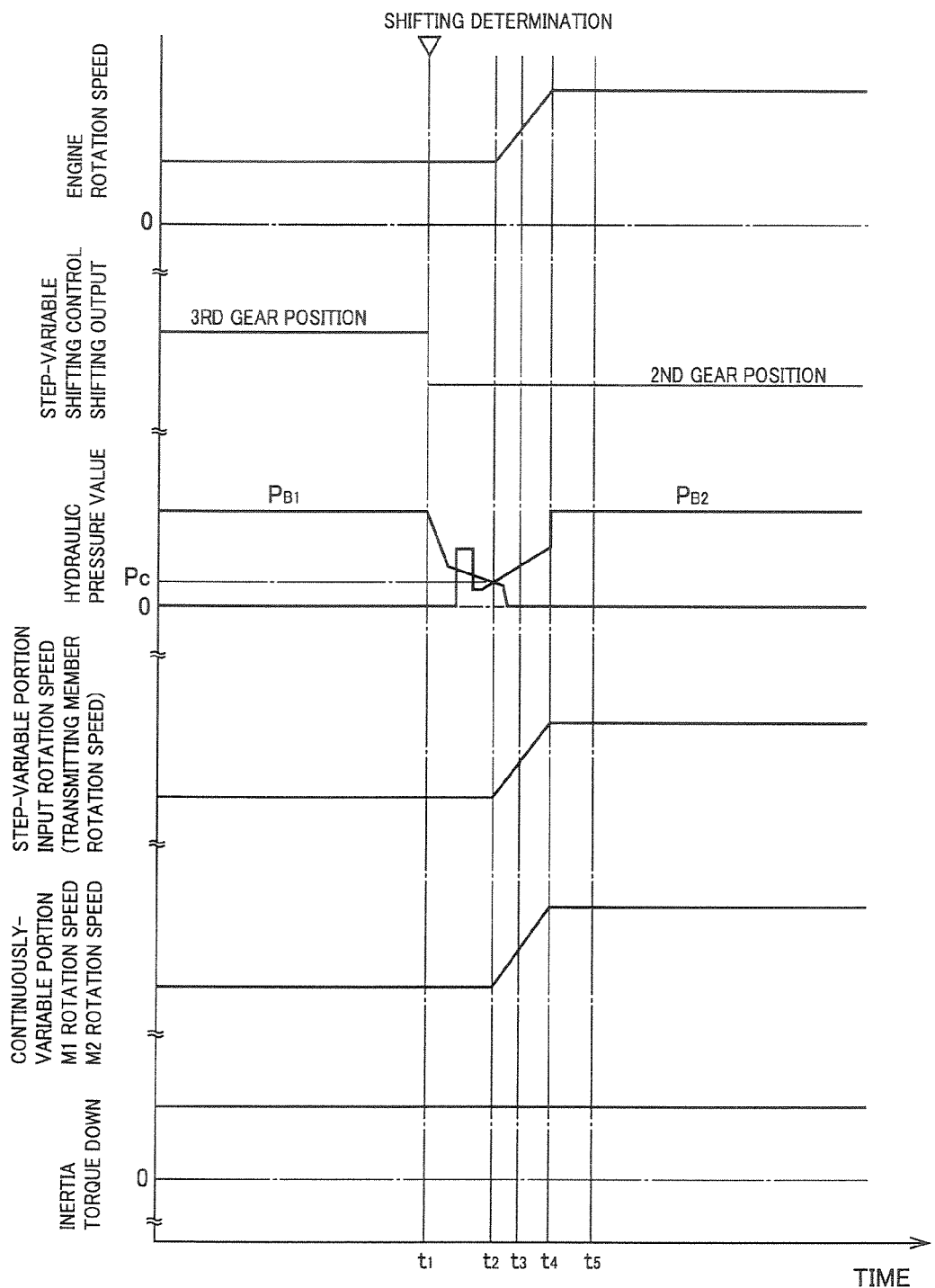
FIG. 17 is a timing chart, illustrating the control operations shown in the flowchart of FIG. 12, which represents a control operation when the automatic shifting portion executes a coast-downshifting in 3rd→2nd gear ratio with the differential portion placed in a step variable shifting state (locked state).

FIG. 15 is a timing chart, illustrating the control operations represented in the flowchart shown in FIG. 12, which represents the control operations to be executed when executing a power-on downshifting "3rd→2nd" gear ratio in the skipped shifting in the automatic shifting portion 20 with the differential portion 11 placed in the continuously variable shifting state. FIG. 16 is a timing chart, illustrating the control operations represented in the flowchart shown in FIG. 12, which represents the control operations to be executed when executing an up-shifting "2nd→3rd" gear ratio in the automatic shifting portion 20 with the differential portion 11 placed in the step variable shifting state (locked state). FIG. 17 is a timing chart, illustrating the control operations represented in the flowchart shown in FIG. 12, which represents the control operations to be executed when executing a coast downshifting "3rd→2nd" gear ratio in the automatic shifting portion 20 with the differential portion 11 placed in the step variable shifting state (locked state).

First, in step S1 corresponding to the step variable shift control means 54, the determination is made whether or not the shifting of the automatic shifting portion 20 is executed. The determination depends on whether or not the gear position to be shifted in the automatic shifting portion 20 is determined based on the vehicle condition represented by the vehicle speed V and the output torque $T_{OUT}$ of the automatic shifting portion 20 by referring to, for instance, the shifting diagram shown in FIG. 6.

A time instant $t_1$ in FIG. 13 and a time instant $t_1$ in FIG. 16 represent that the up-shifting "2nd→3rd" gear ratio in the automatic shifting portion 20 is determined. Further, a time instant $t_1$ in FIG. 14 and a time instant $t_1$ in FIG. 17 represent that the downshifting "3rd→2nd" gear ratio in the automatic shifting portion 20 is determined.

With the determination in step S1 made positive, then, in step S2 corresponding to the differential state determining means 80, the determination is made whether or not the power distributing mechanism 16 is placed in the differential state, that is, the differential portion 11 is placed in the continuously variable shifting state. The determination is based on whether or not the vehicle condition is located within a continuously variable control region to render the shifting mechanism 10 to be placed in the continuously variable shifting state by referring to, for instance, the shifting diagram shown in FIG. 6.

If the determination in step S2 is made positive, then, in step S9 corresponding to the step variable shift control means 54, a shift command (hydraulic pressure command) is output to the hydraulic pressure control circuit 42 for the gear position, determined in step S1, to be shifted in the automatic shifting portion 20. The learned value selecting means 104 selects the hydraulic pressure, used in such a hydraulic pressure command, based on the hydraulic pressure learned value map for the pattern "C" learned and stored such that during the shifting the rotation speed $N_{18}$ of the transmitting member 18 to achieve the given variation or the engine rotation speed $N_E$ achieves the given variation.

The time instant $t_1$ in FIG. 16 indicates a timing at which with the differential portion 11 remained under the locked state, a shift command is output for the automatic shifting portion 20 to perform a shift in the 3rd-gear position to begin decreasing an disengaging hydraulic pressure $P_{B2}$ of the second brake B2 acting as the on-disengaging side engaging device.

During a time period from $t_1$ to $t_3$, a engaging hydraulic pressure $P_{B1}$ of the first brake B1 acting as the on-engaging side engaging device is raised, and at time instant $t_3$, the engaging action of the first brake B1 is completed to finish a series of shifting operations. A transition hydraulic pressure in the on-disengaging side engaging device and a transition hydraulic pressure in the on-engaging side engaging device are preliminarily set, as shown in the drawing, using the learned value for the up-shifting "2nd→3rd" gear ratio selected from the hydraulic pressure learned value in the pattern "C" such that the rotation speed $N_{18}$ of the transmitting member 18 achieves the given variation, or the engine rotation speed $N_E$ achieves the given variation.

In the illustrated embodiment shown in FIG. 16, the shifting is performed with the differential portion 11 held in the locked state, causing the shifting mechanism 10 as a whole to function as the step variable transmission. Therefore, with the vehicle speed V remains constant, the input rotation speed $N_{IN}$ (the rotation speed $N_{18}$ of the transmitting member 18) of the automatic shifting portion 20 is caused to decrease with a decrease in the engine rotation speed $N_E$ during the occurrence of the up-shifting as shown in the drawing. With the differential portion 11 held in the locked state like the illustrated embodiment, the rotation speed $N_{18}$ of the transmitting member 18 and/or the engine rotation speed $N_E$ may be positively varied to be close to the given variations using the first electric motor M1 and/or the second electric motor M2 in a substantially synchronism with the initiation of the inertia phase from the time instant $t_2$.

The time instant $t_1$ in FIG. 17 represents a timing at which with the differential portion 11 remained in the locked state, the shift command is output for the automatic shifting portion 20 to establish the 2nd-gear position and a drop begins to occur in the engaging hydraulic pressure $P_{B1}$ of the first brake B1 acting as the on-disengaging side engaging device. During a time period from $t_1$ to $t_4$, the engaging hydraulic pressure $P_{B2}$ of the second brake B2 acting as the on-engaging side engaging device is raised, and at a time instant $t_4$, the engaging action of the second brake B2 is completed to finish a series of shifting operations. A transition hydraulic pressure in the on-disengaging side engaging device and a transition hydraulic pressure in the on-engaging side engaging device are preliminarily set using the learned value for the downshifting "3rd→2nd" gear ratio selected from the hydraulic pressure learned value for the pattern "C", as shown in the drawing, such that the rotation speed $N_{18}$ of the transmitting member 18 achieves the given variation or the engine rotation speed $N_E$ achieves the given variation.

For, instance, as the on-engaging side engaging device begins to be supplied with the hydraulic pressure as shown in FIG. 17, a high hydraulic pressure command is output to rapidly charge actuating oil so as to immediately narrow a back-clearance of the on-engaging side engaging device. Thus, if the engaging device remains engaged with a high hydraulic pressure intact, sometimes a shocks occur during the engaging. With such likelihood in mind, a low hydraulic pressure value command is output once at an engaging initiating time, after which a hydraulic pressure value command is output so as to increment or decrement the hydraulic pressure value toward a targeted hydraulic pressure value for the engaging to be completed.

In the illustrated embodiment shown in FIG. 17, further, since the differential portion 11 executes the shifting under the locked state, the shifting mechanism 10 is caused to function as the step variable transmission as a whole. Therefore, with the vehicle speed V kept constant, the input rotation speed $N_{IN}$ (the rotation speed $N_{18}$ of the transmitting member 18) of the automatic shifting portion 20 and the engine rotation speed $N_E$ are caused to increase with the occurrence of the downshift as shown in the drawing. With the differential portion 11 held in the locked state like the illustrated embodiment, further, the rotation speed $N_{18}$ of the transmitting member 18 and/or the engine rotation speed $N_E$ may be positively varied so as to approach the given variations using the first electric motor M1 and/or the second electric motor M2 in substantially synchronism with the initiation of the inertia phase from the time instant $t_2$.

However, if the determination in step S2 is made positive, then in step S3 corresponding to the gear ratio change determining means 86, the accelerator pedal is deeply depressed or released as shown in the transition "c↔d." indicated by the solid line C in FIG. 6. This causes the total gear ratio γT to have a varying width greater than a given value. Therefore, the determination is made whether or not the variation of the total gear ratio γT belongs to the non-continuous variation, i.e., the so-called skipped shifting with the total gear ratio γT skipping step-by-step.

If the determination in step S3 is made positive, then in step S4 corresponding to the step variable shift control means 54, the shift command (hydraulic pressure command) is output to the hydraulic pressure control circuit 42 for the automatic shifting portion 20 to be initiated in the gear position determined in step S1. The learned value selecting means 104 selects the hydraulic pressure value used in such a hydraulic pressure command, from the hydraulic pressure learned values in the pattern "B" learned and stored so as to allow the rotation speed $N_{18}$ of the transmitting member 18 to achieve the given variation during the shifting.

At nearly the same time with step S4, in step S5 corresponding to the hybrid control means 52, the differential portion 11 executes the shifting so as to control the actual total gear ratio γT toward the targeted total gear ratio γT with the use of a stepwise gear ratio change caused by the shifting of the automatic shifting portion 20 executed in step S4. This shifting is independently executed in non-synchronism with the shifting of the automatic shifting portion 20. In steps S4 and S5, the so-called skipped shifting is executed to allow the total gear ratio γT to skip step-by-step.

The time instant $t_1$ in FIG. 15 indicates a timing at which the shift command is output for the automatic shifting portion 20 to be shifted in the 2nd-speed, with a drop in the disengaging hydraulic pressure $P_{B1}$ of the first brake B1 acting as the on-disengaging side engaging device. During a time period from $t_1$ to $t_4$, the engaging hydraulic pressure $P_{B2}$ of the second brake B2 acting as the on-engaging side engaging device is raised, and at the time instant $t_4$, the second brake B2 is disengaged to complete the shifting of the automatic shifting portion 20.

The transition hydraulic pressure of the on-disengaging side engaging device and the transition hydraulic pressure of the on-engaging side engaging device are preset so as to allow the rotation speed $N_{18}$ of the transmitting member 18 to achieve the given variation upon using the learned value for achieving the downshifting in "3rd→2nd" gear position selected from the hydraulic pressure learned values in the pattern "B" as shown in the drawing. Like the illustrated embodiment shown in FIG. 17, for instance, a high hydraulic pressure value command is output at a timing when the hydraulic pressure begins to be supplied to the on-engaging side engaging device. At the engaging commencing timing, a low hydraulic pressure value command is output once, after which a hydraulic pressure value command is output so as to gradually increase the hydraulic pressure value toward the hydraulic pressure value for the engaging to be completed.

In the illustrated embodiment shown in FIG. 15, further, the rotation speed $N_{M1}$ of the first electric motor M1 is raised after the time instant t1 to increase the gear ratio γ0 of the differential portion, thereby raising the engine rotation speed $N_E$. Thus, the input rotation speed $N_{IN}$ (the rotation speed $N_{18}$ of the transmitting member 18) of the automatic shifting portion 20 increases with the downshifting of the automatic shifting portion 20. In addition, the engine rotation speed $N_E$ increases with the rotation speed $N_{M1}$ of the first electric motor M1 kept substantially constant. The differential portion 11 executes the shifting using at least the first electric motor M1 due to the differential action of the differential portion 11 so as to allow the differential portion 11 to finally regulate the total gear ratio γT toward the targeted total gear ratio γT.

Thus, with the illustrated embodiment belonging to the skipped shifting, the total gear ratio γT is caused to vary non-continuously (stepwise). To this end, the differential portion 11 executes the shifting in non-synchronism with the shifting of the automatic shifting portion 20 to utilize the stepwise change in gear ratio resulting from the shifting such that the total gear ratio γT approaches the targeted total gear ratio γT, i.e., the engine rotation speed $N_E$ to be achieved after the shifting. This results in improved shifting response. With the differential portion placed in the continuously variable shifting state like this illustrated embodiment, further, the rotation speed $N_{18}$ of the transmitting member 18, variable with the shifting of the automatic shifting portion 20, may be positively varied using the second electric motor M2 in nearly synchronism with the initiation of the inertia phase from the time instant $t_2$ so as to approach the given variation.

If the determination in step S3 is made negative, then in step S6 corresponding to the step variable shift control means 54, the shift command is output to the hydraulic pressure control circuit 42 for the automatic shifting portion 20 to be shifted to the gear position determined in step S1. The learned value selecting means 104 selects the hydraulic pressure value for use in such a hydraulic pressure command based on the hydraulic pressure learned values in the pattern "A" learned and stored so as to cause the rotation speed $N_{18}$ of the transmitting member 18 to achieve the given variation during the shifting.

The time instant $t_1$ in FIG. 13 indicates a timing at which a shift command is output for the automatic shifting portion 20 to be shifted in a 3rd-gear ratio with the commencement of a drop in the engaging hydraulic pressure $P_{B2}$ of the second brake B2 acting as the on-disengaging side engaging device. During a time period from $t_1$ to $t_3$, the engaging hydraulic pressure $P_{B1}$ of the first brake B1 acting as the on-engaging side engaging device is raised and at the time instant $t_3$, the engaging action of the first brake B1 is completed finishing the shifting of the automatic shifting portion 20. During the time period between the time instants $t_1$ and $t_3$, the transition hydraulic pressure in the on-disengaging side engaging device and the transition hydraulic pressure in the on-engaging side engaging device are preset using the learned value for achieving the up-shifting of the "2nd→3rd" gear ratio selected from the hydraulic pressure learned value in the pattern "A", as shown in the drawing, such that the rotation speed $N_{18}$ of the transmitting member 18 achieves the given variation.

The time instant $t_1$ in FIG. 14 indicates a timing at which a shift command is output for the automatic shifting portion 20 to be shifted in a 2nd-gear ratio with the commencement of a drop in the engaging hydraulic pressure $P_{B1}$ of the first brake B1 acting as the on-disengaging side engaging device. During a time period from $t_1$ to $t_4$, the engaging hydraulic pressure $P_{B2}$ of the second brake B2 acting as the on-engaging side engaging device is raised, and at the time instant $t_4$, the engaging action of the second brake B2 is completed finishing the shifting of the automatic shifting portion 20. During the time period between the time instants $t_1$ and $t_4$, the transition hydraulic pressure of the on-disengaging side engaging device and the transition hydraulic pressure in the on-engaging side engaging device are preset using the learned value for achieving the up-shifting of "3rd→2nd" gear ratio selected from the hydraulic pressure learned value in the pattern "A", as shown in the drawing, such that the rotation speed $N_{18}$ of the transmitting member 18 achieves the given variation.

Like the illustrated embodiments shown in FIGS. 15 and 17, for instance, a high hydraulic pressure command is output at a hydraulic pressure supply commencement timing of the on-engaging side engaging device and at a engaging commencement timing, a low hydraulic pressure value command is output once. Thereafter, a hydraulic pressure value command is output so as to gradually increase the hydraulic pressure value toward the hydraulic pressure value for the engaging to be completed.

Subsequently, in step S7 corresponding to the inertia phase initiation determining means 82, the determination is made whether or not the inertia phase is initiated in the course of the shifting of the automatic shifting portion 20. This determination depends on one of following statuses. A first state is whether or not the actual rotation speed $N_{M2}$ of the second electric motor M2 varies in a given value preliminarily and experimentally determined for the initiation of the inertia phase to be determined. A second state is whether or not a time interval for the on-engaging side engaging device to have a engaging torque capacity has elapsed a given time interval that is preliminarily and experimentally determined. A third state is whether or not the engaging hydraulic pressure of the on-engaging side engaging device reaches the engaging transition hydraulic pressure (command) value Pc that is preliminarily and experimentally determined. Thus, the determination is made as to whether or not the on-engaging side engaging device begins to have the engaging torque capacity to cause the rotation speed $N_{M2}$ of the second electric motor M2 to vary in the initiation of the inertia phase.

The time instants $t_2$ in FIG. 13 and the time instants $t_2$ in FIG. 14 indicate that the initiation of the inertia phase is determined. Such a determination depends on one of the following statuses. A first state is whether or not the actual rotation speed $N_{M2}$ of the second electric motor M2 varies in the given value preliminarily and experimentally determined for the initiation of the inertia phase to be determined. A second state is whether or not the time interval for the on-engaging side engaging device to have the engaging torque capacity has elapsed a given time interval that is preliminarily and experimentally determined. A third state is whether or not the engaging hydraulic pressure of the on-engaging side engaging device reaches the engaging transition hydraulic pressure (command) value Pc that is preliminarily and experimentally determined.

If the determination in step S7 is made negative, then, the operation in step S7 is repeatedly executed. If the determination in step S7 is made positive, then in step S8 corresponding to the hybrid control means 52, the differential portion 11 executes the shifting so as to continuously vary the engine rotation speed $N_E$ due to the differential action, that is, the electrically controlled continuously variable shifting operation of the differential portion 11. For instance, the differential portion 11 varies the gear ratio γ0 in a direction opposite to a direction in which the automatic shifting portion 20 varies the gear ratio γ such that the engine rotation speed $N_E$ is maintained at a nearly fixed level. In steps S6 to S8, the shifting mechanism 10 continuously varies the total gear ratio γT thereof on a stage before and after the shifting of the automatic shifting portion 20. Moreover, the determination about whether or not the inertia phase is initiated can be executed in Step 8 which can abolish or remove the operation in step S7.

The time period between $t_2$ and $t_3$ in FIG. 13 and the time period between $t_2$ and $t_4$ in FIG. 14 indicate that during the inertia phase occurring in the course of the shifting of the automatic transmission, the differential portion 11 performs the differential action to control the rotation speed $N_{M1}$ of the first electric motor M1 to cause the differential portion 11 to change the gear ratio in a direction opposite to that, in which the automatic shifting portion 20 changes the gear ratio, by a variable corresponding to a change in such a gear ratio. During such a time period, the differential portion 11 performs the differential action on the stage before and after the shifting of the automatic shifting portion 20 so as to prevent the automatic shifting portion 20 from changing the total gear ratio γT, i.e., such that the engine rotation speed $N_E$ is maintained at a nearly fixed level. If the differential portion 11 is placed in the continuously variable shifting state like the illustrated embodiment, the rotation speed $N_{18}$ of the transmitting member 18, variable with the shifting of the automatic shifting portion 20, may be positively varied using the second electric motor M2 in nearly synchronism with the inertia phase occurring at the time instant $t_2$.

During the shifting in steps S4, S5, the shifting in steps S6 to S8 or the shifting in step S9, in step S10 corresponding to the torque down control means 88, the torque down control is executed so as to decrease torque being transferred to the drive wheels 38, i.e., for instance, input torque $T_{IN}$ or output torque $T_{OUT}$ of the automatic shifting portion 20.

For instance, with a reduction in the rotation speed of the rotary element forming the automatic transmission or a reduction in the rotation speed of the rotary element forming the differential portion 11, inertia torque occurs as a torque increment in torque being transferred to the drive wheels 38 such as, for instance, a torque increment in output torque $T_{OUT}$. With a reduction in the engine rotation speed $N_E$ during the up-shifting, inertia torque occurs as a torque increment in torque being transferred to the drive wheels 38. It is likely that engaging shocks occur due to a fluctuation in torque occurring upon a completed engaging of the engaging device during the shifting of the automatic shifting portion 20.

Therefore, in step S10, the torque down control is executed so as to cancel the torque increment corresponding to the inertia torque in input torque $T_{IN}$ or output torque $T_{out}$ of the automatic shifting portion 20 to some extent (that is, to be absorbed to some extent), or to suppress the fluctuation in torque caused upon the completed engaging of the engaging device for thereby suppressing the engaging shocks. Thus, for instance, the engine torque down control for lowering engine torque $T_E$ or the motor torque down control using the second electric motor M2 are executed independently or in combination, causing a reduction in torque being transferred to the drive wheels 38. However, with the accelerator pedal released in downshifting to cause the vehicle to run under deceleration, i.e., in a coast downshifting, the drive wheels 38 provide torque in a reversed input and no torque down control may be executed with no need for step S10 to be executed.

During the time period between $t_2$ and $t_3$ in FIG. 13, the variation in the engine rotation speed $N_E$ is minimized during the shifting. This allows a torque component, corresponding to inertia torque occurring as the torque increment in torque being transferred to the drive wheels 38 to be cancelled to some extent. Torque increment is resulted from the variation in the rotation speed of the rotary element of the automatic shifting portion 20 or the variation in the rotation speed of the rotary element of the differential portion 11. That is, this represents that the torque down control is executed.

FIG. 14 represents that the illustrated embodiment is involved in the coast downshifting and no torque down control is executed. However, during the downshifting with torque being transferred to the drive wheels 38, the torque down control may be executed canceling the inertia torque component like the operation performed in the illustrated embodiment shown in FIG. 13.

During a time period between $t_3$ and $t_5$ in FIG. 15, the power-on downshifting is performed. This allows the fluctuation in torque, resulting from the completed engaging (with a locked state in a structure having a one-way clutch, although no one-way clutch is provided in the illustrated embodiment) of the engaging device of the automatic shifting portion 20, to be cancelled to some extent, thereby suppressing the engaging shocks. That is, this represents that input torque $T_{IN}$ is decreased at a terminal shifting.

During a time period between $t_2$ and $t_3$ in FIG. 16, the operation is executed to allow the torque component, corresponding to inertia torque representing the torque increment in torque transferred to the drive wheels 38 to be cancelled to some extent. Torque increment is resulted from the variation in engine rotation speed $N_E$, the variation in the rotation speed of the rotary element forming the automatic shifting portion 20 or the variation in the rotation speed of the rotary element forming the differential portion 11. That is, this represents that the torque down control is executed.

FIG. 17 represents the illustrated embodiment for the coast downshifting to be executed and shows that no torque down control is executed. However, during the downshifting with torque being transferred to the drive wheels 38, the torque down control may be executed canceling the inertia torque component like the operation executed in the illustrated embodiment shown in FIG. 16.

If the determination in step S1 is made negative and no shifting of the automatic shifting portion 20 is executed in step S11, various control means of the electronic control device 40 execute control operations or the current routine is terminated. For instance, with the shifting mechanism 10 placed in the continuously variable shifting state, the hybrid control means 52 executes the shifting of the differential portion 11 based on the vehicle condition.

Figure 18:
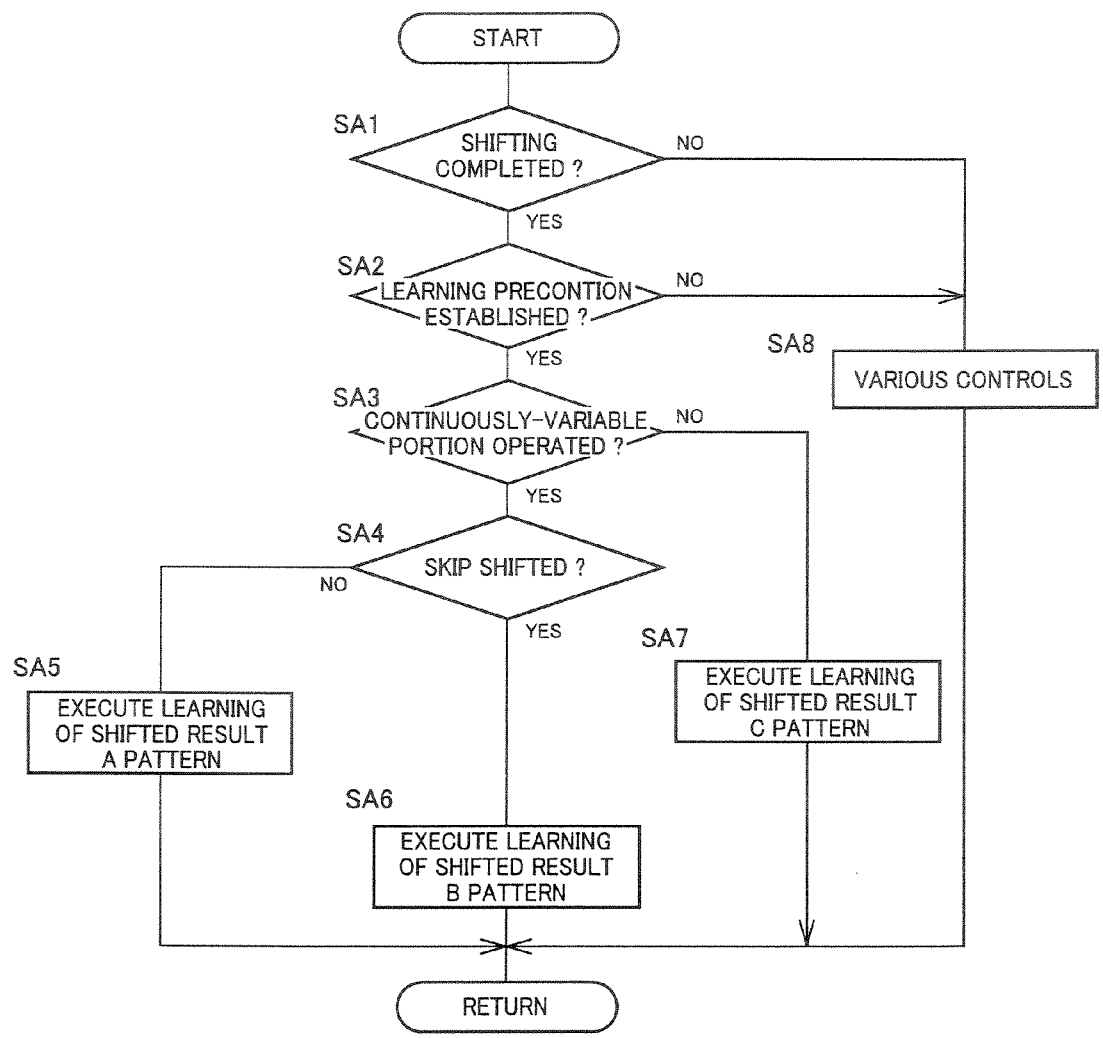
FIG. 18 is a flowchart, illustrating the control operations to be executed by an electronic control device shown in FIG. 5, i.e., control operations for learning a hydraulic pressure value of the engaging device for use in the shifting of the automatic shifting portion.

FIG. 18 is a flowchart illustrating an essence of control operations to be executed by the electronic control device 40, i.e., control operations for learning the hydraulic pressure value on the engaging device. Such a basic sequence is repeatedly executed on an extremely short cycle time in the order of, for instance, several milliseconds to several tens milliseconds.

First, in step SA1 corresponding to the shift completion determining means 106, the determination is made whether or not the shifting is completed in the automatic shifting portion 20. This determination depends on whether or not the shifting is completed in the automatic shifting portion 20 during the operations executed in steps S4, S6 or S9. For instance, determination depends whether or not a given time interval has elapsed in the automatic shifting portion 20, or whether or not the actual rotation speed $N_{18}$ of the transmitting member 18 is brought into nearly synchronism with a subsequent rotation speed $N_{18}$ of the same after the shifting.

If the determination in step SA1 is made negative, then in step SA2 corresponding to the learning precondition establishment determining means 108, the determination is made whether or not a precondition is established for learning the hydraulic pressure value (engaging pressure) of the engaging device for use in the shifting of the automatic shifting portion 20. This determination depends on whether or not the shifting is normally executed and completed. Such a shifting is involved in a case wherein the variation in engine torque lies in a given value during the shifting of the automatic shifting portion 20, the engine 8 has an engine water temperature $TEMP_W$ with a warm-up of the engine 8 deemed to be completed, and an actuating oil temperature of the automatic shifting portion 20 lies in an appropriate predetermined value. Thus, the determination is made whether or not the learning precondition is established.

If the determination in step SA2 is made negative, then in step SA3 corresponding to the differential state determining means 80, the determination is made whether or not the differential portion 11 is placed in the continuously variable shifting state during the shifting of the automatic shifting portion 20. During such operation, for instance, the determined result in step S2 is used.

If the determination in step SA3 is made positive, then in step SA4 corresponding to the gear ratio change determining means 86, the determination is made whether or not the total gear ratio $\gamma T$ varies in the so-called skipped shifting to skip step-by-step during the shifting of the automatic shifting portion 20. During such operation, for instance, the determined result in step S3 is used.

If the determination in step SA4 is made negative, then in step SA5 corresponding to the learning control means 100, a comparison is made between the variation of an actual rotation speed $N_{18}$ of the transmitting member 18, monitored during the shifting, and a given variation of the rotation speed $N_{18}$ of the transmitting member 18. The learning control is executed for correcting the engaging pressure (hydraulic pressure value) of the engaging device so as to suppress a difference between the variation in actual rotation speed and a given variation on a subsequent shifting operation, that is, on the shifting of the automatic shifting portion 20 to be executed in, for instance, step S6 in FIG. 12.

Further, the hydraulic pressure value, subsequent to the correction made on the current learning control, is organized as the hydraulic pressure learned value map for the pattern "A" for storage. That is, in the hydraulic pressure learned value map for the pattern "A", a default value or a preceding learned value, associated with engine torque, and a kind of the shifting appearing during the shifting targeted to be learned, is rewritten to the hydraulic pressure value subsequent to the correction upon the current learning and newly stored as a learned value.

If the determination in step SA4 is made positive, then in step SA6 corresponding to the learning control means 100, the operation is executed like the operation in step SA5 to make a comparison between the variation in the actual rotation speed $N_{18}$ of the transmitting member 18 monitored during the shifting, and the given variation in the rotation speed $N_{18}$ of the transmitting member 18. The learning control is executed for correcting the engaging pressure (hydraulic pressure value) of the engaging device so as to suppress a difference between both the variations on a subsequent shifting, i.e., on the shifting of the automatic shifting portion 20 to be executed in, for instance, step S12 in FIG. 12. In addition, the hydraulic pressure value, subsequent to the correction in the current learning control, is organized as the hydraulic pressure learned value map for the pattern "B" for storage.

If the determination in step SA3 is made negative, then in step SA7 corresponding to the learning control means 100, a comparison is made between the variation in the actual rotation speed $N_{18}$ of the transmitting member 18, monitored during the shifting, and the given variation in the rotation speed $N_{18}$ of the transmitting member 18 or between the variation of the engine rotation speed $N_E$, monitored during the shifting, and the given variation of the engine rotation speed $N_E$.

Then, the learning control is executed for correcting the engaging pressure (hydraulic pressure value) of the engaging device like the operations in steps SA5 and SA6 so as to suppress a difference between the actual change in the rotation speed and the given variation in the subsequent shifting, i.e., in the shifting of the automatic shifting portion 20 to be executed in, for instance, step S9 in FIG. 12. In addition, the hydraulic pressure value, subsequent to the correction on the current learning control, is organized as the hydraulic pressure learned value map for the pattern "C" for storage.

As a result, the hydraulic pressure learned value maps are stored as the patterns "A", "B" and "C" as shown in FIG. 11.

If the determination in step SA1 or the determination in step SA2 is made negative, then in step SA8, the various control means of the electronic control device 40 executes the control operation or the current routine is terminated with no the learning of the engaging pressure of the engaging device of the automatic shifting portion 20 being executed.

Figure 19:
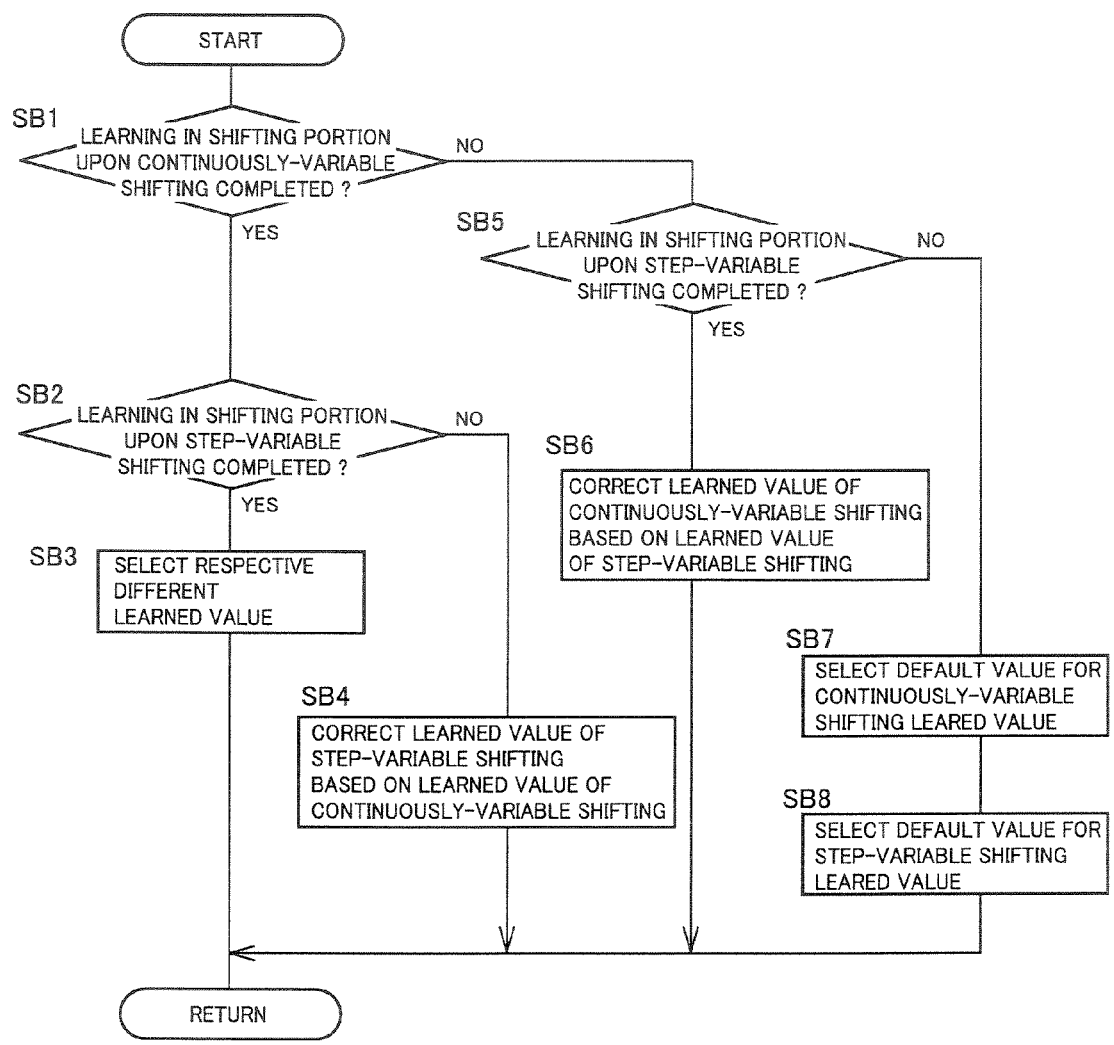
FIG. 19 is a flowchart illustrating control operations to be executed by the electronic control device shown in FIG. 5, i.e., control operations for selecting the hydraulic pressure value of the engaging device for use in the shifting of the automatic shifting portion.

FIG. 19 is a flowchart illustrating an essence of control operations to be executed by the electronic control device 40, that is, control operations for selecting the learned value on the engaging pressure of the engaging device for use in the shifting of the automatic shifting portion 20. Such a basic sequence is repeatedly executed in an extremely short cycle time in the order of, for instance, several milliseconds to the several tens milliseconds.

In the illustrated embodiment, as set forth above, there are three hydraulic pressure learned value maps for the patterns "A", "B" and "C". Description is made of the control operations for selecting the learned value with reference to an exemplary case with the differential portion 11 placed in the continuously variable shifting state or the non-continuously variable shifting state in FIG. 19. Of the patterns "A" and "B", the pattern "A" is herein used as the hydraulic pressure learned value map for the differential portion 11 to be placed in the continuously variable shifting state and the pattern "C" is used as the hydraulic pressure learned value map for the differential portion 11 to be placed in the non-continuously variable shifting state.

First, in step SB1 corresponding to the learning control determining means 102, the determination is made whether or not the learning of the engaging pressure for use in the shifting of the automatic shifting portion 20 is completed with the differential portion 11 placed in the continuously variable shifting state. This determination depends on whether or not the respective default values in the hydraulic pressure learned value map for the pattern "A" for use in the shifting of the automatic shifting portion 20 in, for instance, step S6 in FIG. 12 are learned.

If the determination in step SB1 is made positive, likewise, in step SB2 corresponding to the learning control means 102, the determination is made whether or not the learning of the engaging pressure for use in the shifting of the automatic shifting portion 20 is completed with the differential portion 11 placed in the non-continuously variable shifting state. This determination depends on whether or not the respective default values in the hydraulic pressure learned value map for the pattern "C" for use in the shifting of the automatic shifting portion 20 in, for instance, step S9 in FIG. 12 are learned.

If the determination in step SB2 is made positive, then in SB3 corresponding to the learned value selecting means 104, the operation is executed to select the hydraulic pressure learned value map based on a status of the shifting mechanism 10 during the relevant shifting thereof by referring to the hydraulic pressure learned value maps organized and stored as the patterns "A" and "C", respectively. At the same time, the operation is executed to select the learned value on the engaging pressure of the engaging device for use in the shifting of the automatic shifting portion 20 based on engine torque $T_E$ and the kind of the shifting by referring to the selected hydraulic pressure learned value map.

If the determination in step SB2 is made negative, then in step SB4 corresponding to the learning control means 100, the operation is executed to correct the default value in the hydraulic pressure learned value map for the pattern "C" for use in the shifting of the automatic shifting portion 20 with the differential portion 11 placed in the non-continuously variable shifting state. Such a correction is executed based on the learned value distinguished in terms of the same engine torque and the kind of the shifting in the hydraulic pressure learned value map for the pattern "A" obtained through the learning in the shifting of the automatic shifting portion 20 with the differential portion 11 placed in the continuously variable shifting state.

For instance, during the continuously variable shifting state, i.e., with the learned value for the pattern "A" corrected in a trend deviated toward the underlapping side, the hydraulic pressure value appearing in the non-continuously variable shifting state, i.e., the default value for the pattern "C" is corrected in a trend slightly deviated toward the underlapping side and stored as a learned value.

On the contrary, if the learned value for the pattern "A" is corrected in the trend deviated toward the overlapping side, the default value for the pattern "C" is corrected in a trend slightly deviated toward the overlapping side and stored as the learned value. During the shifting of the automatic shifting portion 20, the learned value selecting means 104 selects the relevant corrected (corrected) learned value as a learned value for the engaging pressure of the engaging device for use in the shifting of the automatic shifting portion 20.

If the determination in step SB1 is made negative, then in step SB5 corresponding to the learning control means 102, the determination is made whether or not the learning of the engaging pressure for use in the shifting of the automatic shifting portion 20 is completed with the differential portion 11 placed in the non-continuously variable shifting state. If the determination in step SB5 is made positive, then in step SB6 corresponding to the learning control means 100, the operation is executed to correct the default value in the hydraulic pressure learned value map for the pattern "A" for use in the shifting of the automatic shifting portion 20 with the differential portion 11 placed in the continuously variable shifting state. Such a correction depends on the learned value distinguished in terms of the same engine torque and the kind of the shifting in the hydraulic pressure learned value map for the pattern "C" obtained through the learning in the shifting of the automatic shifting portion 20 with the differential portion 11 placed in the non-continuously variable shifting state.

For instance, during the non-continuously variable shifting state, i.e., with the learned value for the pattern "C" corrected in a trend deviated toward the underlapping side, then, the hydraulic pressure value, appearing when placed in the continuously variable shifting state, i.e., the default value for the pattern "A" is corrected in a trend slightly deviated toward the underlapping side and stored as a learned value. On the contrary, if the learned value for the pattern "C" is corrected in a trend deviated toward the overlapping side, the default value for the pattern "A" is corrected in a trend slightly deviated toward the overlapping side and stored as a learned value. During the shifting of the automatic shifting portion 20, the learned value selecting means 104 selects the relevant corrected (corrected) learned value as a learned value for the engaging pressure of the engaging device for use in the shifting of the automatic shifting portion 20.

If the determination in step SB5 is made negative, none of both the learning on the hydraulic pressures for use in the shifting under the continuously variable shifting state and the shifting under the non-continuously variable shifting state is completed. That is, none of the operations are executed to perform the learning on the default value of the hydraulic pressure learned value map for the pattern "A" and the default value of the hydraulic pressure learned value map for the pattern "C". During the shifting of the automatic shifting portion 20 with the differential portion 11 placed in the continuously variable shifting state, in step SB7 corresponding to the learned value selecting means 104, the default value set for the continuously variable shifting state, i.e., for the pattern "A" is selected intact as the hydraulic pressure value of the engaging device for use in the shifting of the automatic shifting portion 20.

During the shifting of the automatic shifting portion 20 with the differential portion 11 placed in the non-continuously variable shifting state, next, in step SB8 corresponding to the learned value selecting means 104, the default value set for the non-continuously variable shifting state, i.e., for the pattern "C" is selected intact as the hydraulic pressure value of the engaging device for use in the shifting of the automatic shifting portion 20. This is because the default values for the hydraulic pressure learned value map for the pattern "A" and for the hydraulic pressure learned value map for the pattern "C" are not learned.

With the illustrated embodiment, as set forth above, during the shifting of the automatic shifting portion 20, the engaging control variable control means 84 learns the hydraulic pressure value of the engaging device so to allow the rotation speed $N_{18}$ of the transmitting member 18 to achieve the given variation, while altering the method of learning the hydraulic pressure value of the engaging device based on whether or not the differential portion 11 is placed in the continuously variable shifting state. Accordingly, the rotation speed $N_{18}$ of the transmitting member 18 is caused to achieve a given varying rate $N_{18}'$ depending on whether or not the differential portion 11 is placed in the continuously variable shifting state or the non-continuously variable shifting state.

With the differential portion 11 placed in the continuously variable shifting state, the engine rotation speed $N_E$ is caused to vary due to the differential action (electrically controlled continuously variable shifting action) regardless of the rotation speed $N_{18}$ of the transmitting member 18 that is uniquely determined with the vehicle speed V and the gear ratio γ of the automatic shifting portion 20. In contrast to a case of the continuously variable shifting state, with the differential portion 11 placed in the non-continuously variable shifting state, the automatic shifting portion 20 performs the shifting with the variation in engine rotation speed $N_E$, causing the inertia to increase. As used herein, the term "given variation in the rotation speed $N_{18}$ of the transmitting member 18" refers to a given variation that provide a balance between a rapid shifting response with an increase in the varying rate $N_{18}'$ and a slow shifting response with a decrease in the varying rate $N_{18}'$. The former is related to the improvement in feeling and the latter is related to the suppression of a shifting shock.

In the illustrated embodiment, further, the engaging control variable control means 84 learns the engaging pressure of the engaging device, which has not been learned when the differential portion 11 is placed in the continuously variable shifting state, based on the engaging pressure of the engaging device which has been learned when the differential portion 11 is placed in the non-continuously variable shifting state. Alternately, the engaging control variable control means 84 learns the engaging pressure of the engaging device, which has not been learned when the differential portion 11 is placed in the non-continuously variable shifting state, based on the engaging pressure of the engaging device which has been learned when the differential portion 11 is placed in the continuously variable shifting state. This minimizes a frequency of the shifting executed in the automatic shifting portion 20 due to the engaging pressure of the engaging device which is not learned, thereby enabling a further suppression of the shifting shocks.

In the illustrated embodiment, furthermore, during the shifting of the automatic shifting portion 20, the engaging control variable control means 84 learns the engaging pressure of the engaging device so as to allow the rotation speed $N_{18}$ of the transmitting member 18 to achieve the given variation, while distinguishing the learned values (hydraulic pressure learned value maps) on the engaging pressure of the engaging device based on whether or not the differential portion 11 is placed in the continuously variable shifting state. Accordingly, the automatic shifting portion 20 effectuates the shifting depending on the continuously variable shifting state and the non-continuously variable shifting state of the differential portion 11.

In the continuously variable shifting state, the engine rotation speed $N_E$ is caused to vary due to the differential action (electrically controlled continuously variable shifting action), regardless of the rotation speed $N_{18}$ of the transmitting member 18 uniquely determined with the vehicle speed V and the gear ratio γ of the automatic shifting portion 20. In the non-continuously variable shifting state, in contrast to the case of the continuously variable shifting state of the differential portion 11, the automatic shifting portion 20 performs the shifting with the variation in engine rotation speed $N_E$ accompanied by the increase in the inertia.

This allows the rotation speed $N_{18}$ of the transmitting member 18 to achieve the given variation in a balance between a rapid shifting response with an increase in a varying rate $N_{18}'$ regarded to provide for instance a comfortable feeling, and a slow shifting response with a decrease in the varying rate $N_{18}'$ regarded to provide an ease of suppressing the shifting shocks, thereby suppressing the occurrence of shifting shocks.

In the illustrated embodiment, moreover, during the shifting of the automatic shifting portion 20, the engaging control variable control means 84 learns the engaging pressure of the engaging device so as to allow the rotation speed $N_{18}$ of the transmitting member 18 to achieve the given variation. At the same time, the engaging control variable control means 84 alters the method of learning the engaging pressure with the differential portion 11 placed in the continuously variable shifting state depending on whether the shifting is executed for continuously varying the total gear ratio (overall gear ratio) γT, or the shifting is executed for non-continuously varying the total gear ratio (overall gear ratio) γT. This allows the rotation speed $N_{18}$ of the transmitting member 18 to achieve the given variation depending on the shifting executed for continuously varying the total gear ratio (overall gear ratio) γT or the shifting executed for non-continuously varying the total gear ratio (overall gear ratio) γT. In the former, the variation in the engine rotation speed $N_E$ is suppressed during the shifting of the automatic shifting portion 20 and in the latter, the engine rotation speed $N_E$ varies during the shifting of the automatic shifting portion 20.

That is, the rotation speed $N_{18}$ of the transmitting member 18 is caused to achieve the given variation in the balance between the rapid shifting response with the increase in the varying rate $N_{18}'$ regarded to provide for instance a comfortable feeling, and the slow shifting response with the decrease in the varying rate $N_{18}'$ regarded to provide the ease of suppressing the shifting shocks. It depends on the shifting executed for continuously varying the total gear ratio γT and the shifting executed for non-continuously varying the total gear ratio γT with the occurrence of a circumstance wherein inertia torque occurring during the shifting of the automatic shifting portion 20 has different magnitudes, The former is related to the improvement in feeling and the latter is related to the suppression of the shifting shocks.

In the illustrated embodiment, also, the engaging control variable control means 84 learns the engaging pressure of the engaging device, which has not been learned when the differential portion 11 is placed in the continuously variable shifting state with the shifting effectuated for continuously varying the total gear ratio (overall gear ratio) γT, based on the engaging pressure of the engaging device which has been learned when the differential portion 11 is placed in the continuously variable shifting state with the shifting effectuated for non-continuously varying the total gear ratio (overall gear ratio) γT. Alternately, the engaging control variable control means 84 learns the engaging pressure of the engaging device, which has not been learned when the differential portion 11 is placed in the continuously variable shifting state with the shifting effectuated for non-continuously varying the total gear ratio (overall gear ratio) γT, based on the engaging pressure of the engaging device which has been learned when the differential portion 11 is placed in the continuously variable shifting state with the shifting effectuated for continuously varying the total gear ratio (overall gear ratio) γT. This minimizes a frequency of the occurrence of the shifting executed in the automatic shifting portion 20 due to the engaging pressure of the engaging device which is not learned, thereby achieving a further suppression of the shifting shocks.

In the illustrated embodiment, further, during the shifting of the automatic shifting portion 20, the engaging control variable control means 84 learns the engaging pressure of the engaging device so as to allow the rotation speed $N_{18}$ of the transmitting member 18 to achieve the given variation. At the same time, with the differential portion 11 placed in the continuously variable shifting state, the learned values on the engaging pressure of the engaging device are distinguished depending whether the shifting is initiated for continuously varying the total gear ratio (overall gear ratio) γT or the shifting is initiated for non-continuously varying the total gear ratio (overall gear ratio) γT.

This allows the automatic shifting portion 20 to perform the shifting depending on the shifting initiated for continuously varying the total gear ratio (overall gear ratio) γT enabled to minimize the variation in engine rotation speed $N_E$ during the shifting of the automatic shifting portion 20, and the shifting initiated for non-continuously varying the total gear ratio (overall gear ratio) γT causing the variation in engine rotation speed $N_E$ during the shifting of the automatic shifting portion 20. That is, the shifting is performed depending on the shifting executed for continuously varying the total gear ratio γT and the shifting executed for non-continuously varying the total gear ratio γT with the occurrence of a circumstance wherein inertia torque occurring during the shifting of the automatic shifting portion 20 has different magnitudes. Thus, the rotation speed $N_{18}$ of the transmitting member 18 is caused to achieve the given variation in the balance between the rapid shifting response with the increase in the varying rate $N_{18}'$ and the slow shifting response with the decrease in the varying rate $N_{18}'$. The former is related to the improvement in feeling and the latter is related to the suppression of the shifting shocks.

In the illustrated embodiment, furthermore, with the hybrid control means 52 varying the rotation speed $N_{18}$ of the transmitting member 18, the engaging control variable control means 84 inhibits learning the engaging pressure of the engaging device during the shifting of the automatic shifting portion 20. Accordingly, this suppresses the occurrence of shifting shocks when the hybrid control means 52 does not vary the rotation speed $N_{18}$ of the transmitting member 18.

In the illustrated embodiment, moreover, with the hybrid control means 52 varying the rotation speed $N_{18}$ of the transmitting member 18, the engaging control variable control means 84 learns the engaging pressure of the engaging device in consideration of the variation caused in the rotation speed $N_{18}$ of the transmitting member 18. Consequently, the engaging pressure of the engaging device is learned with a consequence of subtracting a shifting shock suppressing effect caused by the operation of the hybrid control means 52 in varying the rotation speed $N_{18}$ of the transmitting member 18, thereby suppressing the occurrence of shifting shocks caused when no rotation speed $N_{18}$ of the transmitting member 18 is varied by the hybrid control means 52.

Embodiment 2

Figures 20, 21:
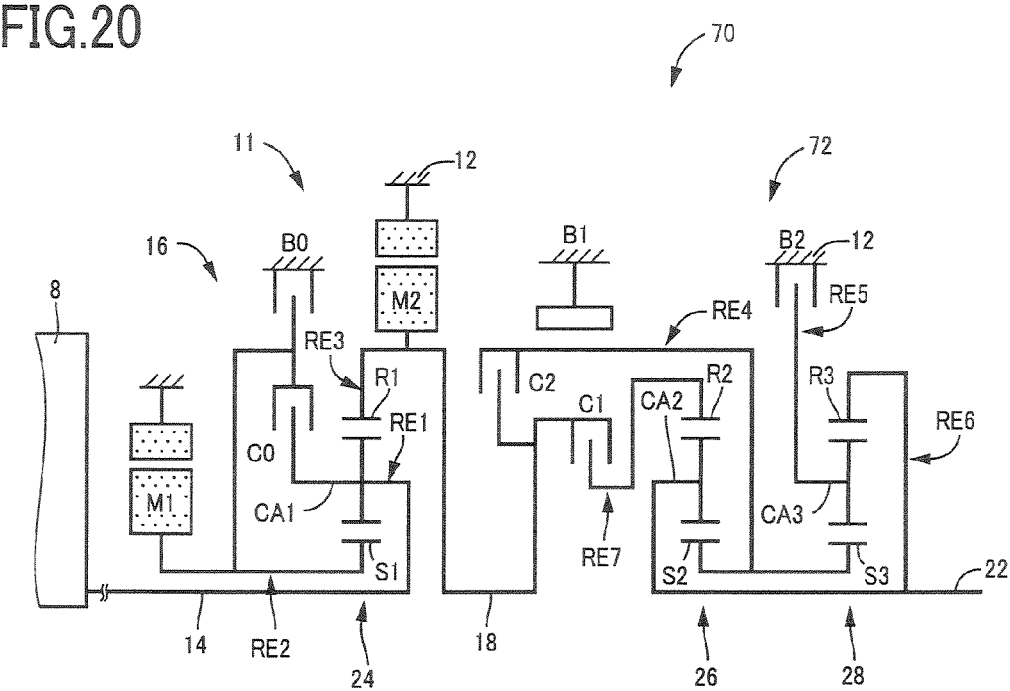
FIG. 20 is a skeleton view explaining a structure of a drive apparatus for hybrid vehicle of another embodiment according to the present invention.
FIG. 21 is an operation Table indicating a relation between a shifting operation of the drive apparatus of the hybrid vehicle of the embodiment shown in FIG. 20 operable in a continuously variable shifting state or a step variable shifting state, and operation combinations of hydraulic-type frictionally engaging devices used therefore, corresponding to FIG. 2.
Figure 22:
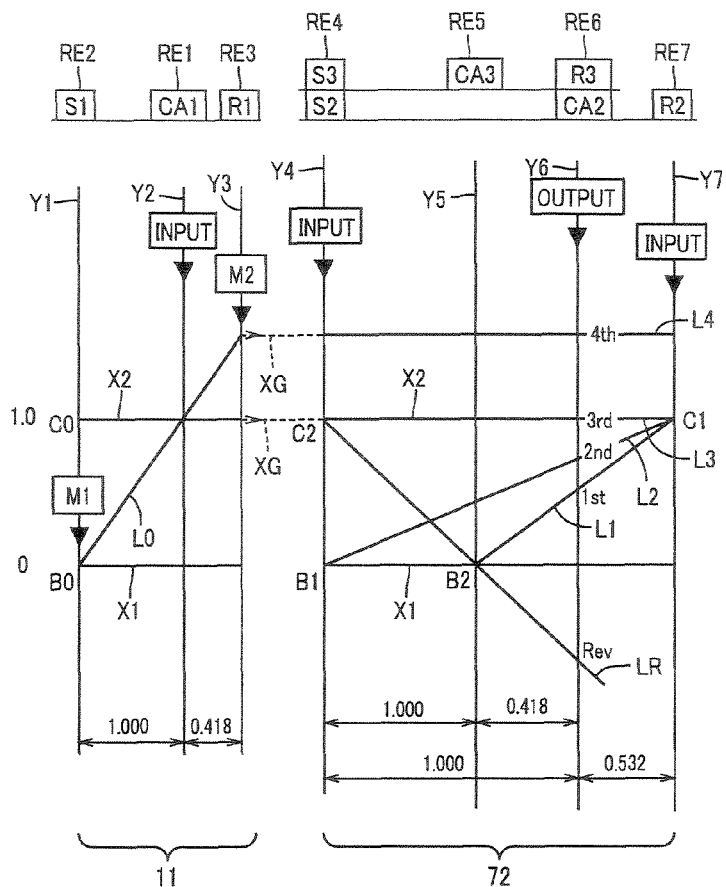
FIG. 22 is a collinear chart showing relative rotating speeds of rotary elements in each of different gear positions when the drive apparatus of the hybrid vehicle of the embodiment shown in FIG. 20 is operated in the step variable shifting state, corresponding to FIG. 3.

FIG. 20 is a skeleton view explaining structure of a shifting mechanism 70 according to another embodiment of the present invention. FIG. 21 is an operation Table indicating a relation between a shifting position of the shifting mechanism 70, and operation combinations of hydraulic-type friction engaging devices used therefor. FIG. 22 is a collinear chart explaining a shifting operation of the shifting mechanism 70.

Like the illustrated embodiment described above, the shifting mechanism 70 comprises the differential portion 11 including the first electric motor M1, the power distributing mechanism 16 and the second electric motor M2, and an automatic shifting portion 72 with three forward-gear positions connected to the differential portion 11 and the output shaft 22 in series via the transmitting member 18. The power distributing mechanism 16 includes the first planetary gear unit 24 of the single pinion type having a given speed ratio ρ1 of, for instance, about 0.418, the switching clutch C0 and the switching brake B0. The automatic shifting portion 72 includes the second planetary gear unit 26 of the single pinion type having a given speed ratio ρ2 of, for instance, about 0.532, and the third planetary gear unit 28 of the single pinion type having a given speed ratio ρ3 of, for instance, about 0.418.

The sun gear S2 of the second planetary gear unit 26 and the sun gear S3 of the third planetary gear unit 28 are integrally connected to each other. These sun gears S2 and S3 are selectively engaged to the transmitting member 18 via the second clutch C2 and also selectively engaged to the case 12 via the first brake B1. The second carrier CA2 of the second planetary gear unit 26 and the third ring gear R3 of the third planetary gear unit 28 integrally connected to each other are connected to the output shaft 22. The second ring gear R2 is selectively connected to the transmitting member 18 via the first clutch C1, and the third carrier CA3 is selectively engaged to the case 12 via the second brake B2.

With the shifting mechanism 70 thus constructed, the switching clutch C0, the first clutch C1, the second clutch C2, the switching brake B0, the first brake B1 and the second brake B2 are selectively engaged as shown by, for instance, the operation Table shown in FIG. 21. One of a 1st-gear position (1st-speed position) to a 4th-gear position (4th-speed position), a reverse-gear position (rear-drive position) or a neutral position is selectively established. In this moment, each gear position has a speed ratio γ (=input shaft speed $N_{IN}$/output shaft speed $N_{OUT}$) that substantially varies in equal ratio.

In particular, with the present embodiment, the power distributing mechanism 16 incorporates the switching clutch C0 and the switching brake B0. With either the switching clutch C0 or switching brake B0 being engaged, the differential portion 11 can be structured to assume the continuously variable shifting state operative as the continuously variable transmission and, in addition thereto, the fixed shifting state operative as a transmission with a fixed speed ratio. Accordingly, with either the switching clutch C0 or switching brake B0 brought into engagement, the shifting mechanism 70 can take a structure for the step variable shifting state operative as the step variable transmission with the differential portion 11 placed in the fixed shifting state, and the automatic shifting portion 72.

With both the switching clutch C0 and switching brake B0 brought into disengaging states, the shifting mechanism 70 can take the continuously variable shifting state operative as the electrically controlled continuously variable transmission with the differential portion 11 placed in the continuously variable shifting state, and the automatic shifting portion 72. In other words, the shifting mechanism 70 is switched to the step variable shifting state upon engaging either the switching clutch C0 or the switching brake B0, and switched to the continuously variable shifting state upon disengaging both the switching clutch C0 and switching brake B0.

For the shifting mechanism 70 to function as the step variable transmission, as shown for instance in FIG. 21, the switching clutch C0, the first clutch C1 and the second brake B2 are engaged, which establishes the 1st-gear position having the highest speed ratio γ1 of, for instance, about 2.804. With the switching clutch C0, the first clutch C1 and the first brake B1 being engaged, a 2nd-gear position is established with a speed ratio γ2 of, for instance, about 1.531 that is lower than that of the 1st-gear position. With the switching clutch C0, the first clutch C1 and the second clutch C2 being engaged, a 3rd-gear position is established with a speed ratio γ3 of, for instance, about 1.000 that is lower than that of the 2nd-gear position.

With the first clutch C1, the second clutch C2 and the switching brake B0 being engaged, a 4th-gear position is established with a speed ratio γ4 of, for instance, about 0.705 that is lower than that of the 3rd-gear position. Further, with the second clutch C2 and the second brake B2 being engaged, a reverse-gear position is established with a speed ratio γR of, for instance, about 2.393 that is intermediate between those of the 1st-gear and 2nd-gear positions. In addition, for the neutral "N" state to be established, for instance, only the switching clutch C0 is engaged.

In contrast, for the shifting mechanism 70 to function as the continuously variable transmission, both the switching clutch C0 and the switching brake B0 are unengaged as indicated in the operation Table shown in FIG. 21. This allows the differential portion 11 to function as the continuously variable transmission, and the automatic shifting portion 72 connected to the differential portion 11 in series to function as the step variable transmission. When this takes place, the rotating speed input to the automatic shifting portion 72 for the gear positions placed in the 1st-gear, 2nd-gear and 3rd-gear positions, respectively, that is, the rotating speed of the transmitting member 18, is caused to continuously vary. This allows the respective gear positions to have speed ratios in continuously variable ranges. Accordingly, the automatic shifting portion 72 has a speed ratio that is continuously variable across the adjacent gear positions, causing the entire shifting mechanism 70 to have the overall speed ratio γT variable in a continuous fashion as a whole.

FIG. 22 shows a collinear chart representing relative relations on the rotating speeds of the rotary elements engaged in differing states for the intended gear positions in the shifting mechanism 70, respectively. The shifting mechanism 70 is structured with the differential portion 11 functioning as the continuously variable shifting portion or first shifting portion, and the automatic shifting portion 72 functioning as the step variable shifting portion or a second shifting portion. For the switching clutch C0 and the switching brake B0 to be unengaged, and for the switching clutch C0 or the switching brake B0 to be engaged, the rotary elements of the power distributing mechanism 16 rotate at the same speeds as those stated above.

In FIG. 22, the automatic shifting portion 72 operates on four vertical lines Y4, Y5, Y6 and Y7 corresponding to fourth to seventh rotary elements RE4 to RE7 in order from the left, respectively. The fourth rotary element (fourth element) RE4 represents that the second and third sun gears S2 and S3 are connected to each other. The fifth rotary element (fifth element) RE5 corresponds to the third carrier CA3. The sixth rotary element (sixth element) RE6 represents that the second carrier CA2 and the third ring gear R3 are connected to each other. The seventh rotary element (seventh element) RE7 corresponds to the second ring gear R2. Further, in the automatic shifting portion 72, the fourth rotary element RE4 is selectively connected to the transmitting member 18 via the second clutch C2 and selectively connected to the case 12 via the first brake B1. The fifth rotary element RE5 is selectively connected to the case 12 via the second brake B2. The sixth rotary element RE6 is connected to the output shaft 22 of the automatic shifting portion 72. The seventh rotary element RE7 is selectively connected to the transmitting member 18 via the first clutch C1.

The automatic shifting portion 72 operates in a manner as shown in FIG. 22. That is, with both the first clutch C1 and the second brake B2 being engaged, an intersection point between an inclined straight line L1 and the vertical line Y6 represents the rotating speed of the output shaft 22 in the 1st-speed position. The inclined straight line L1 passes across an intersection point between the vertical line Y7 indicative of the rotating speed of the seventh rotary element (seventh element) RE7 (R2), and an intersection point between the vertical line Y5 indicative of the rotating speed of the fifth rotary element RE5 (CA3), and a horizontal line X1. The vertical line Y6 represents the rotating speed of the sixth rotary element (sixth element) RE6 (CA2, R3) connected to the output shaft 22.

Likewise, an intersection point between an inclined straight line L2 determined with both the first clutch C1 and the first brake B1 being engaged, and the vertical line Y6 indicative of the rotating speed of the sixth rotary element RE6 connected to the output shaft 22, represents the rotating speed of the output shaft 22 in the 2nd-speed position. An intersection point between a horizontal straight line L3 determined with both the first clutch C1 and the second clutch C2 being engaged, and the vertical line Y6 indicative of the rotating speed of the sixth rotary element RE6 connected to the output shaft 22, represents the rotating speed of the output shaft 22 in the 3rd-speed position.

For the 1st-speed to the 3rd-speed positions, as a result of the switching clutch C0 being engaged, the differential portion 11 inputs drive power to the seventh rotary element RE7 at the same rotating speed as the engine speed $N_E$. However, as the switching brake B0 is engaged in place of the switching clutch C0, the differential portion 11 inputs drive power to the seventh rotary element RE7 at a rotating speed higher than the engine speed $N_E$. Thus, an intersection point between a horizontal straight line L4 determined with the first clutch C1, the second clutch C2 and the switching brake B0 being engaged, and the vertical line Y6 indicative of the rotating speed of the sixth rotary element RE6 connected to the output shaft 22, represents the rotating speed of the output shaft 22 in the 4th-speed position.

Even with the present embodiment, the shifting mechanism 70 includes the differential portion 11, functioning as the continuously variable transmission or the first shifting portion, and the automatic shifting portion 72 functioning as the step variable transmission or the second shifting portion. This allows the shifting mechanism 70 to have the same advantageous effects as those of the embodiment described above.

Embodiment 3

Figure 23:
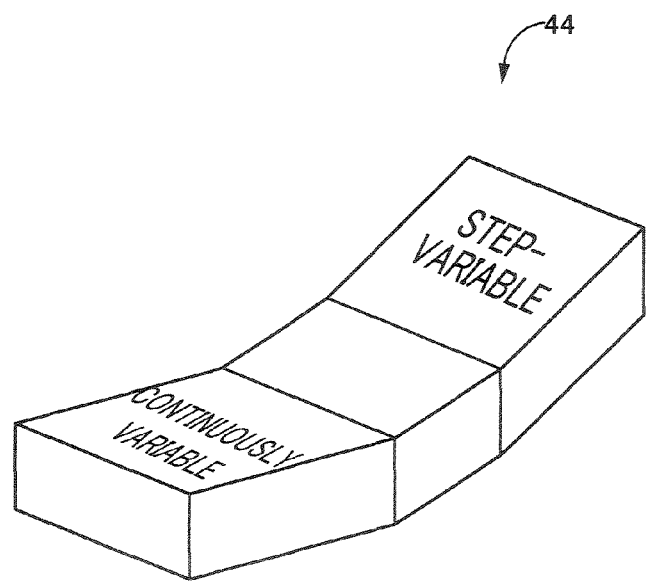
FIG. 23 is a view showing a seesaw type switch as a switching device, which is an example of a shifting state manual selection device to be manipulated by a vehicle driver for selecting a shifting state.

FIG. 23 shows an example a seesaw type switch 44 (hereinafter referred to as "switch 44"), acting as a shifting-state manual selection device, which is installed on a vehicle for a vehicle driver to manually operate. The switch 44 allows manual operation to cause the power distributing mechanism 16 to be selectively placed in the differential state and the non-differential state (locked state), that is, the continuously variable shifting state and the step variable shifting state of the shifting mechanism 10. The switch 44 allows the vehicle to run in a shifting state desired by the vehicle driver. The switch 44 has a continuously variable shift running command button with a display "CONTINUOUSLY VARIABLE", representing a continuously variable shift running mode, and a step variable shift running command button with a display "STEP VARIABLE" representing a step variable shift running mode. Upon depression of the vehicle driver on one of these buttons, the shifting mechanism 10 can be selectively placed in the continuously variable shifting state, operative as the electrically controlled continuously variable transmission, or the step variable shifting state operative as the step variable transmission.

The embodiments set forth above have been described with reference to the case wherein the shifting mechanism 10 performs the automatic switching control operation to be placed in the shifting state based on variations in the vehicle condition by referring to, for instance, the relational chart shown in FIG. 6. On the contrary, in place of the automatic switching control operation or in addition thereto, the switch 44 may be manipulated for thereby executing manual switching control for the shifting state of the shifting mechanism 10.

That is, the switching control means 50 may take priority to switch the shifting mechanism 10 to the continuously variable shifting state and the step variable shifting state, depending on the switch 44 selectively operated for the continuously variable shifting state and the step variable shifting state. For instance, if the vehicle driver, desiring a running mode with a touch of feeling in the continuously variable transmission and improved fuel economy, then manually selects the continuously variable shifting to be placed by the shifting mechanism 10. Further, if another running mode is desired with the step variable transmission performing the gear shifting accompanied by a rhythmical change in the engine rotating speed, the vehicle driver manually selects the step variable shifting state to be placed by the shifting mechanism 10.

Further, there exists a probability for the switch 44 not to be provided with a neutral position under which neither the continuously variable running mode nor the step variable running mode is selected. Under such a probability, if the switch 44 remains in a status with the neutral position, if no desired shifting state is selected by the vehicle driver or if the desired shifting state is under automatic switching mode, then, the automatic switching control may be executed for the shifting state of the shifting mechanism 10.

A case where the shifting state of the shifting mechanism 10 is subjected to the manually switched control by the manual operation of the switch instead the automatic switch control operation will be explained. In the flowchart shown in FIG. 2, whether or not the power distributing mechanism 16 is placed in the differential state, that is, the differential portion 11 is placed in the continuously variable shifting state, which is based on selection of the differential state of the power distributing mechanism 16, that is, the continuously variable shifting stated of the shifting mechanism 10.

Embodiment 4

Figure 24:
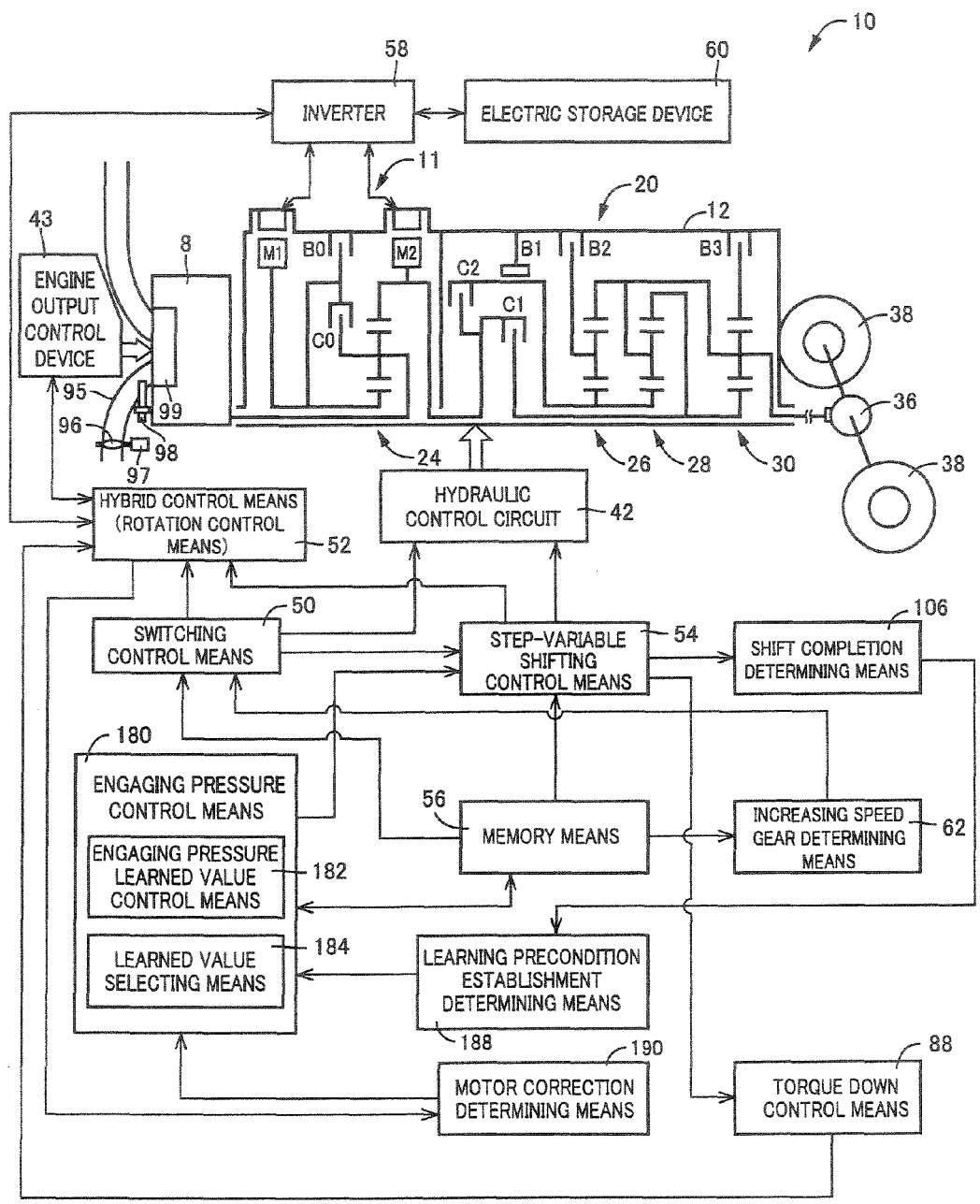
FIG. 24 is a function block diagram for explaining a main part of a control operation show in FIG. 4, in another embodiment of the present invention.

FIG. 24 is a functional block diagram showing a control function of the electronic control device 40. In this embodiment, control signals to the engine control device 43 controlling the engine output are output from the electronic control device similar to above mentioned FIG. 4. The control signals include a drive signal to the throttle actuator 97 operating the throttle valve opening $\theta_{TH}$ of the electronic throttle valve 96 provided on the suction tube 95 of the engine 8, and a fuel supply quantity signal controlling the fuel supply quantity by the fuel injection device 98 to the suction tube 95 or the cylinder of the engine 8.

In FIG. 24, the hybrid control means 52 functionally includes engine output control means. The engine output control means outputs various commands to the engine output control device 43 to allow a throttle actuator 97 to perform throttle control so as to open or close an electronic throttle valve 96, to allow a fuel injection device 98 to control a fuel injection quantity and fuel injection timing for performing fuel injection control, and to allow an ignition device 99 to control an ignition timing for the ignition timing control.

For instance, the hybrid control means 52 drives the throttle actuator 60 in response to an acceleration opening signal Acc by referring to the preliminarily stored relation, which is not shown, such that the greater the accelerator opening Acc, the greater will be the throttle valve opening $\theta_{TH}$. The engine output control device 43 controls opening/closing the electronic throttle valve 96 by the throttle actuator 97 in accordance with command from the hybrid control means 52 for the throttle control, controls the fuel injection by the fuel injection device 98 for the fuel injection control, and controls the ignition timing of the ignition device such as the igniter for the ignition timing control. Thus, the engine output control device 43 performs the engine torque control.

The hybrid control means 52 places the first electric motor M1 into an unloaded state by interrupting the drive current supplied to the first electric motor M1 from the electricity storage device 60 via the inverter 58. The first electric motor M1 is, in the unloaded state thereof, allowed to rotate freely i.e., to idly rotate, so that the differential portion 11 is placed in the state unable to transmit the torque, that is the power transmitting path therein being interrupted, and the state where the output from the differential portion 11 is not generated. That is, the hybrid control means 52 places the first electric motor M1 in the neutral state in which the power transmitting path is electrically interrupted by placing the first electric motor M1 in the unloaded state.

Increasing-speed gear judge means 62 makes a judge on which of the switching clutch C0 and the switching brake B0 are to be engaged for placing the shifting mechanism 10 in the step variable shifting state. That is, the determination is made based on the gear position to be shifted in the shifting mechanism 10 according to, for instance, the shifting diagram shown in FIG. 6, which is preliminarily stored in the memory means 56, or the gear position determined by the step variable control device 54, lies in an increasing-speed gear position, for instance, a 5th-speed gear position.

In the illustrated embodiment, the shifting mechanism 10 includes, in addition to the differential portion 11, the automatic shifting portion 20 and the step variable shifting means 54 executes the shifting based on the vehicle condition by referring to the shifting diagram shown, for instance, in FIG. 6. With the automatic shifting portion 20 executed the shifting, the input rotation speed $N_{IN}$ of the automatic shifting portion 20 is caused to vary with a progress in the shifting where the vehicle speed V remains constant before and after the shifting. The step variable shifting means 54 executes the shifting of the automatic shifting portion 20 so as to allow the input rotation speed $N_{IN}$ of the automatic shifting portion 20, i.e., the rotation speed $N_{18}$ of the transmitting member 18, to achieve a given varying state.

More particularly, during the operation of the step variable shifting means 54 for executing the shifting of the automatic shifting portion 20 (during a shift transition period), the engaging pressure control means 180 controls the hydraulic pressure command (shifting output) to be output from the step variable shifting means 54 to the hydraulic pressure control circuit 42 for achieving the relevant shifting. In particular, such a control is performed for controlling the engaging pressure of the engaging device associated with the shifting of the automatic shifting portion 20. Thus, the input rotation speed $N_{IN}$ of the automatic shifting portion 20 is set in the given varying state.

The input rotation speed $N_{IN}$ of the automatic shifting portion 20 is uniquely determined based on the vehicle speed V and the gear ratio γ of the automatic shifting portion 20. As used herein, the expression "the given varying state of the input rotation speed $N_{IN}$ of the automatic shifting portion 20" refers to a predetermined varying state, i.e., for instance, a given varying rate, which is preliminarily and experimentally obtained to fall in an idealistic state to allow the relevant varying rate of $N_{IN}'(=d\,N_{IN}/dt)$ to provide a balance between the shortening of the shifting time and the suppression of the shifting shocks during the shifting of the automatic shifting portion 20. That is, this means that the balance is provided between the rapid shifting response with the increase in the varying rate $N_{IN}'$ of the input rotation speed, regarded to have a comfortable feeling, and the slow shifting response with the decrease in the varying rate $N_{IN}'$ of the input rotation speed regarded to have the ease of minimizing the shifting shocks.

In the illustrated embodiment, the shifting mechanism 10 (the differential portion 11 and the power distributing mechanism 16) can be selectively switched to the continuously variable shifting state (differential state) and the non-continuously variable shifting state such as, for instance, the step variable shifting state (locked state). With the shifting mechanism 10 placed in the step variable shifting state, like the input rotation speed $N_{IN}$ of the automatic shifting portion 20, the engine rotation speed $N_E$ can be uniquely determined with the vehicle speed V and the gear ratio γ of the automatic shifting portion 20. Therefore, with the differential portion 11 placed in the step variable shifting state, the step variable shifting means 54 may execute the shifting of the automatic shifting portion 20 so as to allow the engine rotation speed $N_E$ to achieve the given varying state.

More particularly, during the operation of the step variable shifting means 54 for executing the shifting of the automatic shifting portion 20 with the differential portion 11 placed in the non-continuously variable shifting state, the engaging pressure control means 180 controls the engaging pressure of the engaging device, associated with the shifting of the automatic shifting portion 20, for use in the hydraulic pressure command (shifting output) to be output from the step variable shifting means 54 to the hydraulic pressure control circuit 42 for achieving the relevant shifting. This is because the input rotation speed $N_{IN}$ of the automatic shifting portion 20, i.e., the engine rotation speed $N_E$ achieves the given varying state.

With the differential portion 11 placed in the non-continuously variable shifting state, the engine rotation speed $N_E$ is uniquely determined with the vehicle speed V and the gear ratio γ of the automatic shifting portion 20. As used herein, the term "the given varying state of the engine rotation speed $N_E$" refers to a predetermined varying state, i.e., for instance, a given varying rate, which is preliminarily and experimentally obtained to fall in an idealistic state to allow the relevant varying rate of $N_E'(=d\,N_E/dt)$ to provide a balance between the shortening of the shifting time and the suppression of the shifting shocks during the shifting of the automatic shifting portion 20. That is, this means that the balance is provided between a rapid shifting response with an increase in the engine rotation speed $N_E'$, regarded to have a comfortable feeling, and a slow shifting response with a decrease in the engine rotation speed $N_E'$ regarded to have an ease of minimizing the shifting shocks.

Thus, with the differential portion 11 placed in the non-continuously variable shifting state, the input rotation speed $N_{IN}$ of the automatic shifting portion 20 and the engine rotation speed $N_E$ are uniquely determined with the vehicle speed V and the gear ratio γ of the automatic shifting portion 20. Therefore, the engaging pressure control means 180 controls the engaging pressure of the engaging device such that the input rotation speed $N_{IN}$ of the automatic shifting portion 20 and the engine rotation speed $N_E$ achieve the given varying states. With the differential portion 11 placed in the continuously variable shifting state, however, the engine rotation speed $N_E$ falls in a free rotating state due to the differential action of the differential portion 11. Therefore, with the differential portion 11 placed in the continuously variable shifting state, the engaging pressure control means 180 controls the engaging pressure of the engaging device such that the input rotation speed $N_{IN}$ of the automatic shifting portion 20, uniquely determined with the vehicle speed V and the gear ratio γ of the automatic shifting portion 20, achieves the given varying state.

Further, the engaging pressure control means 180 controls the hydraulic pressure command (shifting output) to be output from the step variable shifting means 54 to the hydraulic pressure control circuit 42 whereby: the input rotation speed $N_{IN}$ of the automatic shifting portion 20 is caused to achieve the given varying state with the differential portion 11 placed in the continuously variable shifting state during the operation of the step variable shifting means 54 for executing the shifting of the automatic shifting portion 20; or the input rotation speed $N_{IN}$ of the automatic shifting portion 20 or the engine rotation speed $N_E$ is caused to achieve the given varying state with the differential portion 11 placed in the non-continuously variable shifting state. This allows the engaging pressure of the engaging device, associated with the shifting of the automatic shifting portion 20, to be controlled. When this takes place, the engaging pressure of the engaging device is learned so as to achieve, for instance, such a given varying state. The operation of the engaging pressure control means 80 for learning the engaging pressure will be described below in detail.

The engaging pressure control means 180 includes engaging pressure learned value control means, i.e., learning control means 182 for learning the engaging pressure of the engaging device so as to achieve the given varying state, and learned value selecting means 184 for selectively learning the engaging pressure of the engaging device for use in the shifting of the automatic shifting portion 20. The engaging pressure control means 180 learns the shifting result of the automatic shifting portion 20 to correct a subsequent engaging pressure for use in the automatic shifting portion 20, for storing as the hydraulic learned value map of the engaging pressure of the engaging device shown in FIG. 11, while selecting the engaging pressure of the engaging device for use in the shifting of the automatic shifting portion 20 by referring to the hydraulic pressure learned value map.

Learning precondition establishment determining means, i.e., establishment determining means 188 determines whether or not a learning precondition for the learning control means 182 to learn the engaging pressure is established. This determination depends on, for instance, whether or not the variation in engine torque lies in a given value during the shifting of the automatic shifting portion 20; whether or not the engine temperature lies in the engine water temperature TEMP$_W$ representing the completion of warm-up of the engine 8; and whether or not the shifting is normally executed to allow the actuating oil temperature of the automatic shifting portion 20 to lie in a predetermined appropriate value. As used herein, the term "the given value of the variation in engine torque" refers to a determined value, preliminarily derived upon experiments, for determining whether or not engine torque during the shifting falls in any one of hierarchies as those shown in engine torque patterns 1 to 7 in the hydraulic pressure learned value shown in FIG. 11.

With the differential portion 11 placed in the continuously variable shifting state during the operation of the step variable shifting means 54 for executing the shifting of the automatic shifting portion 20, the learning control means 182 monitors the variation in the actual input rotation speed $N_{IN}$ of the automatic shifting portion 20 during the shifting thereof for making a comparison with the given varying state. Alternately, with the differential portion 11 placed in the non-continuously variable shifting state, the learning control means 182 monitors the variation in the actual input rotation speed $N_{IN}$ of the automatic shifting portion 20 or the variation in the engine rotation speed $N_E$ during the shifting thereof for making a comparison with the given varying state. Then, the learning control means 182 executes the learning control for correcting the engaging pressure of the engaging device so as to minimize a difference between the variation in a resulting actual rotation speed and a given varying state in a subsequent shifting step. In such execution, the engaging pressure of the engaging device, used in immediately preceding shifting, is raised or lowered so as to allow the subsequent shifting to be executed in the given varying state.

Moreover, in the hydraulic pressure learned value maps shown in FIG. 11, the learning control means 182 rewrites the hydraulic pressure value, associated with engine torque and the kind of the shifting during the shifting for the learning to be targeted, to a hydraulic pressure value, subsequent to the correction (subsequent to the adjustment) executed on the engaging pressure in the current learning control, for storing the same as a new learned value.

During the operation of the step variable shifting means 54 for executing the shifting of the automatic shifting portion 20, the learned value selecting means 184 selects the hydraulic pressure learned value or the default value, based on engine torque $T_E$ and the kind of the shifting by referring to the hydraulic pressure learned value maps shown in FIG. 11, as the hydraulic pressure value of the engaging device for use in the shifting command to be output to the hydraulic pressure control valve 42 under the control of the step variable shifting means 54.

During the operation of the step variable shifting means 54 for executing the shifting of the automatic shifting portion 20, further, the hybrid control means 52 performs a function, besides the function mentioned above, to act as rotation control means for varying the input rotation speed $N_{IN}$ of the automatic shifting portion 20 and/or the engine rotation speed $N_E$ using the first electric motor M1 and/or the second electric motor M2. More particularly, the input rotation speed $N_{IN}$ of the automatic shifting portion 20 and/or the engine rotation speed $N_E$ are controlled so as to achieve given states.

For instance, the hybrid control means 52 suppresses the shifting shocks during the operation of the step variable shifting means 54 for executing the shifting of the automatic shifting portion 20. To this end, with the differential portion 11 placed in the continuously variable shifting state, the hybrid control means 52 positively (forcibly) varies the input rotation speed $N_{IN}$ of the automatic shifting portion 20, using the first electric motor M1 and/or the second electric motor M2, such that the input rotation speed $N_{IN}$ of the automatic shifting portion 20 achieves the given state, i.e., the given varying state. Alternately, with the differential portion 11 placed in the non-continuously variable shifting state, the hybrid control means 52 positively (forcibly) varies the input rotation speed $N_{IN}$ of the automatic shifting portion 20 or the engine rotation speed $N_E$, using the first electric motor M1 and/or the second electric motor M2, such that the input rotation speed $N_{IN}$ of the automatic shifting portion 20 or the engine rotation speed $N_E$ achieve the given states, i.e., for instance, the given varying states.

With such an operation, the variations in the input rotation speed $N_{IN}$ of the automatic shifting portion 20 and the engine rotation speed $N_E$ (only with the differential portion 11 placed in the non-continuously variable shifting state) can be effectuated to be further closer to the given varying state, than those achieved in the variations of the input rotation speed $N_{IN}$ of the automatic shifting portion 20 and the engine rotation speed $N_E$ (only with the differential portion 11 placed in the non-continuously variable shifting state) resulting from the shifting of the automatic shifting portion 20 caused by engaging operations of mainly the on-disengaging side engaging device and the on-engaging side engaging device. Hereunder, the input rotation speed $N_{IN}$ of the automatic shifting portion 20 and the engine rotation speed $N_E$ (only with the differential portion 11 placed in the non-continuously variable shifting state) will be referred to as the input rotation speed $N_{IN}$ of the automatic shifting portion 20 unless otherwise indicated.

Here, the expression "the variations of the input rotation speed $N_{IN}$ of the automatic shifting portion 20 resulting from the shifting of the automatic shifting portion 20 caused by the engaging operations of mainly the on-disengaging side engaging device and the on-engaging side engaging device" refers to the variable by the engaging operations effectuated in the on-disengaging side engaging device and the on-engaging side engaging device using the hydraulic pressure values learned so as to achieve, for instance, the given varying state mentioned above, or the predetermined default value.

That is, fundamentally, the automatic shifting portion 20 executes the shifting upon effectuating the engaging operations of mainly the on-disengaging side engaging device and the on-engaging side engaging device. However, with the automatic shifting portion 20 performed the shifting causing the variation in the input rotation speed $N_{IN}$ to deviate from the given varying state, the input rotation speed $N_{IN}$ of the automatic shifting portion 20 is positively (forcibly) varied for the purpose of suppressing the shifting shocks. In varying the input rotation speed $N_{IN}$, the hybrid control means 52 performs the operation using the first electric motor M1 and/or the second electric motor M2. That is, the input rotation speed $N_{IN}$ is corrected using the first electric motor M1 and/or the second electric motor M2 so as to achieve the given varying state during the shifting of the automatic shifting portion 20.

During the operation of the step variable shifting means 54 for executing the shifting of the automatic shifting portion 20, for instance, the hybrid control means 52 monitors the variation in the actual input rotation speed $N_{IN}$ during the shifting. If a rotational variation between the actual input rotation speed $N_{IN}$ and the given varying state exceeds a given rotational difference, the hybrid control means 52 corrects the input rotation speed $N_{IN}$ using the first electric motor M1 and/or the second electric motor M2 so as to minimize the difference in rotational variation between both the rotation speeds. The given rotational difference represents a rotational difference determining value that is preliminarily derived upon experiments. This is used in determining whether or not the rotational difference between the actual input rotation speed $N_{IN}$ and the given varying state is too large to need the input rotation speed $N_{IN}$ to be corrected using the first electric motor M1 and/or the second electric motor M2.

Here, with the hybrid control means 52 corrected the input rotation speed $N_{IN}$ of the automatic shifting portion 20 using the first electric motor M1 and/or the second electric motor M2 so as to allow the same to achieve the given varying state, a variation quantity of the input rotation speed $N_{IN}$ involves a coercive variation quantity, i.e., a corrected quantity using the first electric motor M1 and/or the second electric motor M2.

If the engaging pressure learning control means 82 uniformly performs the learning control on the engaging pressure of the engaging device without reference to such a corrected quantity to allow the shifting to be performed on a subsequent shifting cycle with the use of such a learned value, then, an issue is encountered in a manner described below. There is a possibility of a difference occurring between the actual input rotation speed $N_{IN}$ of the automatic shifting portion 20 and the given varying state in a value greater by the corrected quantity resulting from the effects of the first electric motor M1 and/or the second electric motor M2 with a resultant occurrence of no engaging pressure of the engaging device being correctly learned.

To address such an issue, during the operation of the step variable shifting means 54 for executing the shifting of the automatic shifting portion 20, with the hybrid control means 52 corrected the input rotation speed $N_{IN}$ of the automatic shifting portion 20 using the first electric motor M1 and/or the second electric motor M2 so as to allow the same to achieve the given varying state, the learning control means 182 executes the following control.

That is, the learning control means 182 learns the engaging pressure of the engaging device based on the variation quantity of the input rotation speed $N_{IN}$ effectuated by the hybrid control means 52 using the first electric motor M1 and/or the second electric motor M2. In other words, the learning control means 182 corrects the default value of the learned value on the engaging pressure of the engaging device in the hydraulic pressure learned value maps, shown in FIG. 11, with reference to the corrected quantity of the input rotation speed $N_{IN}$ resulting from the use of the first electric motor M1 and/or the second electric motor M2.

Figure 25:
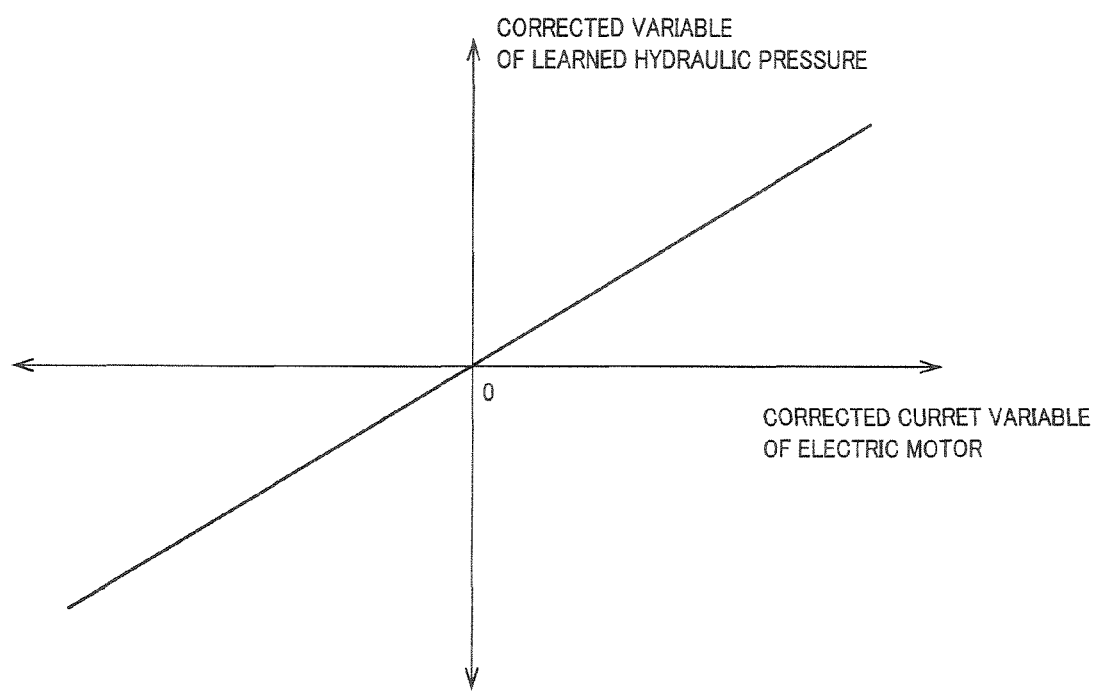
FIG. 25 is a representation of an example of the relationship preliminarily obtained on experiments between a corrected value on an input rotation speed of a first electric motor and/or a second electric motor and a default value or a corrected value (corrected amount) of a learned value on the engaging pressure of the engaging device.

FIG. 25 represents an exemplary relationship, preliminarily obtained on experiments, between the corrected quantity of the input rotation speed $N_{IN}$, resulting from the use of the first electric motor M1 and/or the second electric motor M2, and the default value or the learned value (corrected quantity) on the engaging pressure of the engaging device for use in the operation of the automatic shifting portion 20 in the up-shifting.

In FIG. 25, a correction current magnitude, supplied through the first electric motor M1 and/or the second electric motor M2, is made positive to achieve a further reduction the input rotation speed $N_{IN}$ so as to cause the same to achieve the given varying state with the up-shifting of the automatic shifting portion 20. This a further reduction in the input rotation speed $N_{IN}$ to allow the same to achieve the given varying state on a subsequent up-shifting cycle. To this end, the positive corrected quantity (correction quantity) is set such that the greater the positive current magnitude so as to increase the corrected quantities of the first electric motor M1 and/or the second electric motor M2, the greater will be the default value or the learned value of the engaging pressure of the engaging device.

Thus, the learning control means 182 alters the method of learning the engaging pressure of the engaging device based on whether or not the hybrid control means 52 corrects (varies) the input rotation speed $N_{IN}$ of the automatic shifting portion 20, using the first electric motor M1 and/or the second electric motor M2, so as to cause it to achieve the given varying state. In particular, the hybrid control means 52 switches whether to learn the engaging pressure of the engaging device in consideration of the corrected quantity due to the first electric motor M1 and/or the second electric motor M2 or whether to learn the engaging pressure of the engaging device with no regard to the corrected quantity.

Alternately, when the hybrid control means 52 corrects the input rotation speed $N_{IN}$ of the automatic shifting portion 20 using the first electric motor M1 and/or the second electric motor M2 during the operation of the step variable shifting means 54 for executing the shifting of the automatic shifting portion 20, the learning control means 182 may learn the engaging pressure of the engaging device as a learned value for correction due to the first electric motor M1 and/or the second electric motor M2 in place of considering the corrected quantity. That is, the learning control means 182 distinguishes the hydraulic pressure learned value on the engaging pressure of the engaging device based on whether or not the hybrid control means 52 corrects (varies) the input rotation speed $N_{IN}$ of the automatic shifting portion 20 so as to allow the same to achieve the given varying state.

Moreover, even if the engaging pressure of the engaging device is learned on consideration of the corrected quantity due to the first electric motor M1 and/or the second electric motor M2 and even if the engaging pressure of the engaging device is learned as the learned value for the correction due to the first electric motor M1 and/or the second electric motor M2, the learning control means 82, it doesn't make difference for the engaging pressure of the engaging device to be learned in consideration of the correction caused by the first electric motor M1 and/or the second electric motor M2.

For instance, during the operation of the step variable shifting means 54 for executing the shifting of the automatic shifting portion 20, the hybrid control means 52 corrects the input rotation speed $N_{IN}$ of the automatic shifting portion 20 using the first electric motor M1 and/or the second electric motor M2 so as to allow the input rotation speed $N_{IN}$ to achieve the given varying state. In this moment, the learning control means 182 organizes the resulting learned value as the pattern "A". During the operation of the step variable shifting means 54 for executing the shifting of the automatic shifting portion 20, if the hybrid control means 52 makes no correction on the input rotation speed $N_{IN}$ of the automatic shifting portion 20 using the first electric motor M1 and/or the second electric motor M2 so as to allow the same to achieve the given varying state, the learning control means 182 organizes the resulting learned value as the pattern "B". As a result, the hydraulic pressure learned value maps are stored as the patterns "A" and "B", respectively, as shown in FIG. 11 based on whether the correction depending on the first electric motor M1 and/or the second electric motor M2 is present or absent.

Thus, depending on whether or not the hybrid control means 52 corrects (varies) so as to allow the input rotation speed $N_{IN}$ to achieve the given varying state, the learning control means 182 learns the engaging pressure of the engaging device. The learning is executed so as to obtain the hydraulic pressure learned value maps for the patterns "A" and "B" depending whether or not the correction based on the first electric motor M1 and/or the second electric motor M2 is present.

Accordingly, depending on whether or not the hybrid control means 52 corrects (varies) the input rotation speed $N_{IN}$ of the automatic shifting portion 20 using the first electric motor M1 and/or the second electric motor M2 so as to allow the same to achieve the given varying state, the learning control means 182 alters the method of learning the engaging pressure of the engaging device so as to obtain the hydraulic pressure value maps depending on the presence or the absence of the correction, i.e., in other words, so as to alter the hydraulic pressure value maps depending on the presence or the absence of the correction.

With the learning control means 182 storing the hydraulic pressure value maps as the patterns "A" and "B", respectively, the learned value selecting means 184 selects the hydraulic pressure value map from the hydraulic pressure value maps, organized and stored by the learning control means 182 as the patterns "A" and "B", based on the presence or the absence of the correction caused by the first electric motor M1 and/or the second electric motor M2. At the same time, the learned value selecting means 184 selects the learned value on the engaging pressure of the engaging device for use in the shifting of the automatic shifting portion 20 based on engine torque $T_E$ and the kind of the shifting by referring to the selected hydraulic pressure value map.

During the operation of the step variable shifting means 54 for executing the shifting of the automatic shifting portion 20, for instance, the learned value selecting means 184 selects the pattern "A" as the hydraulic pressure value map while selecting the learned value on the engaging pressure of the engaging device for used in the shifting of the automatic shifting portion 20 based on engine torque $T_E$ and the kind of the shifting referring to the selected hydraulic pressure value map.

There are cases wherein the shift completion determining means 86 determines that the step variable shift control means 54 has terminated the shifting of the automatic shifting portion 20, and the establishment determining means 188 determines that the learning precondition for the learning control means 182 to learn the engaging pressure has established. In such cases, the learning control means 182 alters the method of learning the engaging pressure of the engaging device based on whether or not the input rotation speed $N_{IN}$ of the automatic shifting portion 20 is corrected (varied) using the first electric motor M1 and/or the second electric motor M2 so as to achieve the given varying state.

Motor correction determining means 190 determines whether or not the hybrid control means 52 corrects the input rotation speed $N_{IN}$ of the automatic shifting portion 20 using the first electric motor M1 and/or the second electric motor M2 so as to allow the input rotation speed $N_{IN}$ to achieve the given varying state. This determination is made during the operation of the step variable shifting means 54 for executing the shifting of the automatic shifting portion 20. With the differential portion 11 placed in the step variable shifting state, such a motor torque down control may be executed using the first electric motor M1 in place of or in addition to the second electric motor M2.

Figure 26:
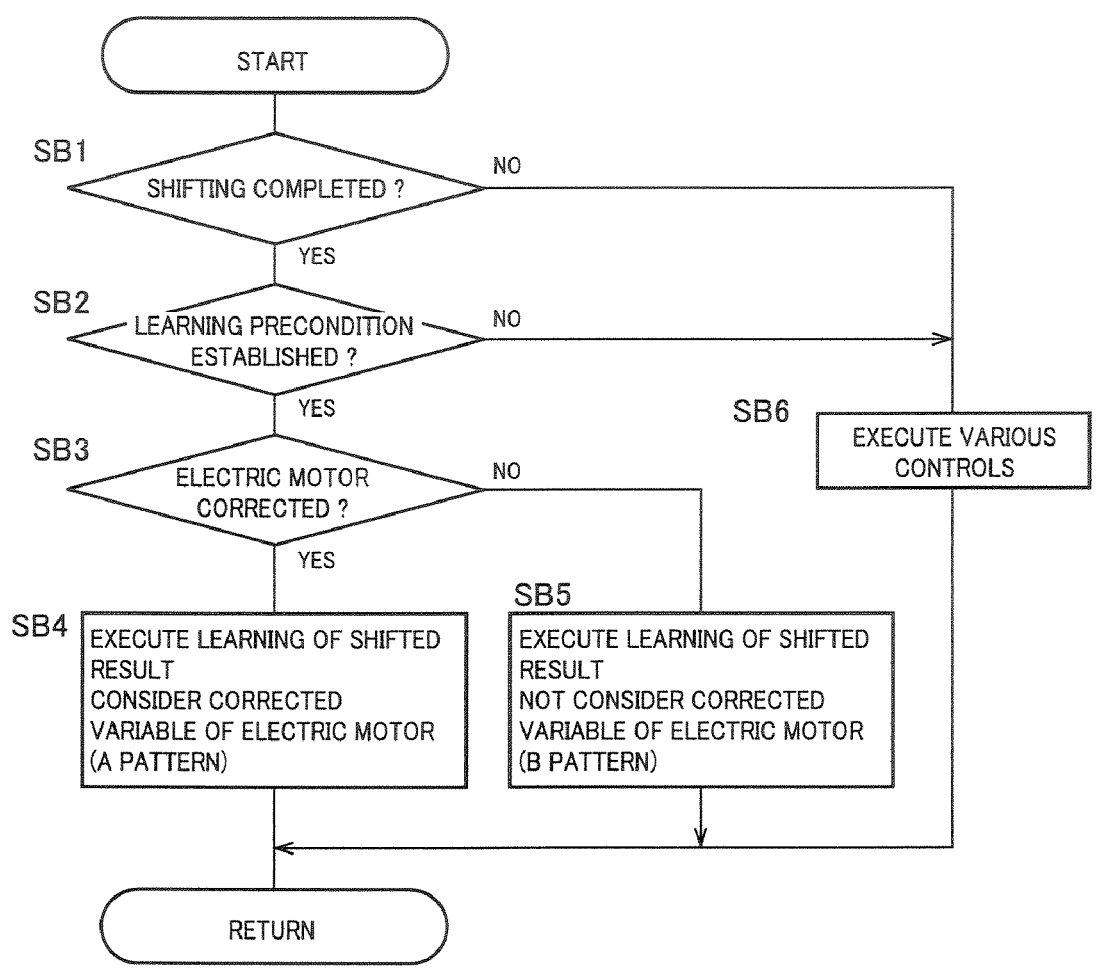
FIG. 26 is a flowchart illustrating control operations of the electronic control device of an embodiment shown in FIG. 25, i.e., control operations for learning the hydraulic pressure value of the engaging device for use in the shifting of the automatic shifting portion.

FIG. 26 is a flowchart illustrating an essence of control operations of the electronic control device 40 of an illustrated embodiment shown in FIG. 24, i.e., control operations for learning the engaging pressure of the engaging device for use in the shifting of the automatic shifting portion 20.

FIG. 13 is a timing chart, illustrating the control operations represented in the flowchart shown in FIG. 26, which represents the control operations to be executed when executing the up-shifting "2nd→3rd" gear ratio in the automatic shifting portion 20 with the differential portion 11 placed in the continuously variable shifting state. FIG. 14 is a timing chart, illustrating the control operations represented in the flowchart shown in FIG. 26, which represents the control operations to be executed when executing a coast downshifting "3rd→2nd" in the automatic shifting portion 20 with the differential portion 11 placed in the continuously variable shifting state.

FIG. 15 is a timing chart, illustrating the control operations represented in the flowchart shown in FIG. 26, which represents the control operations to be executed when executing a power-on downshifting "3rd→2nd" gear ratio in the skipped shifting in the automatic shifting portion 20 with the differential portion 11 placed in the continuously variable shifting state. FIG. 16 is a timing chart, illustrating the control operations represented in the flowchart shown in FIG. 26, which represents the control operations to be executed when executing an up-shifting "2nd→3rd" gear ratio in the automatic shifting portion 20 with the differential portion 11 placed in the step variable shifting state (locked state). FIG. 17 is a timing chart, illustrating the control operations represented in the flowchart shown in FIG. 26, which represents the control operations to be executed when executing a coast downshifting "3rd→2nd" gear ratio in the automatic shifting portion 20 with the differential portion 11 placed in the step variable shifting state (locked state).

First, in step SA1 corresponding to the shift completion determining means 86, the determination is made whether or not the automatic shifting portion 20 has completed the shifting. The determination is based on whether or not a given shifting time interval has elapsed in the automatic shifting portion 20, or whether or not the actual input rotation speed $N_{IN}$ of the automatic shifting portion 20 is brought into nearly synchronism with the input rotation speed $N_{IN}$ of the automatic shifting portion 20 after the shifting.

The time instant $t_1$ in FIG. 13 indicates that with the differential portion 11 placed in the continuously variable shifting state (differential state), the up-shifting "2nd→3rd" in the automatic shifting portion 20 is determined, and a shift command is output to the automatic shifting portion 20 for the shifting to be executed in the 3rd-gear ratio. At this time instant, the disengaging hydraulic pressure $P_{B2}$ of the second brake B2, acting as the on-disengaging side engaging device, begins to decrease and the shifting begins to be executed. During the time period from $t_1$ to $t_3$, the engaging hydraulic pressure $P_{B1}$ of the first brake B1 acting as the on-engaging side engaging device is raised, and at the time instant $t_3$, the engaging action of the first brake B1 is completed finishing the shifting of the automatic shifting portion 20.

The transition hydraulic pressure of the on-disengaging side engaging device and the transition hydraulic pressure in the on-engaging side engaging device during the time period between the time instants $t_1$ and $t_3$ are determined using the learned value for achieving the up-shifting of "2nd→3rd" ratio selected from the hydraulic pressure learned value maps as shown in FIG. 11 such that the input rotation speed $N_{IN}$ of the automatic shifting portion 20 achieves the given varying state.

The time instant $t_1$ in FIG. 14 represents that with the differential portion 11 placed in the continuously variable shifting state (differential state), the downshifting "3rd→2nd" ratio of the automatic transmission (step variable section) 20 is determined, and a shift command is output to the automatic shifting portion 20 for the shifting to be executed in the 2nd-gear ratio. At this time instant, the disengaging hydraulic pressure $P_{B1}$ of the first brake B1 acting as the on-disengaging side engaging device begins to decrease and the shifting begins to be executed.

During the time period from $t_1$ to $t_4$, the engaging hydraulic pressure $P_{B2}$ of the second brake B2 acting as the on-engaging side engaging device is raised, and at the time instant $t_4$, the engaging action of the second brake B2 is completed finishing the shifting of the automatic shifting portion 20. During the time period between the time instants $t_1$ and $t_4$, the transition hydraulic pressure of the on-disengaging side engaging device and the transition hydraulic pressure in the on-engaging side engaging device are predetermined using the learned value for achieving the downshifting of "3rd→2nd" ratio selected from the hydraulic pressure learned value maps as shown in FIG. 11 such that the input rotation speed $N_{IN}$ of the automatic shifting portion 20 achieves the given varying state.

For, instance, as the on-engaging side engaging device begins to be supplied with the hydraulic pressure as shown in FIG. 17, a high hydraulic pressure command is output to rapidly charge actuating oil so as to immediately narrow a back-clearance of the on-engaging side engaging device. Thus, if the engaging device remains engaged with a high hydraulic pressure intact, sometimes a shocks occur during the engaging. With such likelihood in mind, a low hydraulic pressure value command is output once at a engaging initiating time, after which a hydraulic pressure value command is output so as to increment or decrement the hydraulic pressure value toward a targeted hydraulic pressure value for the engaging to be completed.

The time instant $t_2$ in FIG. 13 and the time instant $t_2$ in FIG. 14 represent any one of situations described below. A first situation concerns whether or not the actual input rotation speed $N_{IN}$ of the automatic shifting portion 20 varies in a given quantity preliminarily determined on experiments for the initiation of the inertia to be determined. A second situation concerns whether or not a given time interval, preliminarily derived on experiments as a time for the on-engaging side engaging device to have a engaging torque capacity, has elapsed. A third situation concerns whether or not the engaging hydraulic pressure of the on-engaging side engaging device reaches the engaging pressure transition hydraulic pressure (command) value Pc, preliminarily obtained on experiments as the hydraulic pressure (command) value to have the engaging torque capacity, upon which the initiation of the inertia phase is determined.

The time period between $t_2$ and $t_3$ in FIG. 13 and the time period between $t_3$ and $t_4$ in FIG. 14 represent a result in that the rotation speed $N_{M1}$ of the first electric motor M1 is controlled due to the differential action of the differential portion 11 to vary the gear ratio thereof by a variable component corresponding to the variation in gear ratio of the automatic shifting portion 20 in a direction opposite to that in which the automatic shifting portion 20 varies the gear ratio. This occurs during the inertia phase in the course of the shifting of the automatic shifting portion 20. This is because such a control precludes the total gear ratio γT of the shifting mechanism 10 from varying on a stage before and after the shifting of the automatic shifting portion 20, that is, to maintain the engine rotation speed $N_E$ at a nearly fixed level.

The time instant $t_1$ in FIG. 15 represents that with the differential portion 11 placed in the continuously variable shifting state (differential state), the downshifting "3rd→2nd" ratio in the automatic shifting portion (step variable portion) 20 is determined and a shift command is output to the automatic shifting portion 20 for the shifting to be executed to the 2nd-gear ratio. At this time instant, the disengaging hydraulic pressure $P_{B1}$ of the first brake B1 acting as the on-disengaging side engaging device begins decreasing, and the shifting begins to be executed.

During the time period from $t_1$ to $t_3$, the engaging hydraulic pressure $P_{B2}$ of the second brake B2 acting as the on-engaging side engaging device is raised, and at the time instant $t_4$ the engaging action of the second brake B2 is completed finishing the shifting of the automatic shifting portion 20.

During the time period between the time instants $t_1$ and $t_4$, the transition hydraulic pressure of the on-disengaging side engaging device and the transition hydraulic pressure in the on-engaging side engaging device are predetermined using the learned value for achieving the downshifting of "3rd→2nd" ratio selected from the hydraulic pressure learned value maps as shown in FIG. 11 such that the input rotation speed $N_{IN}$ of the automatic shifting portion 20 achieves the given varying state.

For instance, like the illustrated embodiment shown in FIG. 14, a high hydraulic pressure value command is outputted during the operation of the on-engaging side engaging device to begin supplying the hydraulic pressure whereas at a timing for the engaging to be commenced, a low hydraulic pressure value is output once and a hydraulic pressure command is output in a pattern to gradually increase toward a hydraulic pressure value for the engaging to be completed.

Although the illustrated embodiment, shown in FIG. 15, shows a case in which the differential portion 11 is placed in the continuously variable shifting state, the rotation speed $N_{M1}$ of the first electric motor $M_1$ is raised nearly concurrently with the shifting output at the time instant $t_1$ and later, unlike the illustrated embodiments shown in FIGS. 13 and 14, with a resultant increase in the gear ratio γ0 of the differential portion 11 for thereby raising the engine rotation speed $N_E$. The input rotation speed $N_{IN}$ (the rotation speed $N_{18}$ of the transmitting member) of the automatic shifting portion 20 is raised with the downshifting initiated in the automatic shifting portion 20, and the engine rotation speed $N_E$ is raised with the rotation speed $N_{M1}$ of the first electric motor M1 remained substantially constant. The differential portion 11 executes the shifting using at least the first electric motor M1 through the differential action of the differential portion 11 so as to allow the differential portion 11 to finally adjust the total gear ratio γT toward the target value.

With the illustrated embodiment involved in the skipped shifting in such away, the differential portion 11 executes the shifting toward the targeted total gear ratio γT, i.e., toward the engine rotation speed $N_E$ after the shifting upon utilizing the variation in the stepwise gear ratios caused by the shifting of the automatic shifting portion 20 in non-synchronism with the shifting thereof.

A time instant $t_1$ in FIG. 16 represents that with the differential portion 11 placed in the non-continuously variable shifting state (locked state), the up-shifting "2nd→3rd" ratio for the automatic shifting portion 20 is determined, and a shift command is output to the automatic shifting portion 20 for the shifting to be executed in the 3rd-gear ratio. At this time instant, the disengaging hydraulic pressure $P_{B2}$ of the second brake B2, acting as the on-disengaging side engaging device, begins to decrease and the shifting begins to be executed.

During a time period from $t_1$ to $t_3$, the engaging hydraulic pressure $P_{B1}$ of the first brake B1 acting as the on-engaging side engaging device is raised, and at the time instant $t_3$ the engaging action of the first brake B1 is completed to finish a series of shifting operating. The transition hydraulic pressure of the on-disengaging side engaging device and the transition hydraulic pressure in the on-engaging side engaging device during the time period between the time instants $t_1$ and $t_3$ are determined using the learned value for achieving the up-shifting of "2nd→3rd" ratio selected from the hydraulic pressure learned value maps, shown in FIG. 11, such that the input rotation speed $N_{IN}$ of the automatic shifting portion 20 or the engine rotation speed $N_E$ achieves the given varying state.

In the illustrated embodiment shown in FIG. 16, the operation in up-shifting is initiated with the differential portion 11 placed in the locked state due to the switching brake C0 being engaged. This causes the shifting mechanism 10 to function as the step variable shifting transmission as a whole. Therefore, with the vehicle speed V remained constant, the input rotation speed $N_{IN}$ (the rotation speed $N_{18}$ of the transmitting member 18) of the automatic shifting portion 20 and the engine rotation speed $N_E$ are caused to decrease with the operation in the up-shifting executed as shown in the drawing.

A time instant $t_1$ in FIG. 17 represents that with the differential portion 11 placed in the non-continuously variable shifting state (locked state), the down-shifting "3rd→2nd" ratio for the automatic shifting portion 20 is determined, and a shift command is output to the automatic shifting portion 20 for the shifting to be executed in the 2nd-gear ratio. At this time instant, the disengaging hydraulic pressure $P_{B1}$ of the first brake B1, acting as the on-disengaging side engaging device, begins to decrease and the shifting begins to be executed.

During a time period from $t_1$ to $t_4$, the engaging hydraulic pressure $P_{B2}$ of the second brake B2 acting as the on-engaging side engaging device is raised, and at the time instant $t_4$ the engaging action of the second brake B2 is completed to finish a series of shifting operating. The transition hydraulic pressure of the on-disengaging side engaging device and the transition hydraulic pressure in the on-engaging side engaging device during the time period between the time instants $t_1$ and $t_4$ are determined using the learned value for achieving the down-shifting of "3rd→2nd" ratio selected from the hydraulic pressure learned value maps, shown in FIG. 11, such that the input rotation speed $N_{IN}$ of the automatic shifting portion 20 or the engine rotation speed $N_E$ achieves the given varying state.

For instance, like the embodiment shown in FIG. 14 and FIG. 15, upon beginning of the hydraulic pressure supply to the on-engaging side engaging device a high hydraulic pressure value command is output, and upon beginning of the engagement a low hydraulic pressure value command is output once. Then, the hydraulic pressure value command gradually increases toward the hydraulic pressure value upon completion of the engagement.

In the illustrated embodiment shown in FIG. 17, the operation in down-shifting is initiated with the differential portion 11 placed in the locked state due to the switching brake C0 being engaged. This causes the shifting mechanism 10 to function as the step variable shifting transmission as a whole. Therefore, with the vehicle speed V remained constant, the input rotation speed $N_{IN}$ (the rotation speed $N_{18}$ of the transmitting member 18) of the automatic shifting portion 20 and the engine rotation speed $N_E$ are caused to increase with the operation in the down-shifting executed as shown in the drawing.

If the determination in step SB1 is made positive, then in step SB2 corresponding to the establishment determining means 188, the determination is made whether or not the learning precondition is established for learning the hydraulic pressure value (engaging pressure) of the engaging device for use in the automatic shifting portion 20 for the shifting thereof to be executed. Such a determination depends on whether or not, for instance, the shifting is normally executed and finished with the variation in engine torque remained in the given value during the shifting of the automatic shifting portion 20 while the engine water temperature lies at TEMP$_W$ regarded to be the completed warm-up of the engine 8 and the actuating oil temperature of the automatic shifting portion 20 lies in a predetermined appropriate value.

If the determination in step SB2 is made positive, then in step SB3 corresponding to the motor correction determining means 190, the determination is made whether or not the hybrid control means 52 has corrected the input rotation speed $N_{IN}$ of the automatic shifting portion 20 during the shifting of the automatic shifting portion 20 using the first electric motor M1 and/or the second electric motor M2 so as to allow the input rotation speed $N_{IN}$ to achieve the given varying state.

If the determination in step SB3 is made positive, then in step SB4 corresponding to the learning control means 182, the operation is executed to correct the default value of or the learned value on the engaging pressure of the engaging device in the hydraulic pressure learned value maps, shown in FIG. 11, in consideration of the corrected value on the input rotation speed $N_{IN}$ of the automatic shifting portion 20 corrected by the hybrid control means 52 during the shifting of the automatic shifting portion 20.

A corrected value on the default value or the learned value relative to the above the above-described corrected value is derived from, for instance, the relationship shown in FIG. 25. In step SB4, alternatively, the engaging pressure of the engaging device is learned as a learned value when the hybrid control means 52 has corrected the input rotation speed $N_{IN}$ of the automatic shifting portion 20 using the first electric motor M1 and/or the second electric motor M2 so as to allow the input rotation speed $N_{IN}$ of the automatic shifting portion 20 to achieve the given varying state. Such learning is organized as, for instance, the pattern "A" for the hydraulic pressure learned value maps.

If the determination in step SB3 is made negative, then in step SB5 corresponding to the learning control means 182, the operation is executed to correct the default value of or the learned value on the engaging pressure of the engaging device in the hydraulic pressure learned value maps, shown in FIG. 11, with no regard to the corrected value on the input rotation speed $N_{IN}$ of the automatic shifting portion 20. Or, in step SB5, the engaging pressure of the engaging device is learned as a learned value in the absence of the correction made on the input rotation speed $N_{IN}$ of the automatic shifting portion 20. The learning is organized as, for instance, the pattern "B" for the hydraulic pressure learned value map.

With the differential portion 11 placed in the continuously variable shifting state, like the illustrated embodiments shown in FIGS. 13 to 15, the input rotation speed $N_{IN}$ of the automatic shifting portion 20 is caused to positively vary sometimes so as to achieve the given varying state using the second electric motor M2 in nearly synchronism with beginning of the inertia phase from the time instant $t_2$ during the time period between the time instants $t_2$ and $t_3$ in FIG. 13, the time period between the time instants $t_2$ and $t_4$ in FIG. 14 or the time period between the time instants $t_2$ and $t_4$ in FIG. 15. In such a case, the engaging pressure of the engaging device is learned in consideration of the corrected value on the input rotation speed $N_{IN}$ relied on the second electric motor M2.

If no correction is made on the input rotation speed $N_{IN}$, using the second electric motor M2, on the stages including the time period between the time instants $t_2$ and $t_3$ in FIG. 13, the time period between the time instants $t_2$ and $t_4$ in FIG. 14 or the time period between the time instants $t_2$ and $t_4$ in FIG. 15, the engaging pressure of the engaging device is learned intact.

Like the illustrated embodiments shown in FIGS. 16 and 17, with the differential portion 11 placed in the non-continuously variable shifting state, the input rotation speed $N_{IN}$ of the automatic shifting portion 20 and/or the engine rotation speed $N_E$ is caused to positively vary sometimes so as to achieve the given varying state using the first electric motor M1 and/or the second electric motor M2 in nearly synchronism with beginning of the inertia phase from the time instant $t_2$ during the time period between the time instants $t_2$ and $t_3$ in FIG. 17, or the time period between the time instants $t_2$ and $t_4$ in FIG. 18. In such a case, the engaging pressure of the engaging device is learned in consideration of the corrected value on the input rotation speed $N_{IN}$ and/or the engine rotation speed $N_E$ relied on the first electric motor M1 and/or the second electric motor M2.

If no correction is made on the input rotation speed $N_{IN}$ and/or the engine rotation speed $N_E$, using the first electric motor M1 and/or the second electric motor M2, on the stages including the time period between the time instants $t_2$ and $t_3$ in FIG. 16, or the time period between the time instants $t_2$ and $t_4$ in FIG. 17, the engaging pressure of the engaging device is learned intact.

If the determinations in step SB1 or the determination in step SB2 are made negative, then in step SB6, the various control means of the control device 40 executes the control operations or the current routine is completed under a situation where no engaging pressure of the engaging device of the automatic shifting portion 20 is learned.

In the illustrated embodiments shown in FIGS. 13 to 17, further, the torque down control may be executed to decrease torque such as, for instance, input torque $T_{IN}$ or output torque $T_{OUT}$ of the automatic shifting portion 20 in synchronism with the inertia phase in the course of the shifting of the automatic shifting portion 20.

For instance, the inertia torque occurs as the torque increment, such as for instance, the torque increment in output torque $T_{OUT}$, in torque being transferred to the drive wheels 38, with the decrease in the rotation speed of the rotary element forming the automatic shifting portion 20 or the rotation speed of the rotary element forming the differential portion 11. Further, the inertia torque occurs as the torque increment in torque being transferred to the drive wheels 38 with the decrease in the engine rotation speed $N_E$ during the up-shifting. Alternately, there is likelihood that the engaging shocks occur due to fluctuations in torque resulting from the completion of the engaging of the engaging device during the shifting of the automatic shifting portion 20.

To address such an issue, the torque down control is executed so as to cancel the torque increment corresponding to inertia torque, i.e., for instance, input torque $T_{IN}$ or output torque $T_{OUT}$ of the automatic shifting portion 20 to some extent (i.e., to absorb the same to some extent).

Alternately, the torque down control is executed so as to cancel the fluctuations in torque caused by the completion of the engaging of the engaging device for thereby suppressing the engaging shocks. For instance, the engine torque down control for engine torque $T_E$ to be dropped, or the motor torque down control using the second electric motor M2 may be executed independently or in combination, thereby reducing torque being transferred to the drive wheels 38. However, no torque down control may be executed in a case in the presence of the downshifting, i.e., the coast downshifting executed during running at a decelerating speed with the accelerator pedal remained turned off.

The time period between the time instants $t_2$ and $t_3$ in FIG. 13 represents that the torque down control is executed. In this case, the variation in engine rotation speed $N_E$ is suppressed during the shifting. Therefore, the torque component is cancelled to some extent, which corresponds to inertia torque representing the torque increment in torque being transferred to the drive wheels 38 caused by the variation in rotation speed of the rotary element forming the automatic shifting portion 20 and the variation in rotation speed of the rotary element forming the differential portion 11.

FIG. 14 represents that no torque down control is performed because of the illustrated embodiment related to the coast downshifting. However, with the downshifting executed for torque to be transferred to the drive wheels 38, the torque down control may be executed for canceling the inertia torque component like the illustrated embodiment shown in FIG. 13.

The time period between the time instants $t_3$ and $t_5$, shown in FIG. 15, represents that input torque $T_{IN}$ is decreased on a stage of the shifting completion. Such a shifting is related to the power-on downshifting. This cancels the fluctuation in torque, caused by the completion in engaging (in a locked state with one-way clutch being provided even though no one-way clutch is provided in the illustrated embodiment) of the engaging device forming the automatic shifting portion 20, to some extent for thereby suppressing the engaging shocks.

A time period between the time instants $t_2$ and $t_3$ in FIG. 16 represents, the operation is executed to allow the torque component, corresponding to inertia torque representing the torque increment in torque transferred to the drive wheels 38, to be cancelled to some extent. Torque increment is resulted from the variation in engine rotation speed $N_E$, the variation in the rotation speed of the rotary element forming the automatic shifting portion 20, or the inertia torque as the torque increment transferred to the drive wheels 38 upon the variation in the rotation speed of the rotary element forming the differential portion 11.

In the embodiment show in FIG. 17 representing the coast downshifting, no torque down control is executed. However, during the downshifting with torque being transferred to the drive wheels 38, the torque down control may be executed canceling the inertia torque component like the operation in FIG. 16.

In the illustrated embodiment, as set forth above, the control means 180 alters the method of learning the engaging pressure of the engaging device, based on whether or not the hybrid control means 52 varies the input rotation speed $N_{IN}$ of the automatic shifting portion 20 using the first electric motor M1 and/or the second electric motor M2 during the shifting of the automatic shifting portion 20. Accordingly, the input rotation speed $N_{IN}$ has the variations during the shifting of the automatic shifting portion 20 in two modes: the variation in the input rotation speed $N_{IN}$ effectuated by the hybrid control means 52; and the variation in the input rotation speed $N_{IN}$ effectuated by the engaging pressure of the engaging device associated with the shifting of the automatic shifting portion 20. This allows the engaging pressure of the engaging device, associated with the shifting of the automatic shifting portion 20, to be precisely learned, thereby suppressing the shifting shocks.

In the illustrated embodiment, further, during the shifting of the automatic shifting portion 20, when the hybrid control means 52 varies the input rotation speed $N_{IN}$ of the automatic shifting portion 20 using the first electric motor M1 and/or the second electric motor M2, the control means 180 corrects the learned value on the engaging pressure of the engaging device, based on the variable quantity of the input rotation speed $N_{IN}$ effectuated by the hybrid control means 52. Accordingly, even in a case where the hybrid control means 52 varies the input rotation speed $N_{IN}$, in addition to a case where the input rotation speed $N_{IN}$ is caused to vary solely based on the engaging pressure of the engaging device associated with the shifting of the automatic shifting portion 20, the engaging pressure of the engaging device, associated with the shifting of the automatic shifting portion 20, is accurately learned thereby suppressing the shifting shocks.

In the illustrated embodiment, furthermore, during the shifting of the automatic shifting portion 20, the hybrid control means 52 performs a control using the first electric motor M1 and/or the second electric motor M2 so as to cause the input rotation speed $N_{IN}$ of the automatic shifting portion 20 and/or the engine rotation speed $N_E$ to achieve the given states. Accordingly, this results in the given state, i.e., the given varying rate for providing a balance between a rapid shifting response in which the input rotation speed $N_{IN}$ increases to the input rotation speed $N_{IN}'$, deemed to have, for instance, a comfortable feeling, and a slow shifting response wherein a reduction occurs in the input rotation speed $N_{IN}'$ regarded to easily suppress the shifting shocks. This suppresses the occurrence of the shifting shocks.

Alternately, during the shifting of the automatic shifting portion 20, the engine rotation speed $N_E$ is maintained in the given state at a nearly fixed level on a stage before and after the shifting such that, for instance, the total gear ratio γT is continuously varied to cause the shifting mechanism 10 to function as the continuously variable transmission as a whole. This results in the suppression of the shifting shocks while providing improved fuel consumption.

In the illustrated embodiment, further, the engaging pressure control means 180 learns the engaging pressure of the engaging device so as to allow the input rotation speed $N_{IN}$ of the automatic shifting portion 20 to achieve the given varying state during the shifting of the automatic shifting portion 20. This results in the given state, i.e., the given varying rate providing the balance between the rapid shifting response in which the input rotation speed $N_{IN}'$ increases to the value deemed to have, for instance, the comfortable feeling, and the slow shifting response wherein the input rotation speed $N_{IN}'$ decreases to the value regarded to easily in suppress the shifting shocks. In addition, as the hybrid control means 52 performs the control so as to allow the input rotation speed $N_{IN}$ to achieve the given state using the first electric motor M1 and/or the second electric motor M2, the occurrence of the shifting shocks are further suppressed.

In the illustrated embodiment, furthermore, the hybrid control means 52 varies the input rotation speed $N_{IN}$ of the automatic shifting portion 20 so as to achieve the given state using the first electric motor M1 and/or the second electric motor M2. This results in the suppression of the shifting shocks.

In the illustrated embodiment, moreover, during the operation of the automatic shifting portion 20 with the differential portion 11 placed in the continuously variable shifting state, the hybrid control means 52 maintains the engine rotation speed $N_E$ at the nearly fixed level on the stage before and after the shifting during the shifting of the automatic shifting portion 20. Thus, the total gear ratio γT is continuously varied. This results in a further suppression of the occurrence of shifting shocks and further improvement in fuel consumption, than those achieved in a case where the engine rotation speed $N_E$ is caused to vary to cause the total gear ratio γT to non-continuously vary, i.e., in stepwise variation.

Fifth Embodiment

During the operation of the step variable shifting control means 54 for executing the shifting of the automatic shifting portion 20, the hybrid control means 52 corrects the input rotation speed $N_{IN}$ of the automatic shifting portion 20 using the first electric motor M1 and/or the second electric motor M2 sometimes so as to allow the input rotation speed $N_{IN}$ to achieve the given varying state. When this takes place, the learning control means 182 inhibits the learning of the engaging pressure of the engaging device, that is, no learning on the engaging pressure of the engaging device is performed, such that the engaging pressure of the engaging device is accurately learned. This differs from the illustrated embodiment, mentioned above, in which the engaging pressure of the engaging device is learned in consideration of the correction effectuated using the first electric motor M1 and/or the second electric motor M2.

That is, under a circumstance where the input rotation speed $N_{IN}$ of the automatic shifting portion 20 involves the correction effectuated based on the first electric motor M1 and/or the second electric motor M2 during the shifting of the automatic shifting portion 20, the learning control means 182 does not learn the engaging pressure of the engaging device such that the engaging pressure of the engaging device is accurately learned. Thus, the learning of the engaging pressure of the engaging device is executed only when no input rotation speed $N_{IN}$ of the automatic shifting portion 20 is corrected using the first electric motor M1 and/or the second electric motor M2. That is, the learning is executed only when the input rotation speed $N_{IN}$ of the automatic shifting portion 20 does not involve the corrected value resulting from the use of using the first electric motor M1 and/or the second electric motor M2 during the shifting of the automatic shifting portion 20. This results in an effect of achieving a simplification of the operation in performing the learning control.

Thus, in the illustrated embodiment, during the shifting of the automatic shifting portion 20, the learning control means 182 switches the operation whether to learn or not to learn the engaging pressure of the engaging device, depending on whether or not the hybrid control means 52 performs the correction (variation) so as to allow the input rotation speed $N_{IN}$ of the automatic shifting portion 20 to achieve the given varying state. Accordingly, the learning control means 182 alters the method of learning the engaging pressure of the engaging device so as to allow the engaging pressure of the engaging device to be accurately learned, depending on whether or not the input rotation speed $N_{IN}$ of the automatic shifting portion 20 is corrected so as to achieve the given varying state using the first electric motor M1 and/or the second electric motor M2.

Figure 27:
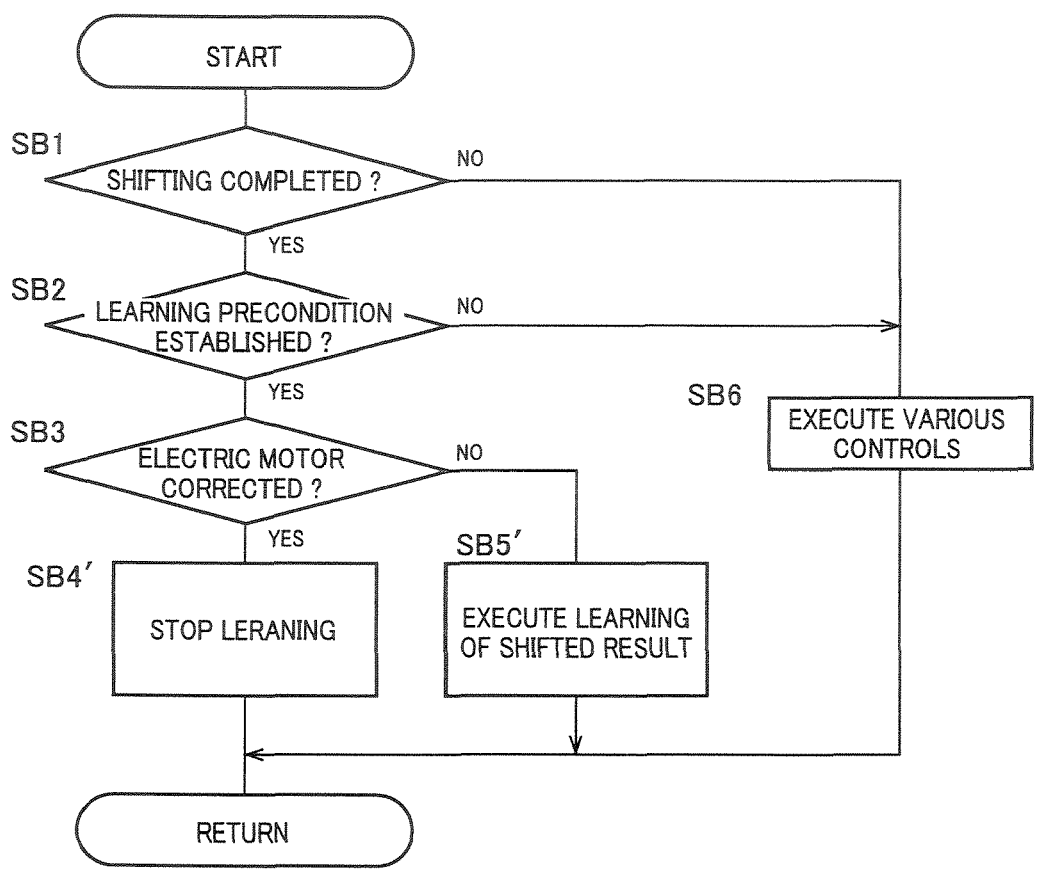
FIG. 27 is a flowchart, corresponding to FIG. 26, which illustrates control operations of an electronic control device of the other embodiment, i.e., control operations for learning the hydraulic pressure value of the engaging device for use in the shifting of the automatic shifting portion.

FIG. 27 is a flowchart illustrating an essence of control operations to be executed by the electronic control device 40 of the illustrated embodiment, that is, control operations for learning the engaging pressure of the engaging device for use in the shifting of the automatic shifting portion 20. FIG. 27 differs from FIG. 26 only in respect of steps SB4 and step SB5 with the other operations being implemented in the same steps as those of FIG. 26. Hereunder, description is made with a focus on differing points.

If the determination in step SB3 is made positive, then in step SB4' corresponding to the learning control means 182, the learning on the engaging pressure of the engaging device is inhibited with no engaging pressure being learned so as to allow the engaging pressure of the engaging device to be accurately learned. That is, if the correction of the input rotation speed $N_{IN}$ of the automatic shifting portion 20 is executed using the first electric motor M1 and/or the second electric motor M2, factors, relevant to the shifting of the automatic shifting portion 20, become complicated. Therefore, to avoid a consequence of inaccurate learning on the engaging pressure of the engaging device due to such an adverse affect, the learning on the engaging pressure of the engaging device is inhibited with no engaging pressure being learned.

If the determination in step SB3 is made negative, then in step SB5' corresponding to the learning control means 182, the operation is executed to correct the default value or the learned value on the engaging pressure of the engaging device in the hydraulic pressure value maps shown in FIG. 11.

In the illustrated embodiment, as set forth above, with the hybrid control means 52 varying the input rotation speed $N_{IN}$ of the automatic shifting portion 20 using the first electric motor M1 and/or the second electric motor M2 during the shifting of the automatic shifting portion 20, the engaging pressure control means 180 inhibits learning the engaging pressure. Accordingly, the learning is executed only when the variation in the input rotation speed $N_{IN}$, occurring during the shifting of the automatic shifting portion 20, does not involve the variation in the input rotation speed $N_{IN}$ caused by the hybrid control means 52. In other words, the learning is executed only when the engaging pressure of the engaging device, mainly associated with the shifting of the automatic shifting portion 20, varies the input rotation speed $N_{IN}$. As a result, the engaging pressure of the engaging device, mainly associated with the shifting of the automatic shifting portion 20, can be accurately learned, thereby suppressing the shifting shocks. Further, the learning control can be simplified.

Furthermore, the illustrated embodiment, configured to inhibit learning the engaging pressure of the engaging device, has the same advantageous effects as those of the illustrated embodiments described above except for the learned value on the engaging pressure of the engaging device being corrected.

While in the foregoing description, the present invention has been described above in detail with reference to the illustrated embodiments shown in the drawings, the present invention may be applied in other modes.

Although in the illustrated embodiment, for instance, the learning control means 100 stores the hydraulic pressure value, resulting from correcting (adjusting) the engaging pressure of the engaging device, as the new learned value, a corrected quantity (adjusted quantity) of the engaging pressure may be treated as a learned value G. For instance, the corrected quantity (adjusted quantity) derived from the default value may be stored as the learned value G, upon which the default value may be tinged with the learned value G and treated as the engaging pressure of the engaging device on a subsequent shifting cycle.

Further, in the illustrated embodiments mentioned above, while as represented by the hydraulic pressure learned value maps shown in FIG. 11, engine torque is stratified in seven stages including engine torques 1 to 7, engine torque may be stratified in more or less number of stages.

Furthermore, in the flowchart shown in FIG. 19, the control operation for the learned value on the engaging pressure of the engaging device to be selected for use in the shifting of the automatic shifting portion 20 is involved in the differential portion 11 placed in the continuously variable shifting state (pattern "A") or the non-continuously variable shifting state (pattern "B"). The present invention is not limited to such states. For instance, the control operations may depend on: the differential portion 11 placed in the continuously variable shifting state wherein the total gear ratio $\gamma T$ has a variation involved in the continuous variation (on the pattern "A") or the skipped shifting (on the pattern "B"); or whether or not the differential portion 11 is placed in the non-continuously variable shifting state. They further depend on; whether or not the differential portion 11 is placed in the continuously variable shifting state and the total gear ratio $\gamma T$ has a variation belonging to the continuous variation; or whether or not the differential portion 11 is placed in the continuously variable shifting state and the total gear ratio $\gamma T$ has a variation belonging to the skipped shifting.

For instance, if the total gear ratio $\gamma T$ has the variation belonging to the continuous variation or the skipped shifting (in non-continuous variation) with the differential portion 11 placed in the continuously variable shifting state, the default value on the hydraulic pressure value map for the pattern "A" not learned is corrected, based on the learned value on the hydraulic pressure learning map for the pattern "B" already learned.

The corrected value is selected as the hydraulic pressure value for the engaging pressure of the engaging device during the shifting of the automatic shifting portion 20. The default value on the hydraulic pressure value map for the pattern "B", which is not learned yet, is corrected based on the hydraulic pressure value map for the pattern "A" that is already learned and is selected as the hydraulic pressure value for the engaging device for the shifting of the automatic shifting portion 20.

If the patterns "A" and "B" are completed in learning, the learned value in the hydraulic pressure value maps is selected as the hydraulic pressure value for the engaging device for the shifting of the automatic shifting portion 20. If none of the learned values in the hydraulic pressure value maps for the patterns "A" and "B" is learned, the default value on the relevant hydraulic pressure value map is selected as the hydraulic pressure value of the engaging device for the shifting of the automatic shifting portion 20.

Further, in the illustrated embodiments mentioned above, the hydraulic pressure value maps for the patterns "A", "B" and "C" store the default values therefor, respectively, and the default values are rewritten as the learned values upon the learning operations for storage. However, the default value is stored for one kind (one pattern) of the hydraulic pressure value map in nature and is rewritten to new learned values upon the learning which may be organized and stored for the patterns "A", "B" and "C", depending on a status of the shifting mechanism during the shifting of the automatic shifting portion 20.

Furthermore, in the illustrated embodiments set forth above, the differential portion 11 executes the shifting control so as to maintain the engine rotation speed $N_E$ at the nearly fixed level, i.e., not to vary the total gear ratio γT on the stage before and after the shifting of the automatic shifting portion 20 as shown in the timing charts in FIGS. 13 and 14. However, no need arises for the engine rotation speed $N_E$ to be necessarily maintained at the nearly fixed level and the variation of the engine rotation speed $N_E$ may be continuously varied in a suppressed state. Even in such an alternative, a certain measure of success can be obtained.

In the illustrated embodiment, further, the differential state determining means 80 (step S2 in FIG. 12) determines whether or not the power distributing mechanism 16 is placed in the differential state based on whether or not the shifting mechanism 10 remains in the continuously variable region depending on the vehicle condition by referring to, for instance, the shifting diagram shown in FIG. 6. However, the determination may be made whether or not the power distributing mechanism 16 is placed in the differential state based on the determination as to whether or not the shift control means 50 renders the shifting mechanism 10 to be placed in the step variable control region or the continuously variable control region.

Further, in the illustrated embodiment, the gear ratio change determining means 86 (step S3 in FIG. 12) determines the presence of the skipped shifting in light of the occurrence wherein the varying width of the targeted total gear ratio γT is caused to exceed the given value. However, the skipped shifting may be determined on the ground that the varying rate of the targeted total gear ratio γT is caused to exceed a given varying rate. As used herein, the term "given varying rate" refers to a determined value that is preliminarily and experimentally determined for making the determination that the targeted total gear ratio γT is not continuously varied but varied step-by-step (i.e., in non-continuous manner).

For instance, in the illustrated embodiment, the shifting mechanism 10, 70 is structured to be switched to the continuously variable shifting state and the step variable shifting state, by switching the power distributing mechanism 16 to the differential state functioning as the electrically continuously variable transmission and the non-differential state (locked state). The switching between the continuously variable shifting state and the step variable shifting state is performed as one mode of placing the differential portion 11 in the differential state and the non-differential state. However, even if, for instance, when placed in the differential state, the differential portion 11 may be arranged to function as the step variable transmission with the shifting gear ratio thereof made not in a continuous mode but in a stepwise mode.

In other words, the differential state/non-differential state of the differential portion 11 and the continuously variable shifting state/step variable shifting state of the shifting mechanism 10, 70 do not necessarily fall in a one-on-one correspondence. The differential portion 11 need not necessarily be formed in a structure to enable the switching between the continuously variable shifting state and the step variable shifting state, but the shifting mechanism 10, 70 is sufficiently structured to be switched between the differential state and the non-differential state, for the present invention.

In the power distributing mechanisms 16 in the illustrated embodiments, the first carrier CA1 is fixed to the engine 8, and the first sun gear S1 is fixed to the first electric motor M1, and the first ring gear R1 is fixed to the transmitting member 18. However, such connecting arrangement is not essential, and the engine 8, first electric motor M1 and transmitting member 18 are fixed to respective ones of the three elements CA1, S1 and R1 of the first planetary gear unit 24. Although the engine 8 is directly connected to the drive apparatus input shaft 14 in the illustrated embodiments, it may be operatively connected to the input shaft 14 through gears, a belt or the like, and need not be disposed coaxially therewith.

In the illustrated embodiments, the first electric motor M1 and the second electric motor M2 are disposed coaxially with the drive apparatus input shaft 14, the first electric motor M1 is fixed to the first sun gear S1, and the second electric motor M2 is fixed to the transmitting member 18. However, such arrangement is not essential. For example, the first electric motor M1 may be fixed to the first sun gear S1 through gears, a belt or the like, and the second electric motor M2 may be fixed to the transmitting member 18.

Although the above power distributing mechanism 16 is provided with both the switching clutch C0 and the switching brake B0, it need not be provided with both of them, and may be provided with only one of the switching clutch C0 and brake B0. Although the switching clutch C0 selectively connects the sun gear S1 and carrier CA1 to each other, it may selectively connect the sun gear S1 and ring gear R1 to each other, or the carrier CA1 and ring gear R1. In essence, the switching clutch C0 sufficiently connects any two of the three elements of the first planetary gear unit 24. The switching clutch C0 in the illustrated embodiment is engaged to establish the neutral position "N" in the shifting mechanism 10, 70, but the neutral position need not be established by engagement thereof.

The hydraulic-type frictional coupling devices such as the switching clutch C0 and switching brake B0 may be a coupling device of a magnetic-powder type, an electromagnetic type or a mechanical type, such as a powder (magnetic powder) clutch, an electromagnetic clutch and a meshing type dog clutch. The second electric motor M2 connected to the transmitting member 18 in the above embodiment can be connected to the output member 22, or can be connected to the rotary member disposed in the automatic shifting portion 20, 72.

In the illustrated embodiment, further, the automatic shifting portion 20, 72 is disposed in the power transmitting path between the transmitting member 18 serving as the output member of the differential portion 11, that is the power distributing mechanism 16 and the drive wheels 38. However, a power transmitting device of the other type such as a well-known constantly meshed type includes two parallel shafts, and is automatically switched the gear positions thereof by the select ring and the shift cylinder. The term "step variable shifting state" used herein refers to a state wherein power transmission is achieved mainly in a mechanical transmitting path without using the electrical path.

In the illustrated embodiment, furthermore, while the automatic shifting portion 20, 72 is connected to the differential portion 11 in series via the transmitting member 18, a countershaft may be provided in parallel to the input shaft 14 to allow the automatic shifting portion 20, 72 to be coaxially disposed on an axis of the countershaft. In this case, the differential portion 11 and the automatic shifting portion 20, 72 are connected to each other in power transmitting capability via a set of transmitting members structured of, for instance, a counter-gear pair acting as the transmitting member, a sprocket and a chain.

The power distributing mechanism 16 in the illustrated embodiment can be comprised of for example a pinion driven and rotated by the engine, and a differential gear set having a pair of bevel gears meshed with the pinion being operatively connected to the first electric motor M1 and the second electric motor M2.

The power distributing mechanism 16 in the illustrated embodiment comprised of one paired planetary gear units, may be comprised of two or more pairs planetary gear units to function in the non-differential state (fixed speed state) as the transmission having three or more speed positions. The planetary gear unit is not limited to the single-pinion type, but can be the double-pinion type.

The switch device 90 in the illustrated embodiment has the shift lever 92 to be manipulated for selecting one of a plurality of shift positions. However, instead of such shift lever 92, following switch or device can be employed. That is, a switch being comprised of a pressing type switch and a sliding type switch and being selected to one of a plurality of shift positions; a device being selected to one of a plurality of shift positions in response not to the manipulation by the hand but to the driver's voice; and a device being selected to one of a plurality of shift positions in response to the manipulation by the foot, can be employed.

In the illustrated embodiment, the shifting range is established by manipulation of the shift lever 92 to the "M" position, but the shifting position i.e., speed position can be established by setting of the shifting step that is the maximum speed step for each shifting range. In this case, in the automatic shifting portion 20, 72, the shifting position is switched for executing the shifting action. For example, when the manual manipulation of the shift lever 92 to a shift-up position "+" and a shift-down position "−" at the "M" position is executed, any of the first gear position to the fourth gear position is set by the manipulation of the shift lever 92 in the automatic shifting portion 20.

The switch 44 in the illustrated embodiment is of the seesaw type. However, switches capable of being selectively switched to one of the continuously variable shifting running (differential state) and the step variable shifting running (non-differential state) can be employed. That is, a pressing type switch; two pressing type switches which can hold the state selectively pressed; a lever type switch; and a sliding type switch, can be provided. In addition to the switch 44 having single neutral position, a switch having two shifting positions for making the selected state thereof valid and invalid can be provided, independent from the switch 44, can be employed. Instead of, or in addition to the switch 44, following devices can be employed. That is, the devices capable of being selectively switched to one of the continuously variable shifting running (differential state) and the step variable shifting running (non-differential state), in response not to the manual manipulation but to the driver's voice, and the device switched by the manipulation by foot, can be employed.

In the illustrated embodiment, further, the engaging pressure learning control means 182 alters the learning pressure learned value maps based on, for instance, the existence or the nonexistence of the correction effectuated using the first electric motor M1 and/or the second electric motor M2. However, with the pattern "A" organized as the learned value when the correction is executed using the first electric motor M1 and/or the second electric motor M2, the learned value may be further classified into multiple components to be organized as separate hydraulic pressure learned value maps, respectively, based on the corrected value executed using the first electric motor M1 and/or the second electric motor M2.

In the illustrated embodiment, furthermore, the engaging pressure learning control means 182 alters the method of learning the engaging pressure of the engaging device upon switching whether to or not to consider the correction for learning the engaging pressure of the engaging device and switching whether to or not to lean the engaging pressure of the engaging device, depending on the existence or the nonexistence of the correction effectuated using the first electric motor M1 and/or the second electric motor M2. However, if the correction is made using the first electric motor M1 and/or the second electric motor M2, the learning method may be executed in a further insensitive reaction to perform the learning on the shifting in a subsequent cycle than that of the learning executed in the absence of the correction. More particularly, if there is the correction effectuated using the first electric motor M1 and/or the second electric motor M2, the engaging hydraulic pressure in a subsequent cycle may be performed in a lower characteristic change than that appearing in the absence of the correction.

This is because if the correction is executed on the input rotation speed $N_{IN}$ of the automatic shifting portion 20, factors related to the shifting becomes complicated with a resultant difficulty of accurately learning the engaging pressure of the engaging device and, to avoid such a resultant difficulty, the adverse affect is minimized. Thus, the learning pressure control means 82 alters the method of learning the engaging pressure of the engaging device upon switching whether to or not to minimize such a characteristic change in the engaging hydraulic pressure on the subsequent cycle, based on the existence or the nonexistence of the correction effectuated using the first electric motor M1 and/or the second electric motor M2.

In the illustrated embodiment, moreover, the motor correction determining means 190 determines whether or not the hybrid control means 52 has corrected the input rotation speed $N_{IN}$ of the automatic shifting portion 20, using the first electric motor M1 and/or the second electric motor M2 such that the input rotation speed $N_{IN}$ of the automatic shifting portion 20 achieves the given varying state. This determination is executed during the operation of the step variable shift control means 54 for executing the shifting of the automatic shifting portion 20. However, no determination may be executed depending on the existence or the nonexistence of the correction effectuated using the first electric motor M1 and/or the second electric motor M2, and, instead, the correction with a value less than a given quantity and the correction with a value greater than the given quantity may be determined.

For instance, if the motor correction determining means 190 determines the correction with the value less than the given quantity, the learning control means 182 executes the learning method for one mode in the absence of the correction. Alternately, if the motor correction determining means 190 determines the correction with the value greater than the given quantity, the learning control means 182 executes the learning method for the other mode in the presence of the correction. As used herein, the term "given quantity" refers to a correction existence/nonexistence determining value, preliminarily obtained on experiments, for the learning control means 182 to determine whether to or not to execute the learning method for the mode in the presence of the correction effectuated using the first electric motor M1 and/or the second electric motor M2.

In the illustrated embodiment, moreover, although engine torque has the stratification classified in the seven stages in engine torque 1 to 7 as shown in the hydraulic pressure learned value maps shown in FIG. 11, the stratification may have more or less number of stages.

In the illustrated embodiment, further, as indicated by the timing charts shown in FIGS. 13 and 14, the shifting control of the differential portion 11 is executed so as to maintain the input rotation speed $N_{IN}$ of the automatic shifting portion 20 at the nearly constant level, i.e., so as to prevent the change in the total gear ratio of the shifting mechanism 10 on the stage before and after the shifting of the automatic shifting portion 20. However, the engine rotation speed $N_E$ has no need to be necessarily maintained at the nearly constant level and it will suffice if the change in the total gear ratio γT is suppressed for continuously varying the engine rotation speed $N_E$.

In the illustrated embodiment, with the differential portion 11 limited in operation to function as the electrically controlled continuously variable transmission (differential device), the switching control means 50 completely engages the switching clutch C0 or the switching brake B0 are to switch the differential portion 11 in the non-differential state (locked state) to avoid the differential action. However, varying torque capacities of the switching clutch C0 or the switching brake B0 may be may be varied in, for instance, a semi-engaged condition for thereby limiting the differential portion 11 functioning as the electrically controlled differential device.

In particular, the switching control means 50 may cause the switching clutch C0 or the switching brake B0 to be placed in the semi-engaged condition. This allows the differential portion 11 to function as the electrically controlled continuously variable transmission. In addition, using torque generated by the first electric motor M1 and torque generated in the semi-engaged state of the switching clutch C0 or the switching brake B0 may cause reaction torque to occur against engine torque $T_E$ being input to the differential portion 11.

With such arrangement, the differential portion 11 can be applied with engine torque $T_E$ exceeding the given value TE1 available to be born with, for instance, torque capacity of the first electric motor M1. As a result, the differential portion 11 is enabled to provide an increase in output without causing any increase in a maximal torque capacity of the first electric motor M1, i.e., without causing any increase in size of the first electric motor M1.

Alternately, in contrast to a case in which the switching clutch C0 or the switching brake B0 are disengaged, the first electric motor M1 has no need to bear reaction torque against entire engine torque $T_E$ being input to the differential portion 11. This enables a reduction in ratio of engine torque $T_E$ to be born with the first electric motor M1 in respect of engine torque $T_E$ with the same magnitude as that applied to the differential portion 11. This results in the miniaturization of the first electric motor M1 or an increase in durability of the first electric motor M1. Alternately, this enables a decrease in electric energy to be transferred from the first electric motor M1 to the second electric motor M2, resulting in an increase in durability of the second electric motor M2.

Alternately, the shift control means 50 may render the switching clutch C0 or the switching brake B0 operative in a semi-engaging state regardless of whether or not the differential portion 11 remains in the continuously variable control region to be placed in the continuously variable shifting state or whether or not the differential portion 11 remains in the step variable control region to be placed in the non-continuously variable shifting state.

In the illustrated embodiments mentioned above, further, the shifting mechanisms 10, 70 are structured such that with the power distributing mechanism 16 switched to the differential state or the non-differentials state, the shifting mechanisms can be switched to the continuously variable shifting state enabling a function of the electrically controlled continuously variable transmission portion, or the non-continuously variable shifting state in a function of the step variable transmission. However, the present embodiments can be applied even if the shifting mechanisms 10, 70 include shifting mechanisms disenabled to be to switched to the step variable shifting state, that is, even if the differential portion 11 functions only as the electrically controlled continuously variable transmission. In this case, no need arises for providing the switching control means 50 and the speed increasing gear position determining means 62.

In addition, it is intended that the illustrated embodiments described be considered only as illustrative of the present invention, and that the present invention may be implemented in various modifications and improvements in the light of knowledge of those skilled in the art.

The invention claimed is:

1. A vehicle drive apparatus, comprising:
   an engine;
   a continuously variable shifting portion including a differential mechanism for distributing an output of the engine to a first electric motor and a transmitting member and a second electric motor disposed in a power transmitting path between the transmitting member and drive wheels, to be operative as an electrically controlled continuously variable transmission;
   a shifting portion forming a part of the power transmitting path and operative to engage or disengage an engaging device for thereby executing a shifting;
   a differential state switching device disposed in the differential mechanism and operative to selectively switch the continuously variable shifting portion in a continuously variable shifting state available to perform an electrically controlled continuously variable shifting operation and a non-continuously variable shifting state disenabling the electrically controlled continuously variable shifting operation; and
   an engaging control variable control unit that controls the engaging device for the shifting of the shifting portion, and altering a learning method of a control variable of the engaging device based on whether or not the continuously variable shifting portion is placed in the continuously variable shifting state.

2. A vehicle drive apparatus, comprising:
   an engine;
   a continuously variable shifting portion including a differential mechanism for distributing an output of the engine to a first electric motor and a transmitting member and a second electric motor disposed in a power transmitting path between the transmitting member and drive wheels, to be operative as an electrically controlled continuously variable transmission;
   a shifting portion forming a part of the power transmitting path and operative to engage or disengage an engaging device for thereby executing a shifting;
   a differential state switching device disposed in the differential mechanism and operative to selectively switch the continuously variable shifting portion in a continuously variable shifting state available to perform an electrically controlled continuously variable shifting operation and a non-continuously variable shifting state disenabling the electrically controlled continuously variable shifting operation; and
   an engaging control variable control unit that controls the engaging device for the shifting of the shifting portion, and classifying a learned value of a control variable of the engaging device based on whether or not the continuously variable shifting portion is placed in the continuously variable shifting state.

3. A vehicle drive apparatus, comprising:
   an engine;
   a continuously variable shifting portion including a differential mechanism for distributing an output of the engine to a first electric motor and a transmitting member and a second electric motor disposed in a power transmitting path between the transmitting member and drive wheels, to be operative as an electrically controlled continuously variable transmission;

a shifting portion forming a part of the power transmitting path and operative to engage or disengage an engaging device for thereby executing a shifting;

a differential state switching device disposed in the differential mechanism and operative to selectively switch the continuously variable shifting portion in a continuously variable shifting state available to perform an electrically controlled continuously variable shifting operation and a non-continuously variable shifting state disenabling the electrically controlled continuously variable shifting operation; and an engaging control variable control unit that controls the engaging device for the shifting of the shifting portion, and operative, when the continuously variable shifting portion is placed in the continuously variable shifting state, and that alters a learning method of a control variable of the engaging device depending on a a total gear ratio which is established with the continuously variable shifting portion and the shifting portion, to be continuously varied or to be non-continuously varied.

4. A vehicle drive apparatus, comprising:
an engine;
a continuously variable shifting portion including a differential mechanism for distributing an output of the engine to a first electric motor and a transmitting member and a second electric motor disposed in a power transmitting path between the transmitting member and drive wheels, to be operative as an electrically controlled continuously variable transmission;

a shifting portion forming a part of the power transmitting path to engage or disengage an engaging device for thereby executing a shifting, a differential state switching device disposed in the differential mechanism and operative to selectively switch the continuously variable shifting portion in a continuously variable shifting state available to perform an electrically controlled continuously variable shifting and a non-continuously variable shifting state for disenabling the electrically controlled continuously variable shifting; and an engaging control variable control unit that controls the engaging device for the shifting portion to perform the shifting, and operative, when the continuously variable shifting portion is placed in the continuously variable shifting state, and that classifies a learned value of a control variable of the engaging device depending on a total gear ratio which is established with the continuously variable shifting portion and the shifting portion, to be continuously varied or to be non-continuously varied.

5. A vehicle drive apparatus according to one of claims 1 to 4, wherein the engaging control variable control unit learns the control variable of the engaging device so that a rotation speed of the transmitting member has a predetermined variable.

6. A control device for a vehicle drive apparatus according to claim 1, wherein the engaging control variable control unit learns an unlearned control variable of the engaging device, when the continuously variable shifting portion is placed in the continuously variable shifting state, based on a control variable of an engaging device that is learned when the continuously variable shifting portion is placed in the non-continuously variable shifting state, or the engaging control variable control unit learns the unlearned control variable of the engaging device, when the continuously variable shifting portion is placed in the non-continuously variable shifting state, based on the learned control variable of the engaging device appearing when the continuously variable shifting portion is placed in the continuously variable shifting state.

7. A vehicle drive apparatus according to claim 3, wherein the engaging control variable control unit learns an unlearned control variable of the engaging device, when the continuously variable shifting portion is placed in the continuously variable shifting state with the shifting executed for the total gear ratio to be continuously varied, based on a learned control variable of the engaging device with the continuously variable shifting portion placed in the continuously variable shifting state for the total gear ratio to be non-continuously varied, or the engaging control variable control unit learns the unlearned control variable of the engaging device, when the continuously variable shifting portion is placed in the continuously variable shifting state with the shifting executed for the total gear ratio to be non-continuously varied, based on the learned control variable of the engaging device appearing when the continuously variable shifting portion is placed in the continuously variable shifting state with the shifting executed for the total gear ratio to be continuously varied.

8. A vehicle drive apparatus according to one of claims 1 to 4, further comprising a rotation control unit that varies a rotation speed of the transmitting member using the first electric motor or the second electric motor so as to allow the rotation speed of the transmitting member to achieve a given variation during the shifting of the shifting portion, and
with the rotation control unit operated for the rotation speed of the transmitting member to be varied, the engaging control variable control unit inhibits a learning on the control variable of the engaging device.

9. A vehicle drive apparatus according to one of claims 1 to 4, further comprising a rotation control unit that varies a rotation speed of the transmitting member using the first electric motor or the second electric motor so as to allow the rotation speed of the transmitting member to achieve a given variation during the shifting of the shifting portion, and
with the rotation control unit operated for the rotation speed of the transmitting member to be varied, the engaging control variable control unit learns the control variable of the engaging device in consideration of a variation in the rotation speed of the transmitting member.

10. A vehicle drive apparatus, according to one of claims 1 to 4,
the control device comprising:
a rotation control unit that varies an input rotation speed of the shifting portion during the shifting thereof using the first electric motor or the second electric motor; and
an engaging pressure control unit that controls an engaging pressure of the engaging device for the shifting of the shifting portion, and altering a learning method of the engaging pressure of the engaging device based on whether or not the rotation control unit varies the input rotation speed of the shifting portion.

11. A vehicle drive apparatus, according to one of claims 1 to 4,
the control device comprising:
a rotation control unit that varies an input rotation speed of the shifting portion during the shifting thereof using the first electric motor or the second electric motor; and an engaging pressure control unit that controls an engaging pressure of the engaging device for the shifting portion to perform the shifting, and inhibiting learning of the engaging pressure of the engaging device when the rotation control unit varies the input rotation speed of the shifting portion.

12. A vehicle drive apparatus, according to one of claims 1 to 4, the control device comprising:

a rotation control unit that varies an input rotation speed of the shifting portion during the shifting thereof using the first electric motor or the second electric motor; and an engaging pressure control unit that controls an engaging pressure of the engaging device for the shifting portion to perform the shifting, and correcting a learned value on the engaging pressure of the engaging device based on a control variable of the input rotation speed effectuated by the rotation control unit when the rotation control unit varies the input rotation speed of the shifting portion.

13. A vehicle drive apparatus, according to one of claims 1 to 4, the control device comprising:

a rotation control unit that varies an input rotation speed of the shifting portion during the shifting of the shifting portion using the first electric motor or the second electric motor; and an engaging pressure control unit that controls an engaging pressure of the engaging device for the shifting portion to perform the shifting, and altering a learning method of the engaging pressure of the engaging device based on whether or not the rotation control unit varies the input rotation speed of the shifting portion.

14. A vehicle drive apparatus, according to one of claims 1 to 4, the control device comprising:

a rotation control unit that varies an input rotation speed of the shifting portion during the shifting thereof using the first electric motor or the second electric motor; and an engaging pressure control unit that controls an engaging pressure of the engaging device for the shifting portion to perform the shifting and inhibiting learning the engaging pressure of the engaging device when the rotation control unit varies the input rotation speed of the shifting portion.

15. A vehicle drive apparatus, according to one of claims 1 to 4, the control device comprising:

a rotation control unit that varies an input rotation speed of the shifting portion during the shifting thereof using the first electric motor or the second electric motor; and an engaging pressure control unit that controls an engaging pressure of the engaging device for the shifting portion to perform the shifting, and correcting a learned value on the engaging pressure of the engaging device when the rotation control unit varies the input rotation speed of the shifting portion.

16. A vehicle drive apparatus according to claim 8, wherein the rotation control unit controls the input rotation speed of the shifting portion or the engine rotation speed during the shifting of the shifting portion, using the first electric motor or the second electric motor, so as to allow the input rotation speed of the shifting portion or the engine rotation speed during the shifting of the shifting portion to achieve given states.

17. A vehicle drive apparatus according to claim 10, wherein the engaging pressure control unit learns the engaging pressure of the engaging device so as to allow the input rotation speed of the shifting portion to achieve the given varying state during the shifting of the shifting portion.

18. A vehicle drive apparatus according to claim 10, wherein the rotation control unit varies the input rotation speed of the transmission in a given varying rate using the first electric motor or the second electric motor.

19. A vehicle drive apparatus according to claim 10, wherein the rotation control unit compels the engine rotation speed not to vary on a stage before and after the shifting of the shifting portion using the first electric motor.

20. A vehicle drive apparatus according to one of claims 1 to 4, wherein the differential state switching device switches the continuously variable shifting state and the noncontinuously variable shifting state of the continuously variable shifting portion based on a required output torque.

21. A vehicle drive apparatus according to one of claims 1 to 4, wherein the differential state switching device switches the continuously variable shifting state and the noncontinuously variable shifting state of the continuously variable shifting portion based on a vehicle speed.

22. A vehicle drive apparatus according to one of claims 1 to 4, wherein the differential state switching device switches the continuously variable shifting state and the noncontinuously variable shifting state of the continuously variable shifting portion based on an output torque of the engine.

23. A vehicle drive apparatus according to one of claims 1 to 4, wherein the differential state switching device switches the continuously variable shifting state and the noncontinuously variable shifting state of the continuously variable shifting portion based on a rotation speed of the engine.

* * * * *